US012572504B2

(12) United States Patent
Taylor

(10) Patent No.: US 12,572,504 B2
(45) Date of Patent: Mar. 10, 2026

(54) DATA ORGANIZER OPTIMIZING RECONCILIATION SYSTEMS

(71) Applicant: Mark Taylor, Falls Church, VA (US)

(72) Inventor: Mark Taylor, Falls Church, VA (US)

( * ) Notice: Subject to any disclaimer, the term of this patent is extended or adjusted under 35 U.S.C. 154(b) by 0 days.

(21) Appl. No.: 18/676,325

(22) Filed: May 28, 2024

(65) Prior Publication Data

US 2024/0311338 A1 Sep. 19, 2024

Related U.S. Application Data

(63) Continuation-in-part of application No. 18/439,687, filed on Feb. 12, 2024.

(60) Provisional application No. 63/469,303, filed on May 26, 2023.

(51) Int. Cl.
| | |
|---|---|
| *G06F 16/00* | (2019.01) |
| *G06F 16/13* | (2019.01) |
| *G06F 16/16* | (2019.01) |

(52) U.S. Cl.
CPC ............ *G06F 16/13* (2019.01); *G06F 16/164* (2019.01)

(58) Field of Classification Search
None
See application file for complete search history.

(56) References Cited

U.S. PATENT DOCUMENTS

| | | | | |
|---|---|---|---|---|
| 6,418,448 B1 * | 7/2002 | Sarkar | ................... | G06F 16/972 |
| 7,657,582 B1 * | 2/2010 | Cram | ................. | G06F 11/1469 |
| | | | | 707/682 |

| | | | | |
|---|---|---|---|---|
| 8,893,281 B1 * | 11/2014 | Lee | ........................ | G06F 21/565 |
| | | | | 726/25 |
| 2006/0173873 A1 * | 8/2006 | Prompt | ................. | G06F 16/284 |
| 2009/0063555 A1 * | 3/2009 | Fisher | .................. | G06F 16/284 |
| 2010/0002262 A1 * | 1/2010 | Kondo | .................. | G06F 40/197 |
| | | | | 358/1.15 |
| 2012/0197809 A1 * | 8/2012 | Earl | ........................ | G06Q 10/00 |
| | | | | 707/755 |
| 2015/0278334 A1 * | 10/2015 | Gerweck | ............... | G06F 16/283 |
| | | | | 707/706 |
| 2015/0347485 A1 * | 12/2015 | Cai | .......................... | G06F 16/84 |
| | | | | 707/743 |
| 2023/0028302 A1 * | 1/2023 | Kyleman | ................ | G06F 16/93 |
| 2023/0315366 A1 * | 10/2023 | Shibata | ................. | G06F 3/1256 |

(Continued)

*Primary Examiner* — Hasanul Mobin
(74) *Attorney, Agent, or Firm* — L/O OF ALEXIS J SAENZ

(57) ABSTRACT

A data organizer, optimizing, reconciliation system (DOORS)/method/program, provides capability to merge intuitively datasets created over users' digital lifetimes from multiple devices. Finds and gathers files from devices and may create master copies in Cloud or local storage. Enhanced functionality via artificial intelligence or machine learning provides more intuitive merging of datasets including file and folder name selection and may operate autonomously at times of low usage. Optimized by learning from training data, or legacy data, or learning in real time from user preferences, practices, and habits. Reducing loses of treasured photographs and important documents via preventing files getting marooned on inaccessible legacy devices. Because devices get lost, replaced, or may suffer ransomware attacks or may need to be re-set and suffer data loss for a variety of reasons. Compatible and useable across the proliferating number of data producing devices, including smart phones, tablets, cameras, and computers.

18 Claims, 44 Drawing Sheets

(56)          References Cited

U.S. PATENT DOCUMENTS

2024/0104094 A1 *   3/2024   Li  ..................... G06F 16/24539
2024/0311338 A1 *   9/2024   Taylor ................... G06F 16/164

* cited by examiner

*FIG. 1A*

DEFINED PROCESS                    ⌐ 25

STEPS

1. CREATE DOORS RELATIONAL DATABASE(S).
2. INTERROGATE OR SCAN USER DEVICES AND CONNECTED STORAGE FOR FILES.
3. POPULATE RELATIONAL DATABASE(S) WITH DETAILS OF FILE INTRINSIC AND EXTRINSIC ATTRIBUTES.
4. COMPARE FILE ATTRIBUTES.
5. IDENTIFY MATCHING ATTRIBUTES.
6. RUN EXPERT SYSTEM LOGIC OR MACHINE LEARNING AND/OR ARTIFICIAL INTELLIGENCE.
7. INFER RELATIONSHIPS FOR FILES WITH MATCHING ATTRIBUTES.
8. INFER RELATIONSHIPS FOR FILES WITH SECONDARILY RELATED ATTRIBUTES.
9. QUERY SUSPECTED RELATIONSHIPS WITH USER.
10. APPLY USER POLICIES.
11. APPLY QUERY RESPONSES AND ADD TO POLICIES.
12. CREATE DOORS MASTER OVERVIEW OF FILES AND THEIR RELATIONAL DATA.
13. BASED ON USER SELECTIONS CREATE A DOORS MASTER DIRECTORY IN DESIRED STORAGE LOCATION(S).
14. POPULATE MASTER DIRECTORY WITH SUB-DIRECTORY STRUCTURES AND FILES.
15. TERMINATE AND/OR STAY RESIDENT ("TSR" RUNNING LOOP IN BACKGROUND »).
16. MONITOR USER FILE CREATION AND STORAGE OF FILES AND LOCATIONS OF STORAGE SELECTED IN EACH CASE.
17. ADD USER FILE CREATION AND STORAGE SELECTIONS TO SEED DATA.
18. PERIODICALLY ADD NEW SEED DATA TO ML/AI LEARNING TO UPDATE AND EMULATE USER MORE ACCURATELY.
19. OFFER TO AUTOMATE FILE NAMING AND STORAGE ACCORDING TO POLICIES AND/OR LEARNING TO PROVIDE INTUITIVE NAMING AND STORAGE FILE HANDLING ACCORDING TO USER EMULATION.
20. PERIODICALLY OR AT USER OPTION MERGE AND RECONCILE RELATED DATASET FILES & VERSIONS ACROSS DEVICES ACCORDING TO POLICIES AND/OR MACHINE LEARNING AND/OR ARTIFICIAL INTELLIGENCE LEARNING.
21. SOURCE DATASETS MAY BE LEFT PRESERVED ON SOURCE DEVICES AND STORAGE RESOURCES OR AT USER OPTION DELETED.
22. OBSOLETE VERSIONS OF FILES AND DATASETS SUCH AS AN EMAIL DATABASE MAY BE DELETED OR PRESERVED ACCORDING TO USER SELECTIONS AND/OR POLICIES (LOOP BACK « TO STEP 15 IN T.S.R. MODE).

SAFE INTELLIGENT SYSTEMS
ARCHITECTURE

118

RELATIONAL DATABASE
TABLE / ARRAYS OF
RECORDS OF FILES

64

FILES

LINKS

FILES WITH SHARED ATTRIBUTES

RECORD

SHARED &/ RELATED ATTRIBUTES

FIG. 8

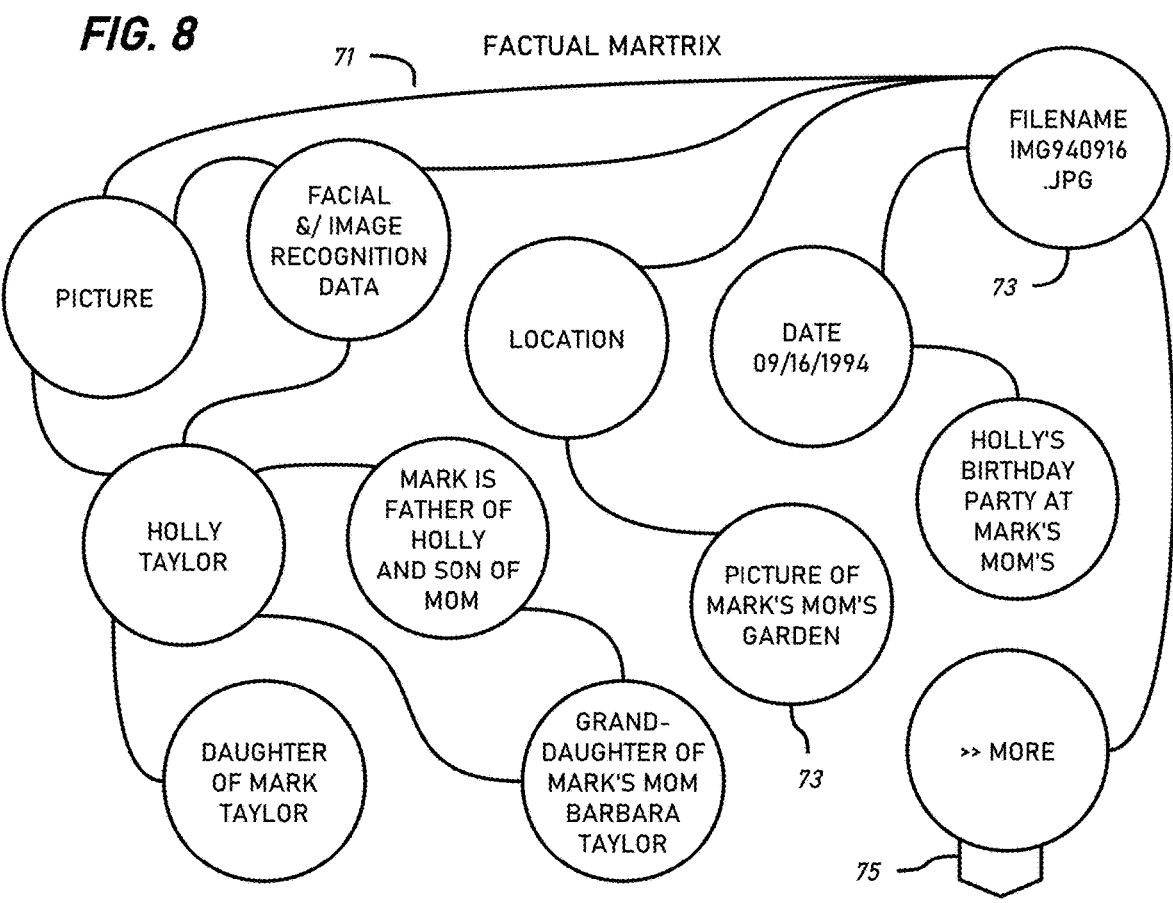

FACTUAL MARTRIX

71

FILENAME IMG940916 .JPG

FACIAL &/ IMAGE RECOGNITION DATA

PICTURE

73

LOCATION

DATE 09/16/1994

HOLLY'S BIRTHDAY PARTY AT MARK'S MOM'S

HOLLY TAYLOR

MARK IS FATHER OF HOLLY AND SON OF MOM

PICTURE OF MARK'S MOM'S GARDEN

DAUGHTER OF MARK TAYLOR

GRAND-DAUGHTER OF MARK'S MOM BARBARA TAYLOR

73

>> MORE

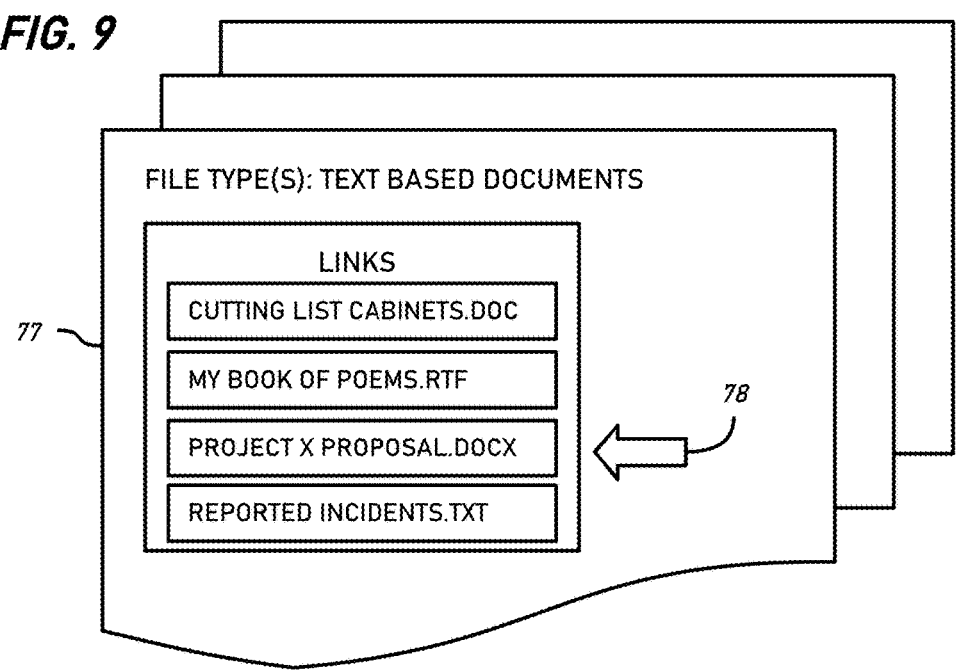

FILE TYPE(S): TEXT BASED DOCUMENTS

LINKS

CUTTING LIST CABINETS.DOC

MY BOOK OF POEMS.RTF

PROJECT X PROPOSAL.DOCX

REPORTED INCIDENTS.TXT

77

78

WINDOWS® STYLE GUI VIEW

FIG. 13

COMPREHENSION MODELS FOR DERIVATION OF: INFERENCES　*380*

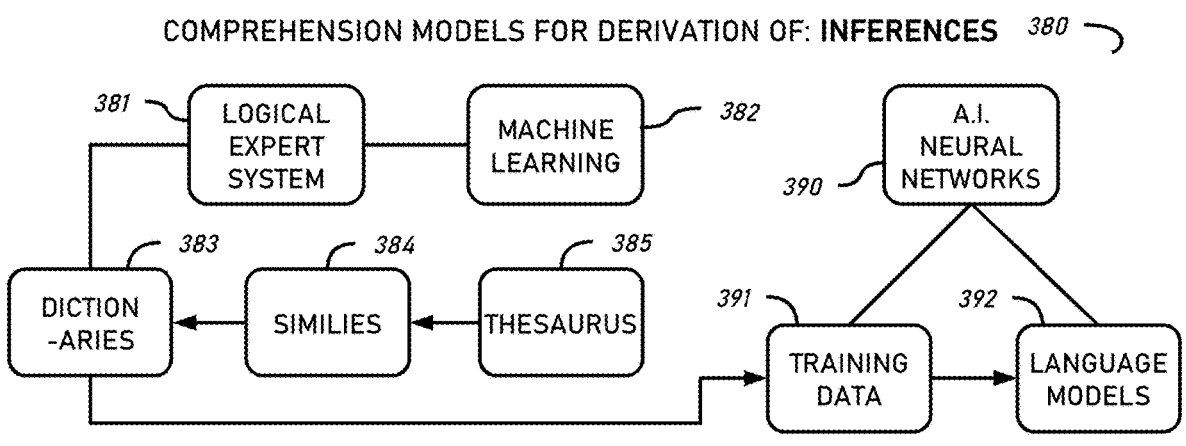

FIG. 14

RELATIONAL DATABASE RECORDS FOR <u>CLASS</u>: FAMILY　*395*

| FAMILY | | RELATION | NICKNAMES | | FACIAL RECOG |
|---|---|---|---|---|---|
| MARK | TAYLOR | MAIN USER | DAD TO HOLLY | SON TO PARENTS | YES |
| BARBARA | TAYLOR | PARENT / MOTHER OF USER | MOM | NANNA | YES |
| ALFRED | TAYLOR | PARENT / FATHER OF USER | DAD | GRANDAD | YES |
| HOLLY | TAYLOR | DAUGHTER OF USER | | | YES |

FIG. 15

RELATIONAL DATABASE RECORDS FOR <u>CLASS</u>: FRIENDS　*396*

| FRIEND | | RELATION | NOTES & FACTS | | FACIAL RECOG |
|---|---|---|---|---|---|
| KEVIN | XXXXXX | PUB | LOCKHEED MARTIN | RETIRED EXECUTIVE | YES |
| MIKE | XXXXXX | GYM | MIT GRADUATE | INVENTOR | YES |
| JOHN | XXXXXX | BUSINESS | GMU GRADUATE | CEO X CORP | YES |

Figures 17, 17A:
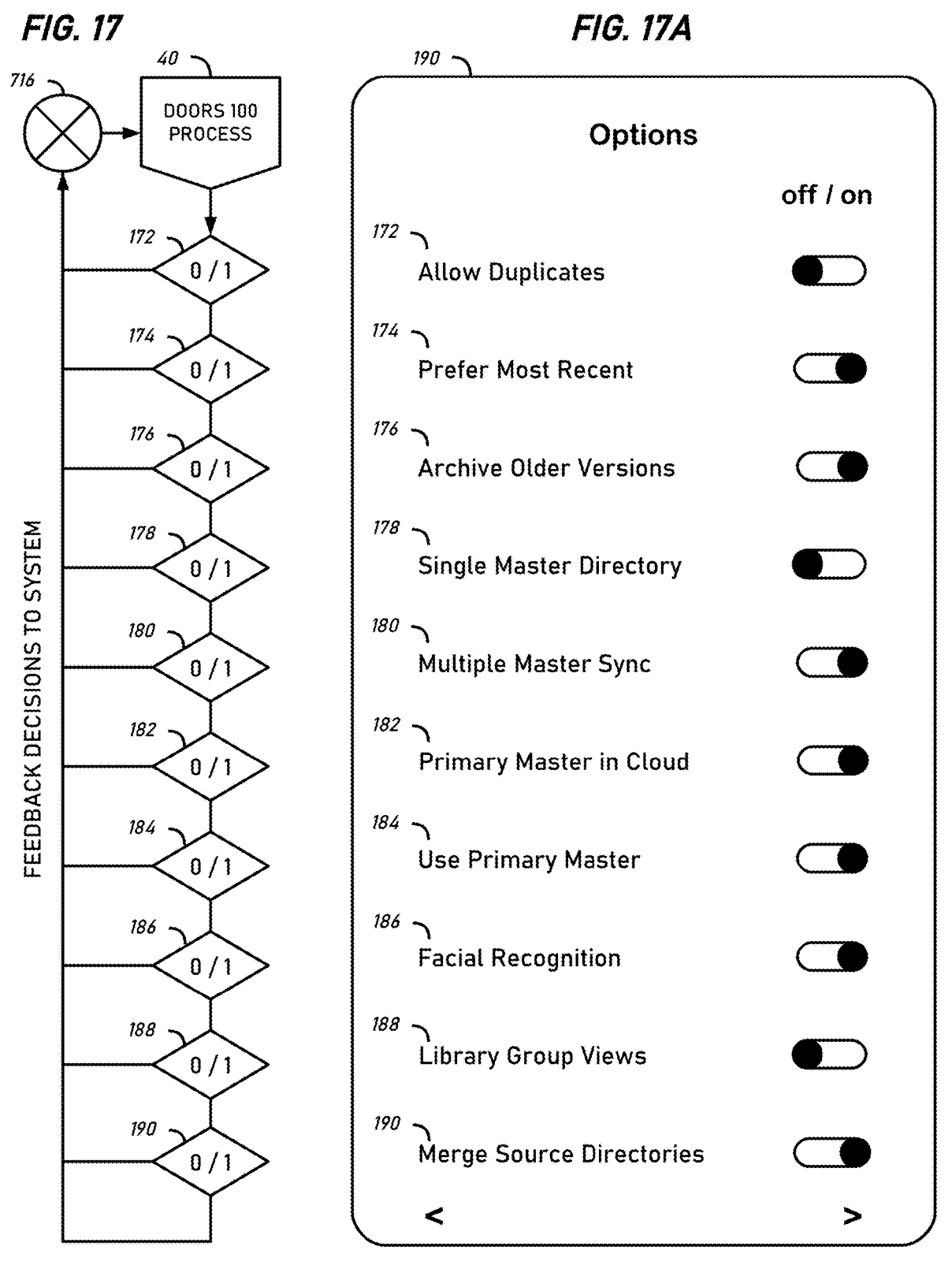

DOORS 100 PROCESS

FEEDBACK DECISIONS TO SYSTEM 172   0 / 1

Options off / on

172   Allow Duplicates

174   Prefer Most Recent

176   Archive Older Versions

178   Single Master Directory

180   Multiple Master Sync

182   Primary Master in Cloud

184   Use Primary Master

186   Facial Recognition

188   Library Group Views

190   Merge Source Directories

<        >

716

40

DOORS 100
PROCESS

FEEDBACK DECISIONS TO SYSTEM 216  0 / 1
218  0 / 1
220  0 / 1
222  0 / 1
224  0 / 1
226  0 / 1
228  0 / 1
230  0 / 1
232  0 / 1
234  0 / 1

214

Save-To Locations off / on

216  This Phone

218  Old Phone

220  Personal Computer A

222  Personal Computer B 224  iPad

226  LAN Drive

228  Employer's VPN Drive

230  Microsoft OneDrive

232  Google Drive

234  USB

<

TREE VIEW

TREE VIEW          *501*

TABULAR VIEWS

| DEVICE | DRIVE | LEVEL 1 | LEVEL 2 | LEVEL 3 |
|---|---|---|---|---|
| MARK'S PC | C | Temp | | |
| | | User | Pictures | Mark |
| | | | | Parents |
| | | | | Kids |
| | | | | Vacations |
| | | | Documents | Accounts |
| | | | | Research |
| | | | | Work |
| | | | | eBooks |

_440_   PC DATA

_540_   PHONE DATA

MERGE PHONE & PC   _660_

FIG.20 TREE VIEW   _403_

FIG.21 TREE VIEW   _503_

_501_

| DEVICE | DRIVE | LEVEL 1 | LEVEL 2 | LEVEL 3 |
|---|---|---|---|---|
| MARK'S PHONE | INTERNAL STORAGE | User | Pictures | Misc |
| | | | | Portfolio |
| | | | | Family |
| | | | | My Children |
| | | | Documents | Recipes |
| | | | | Notes |
| | | | | Expenses |
| | | | | Books |

| DEVICE | DRIVE | LEVEL 1 | LEVEL 2 | LEVEL 3 | LEVEL 4 |
|--------|-------|---------|---------|---------|---------|
| ONLINE | Cloud | MASTER | Pictures | Portfolio | |
| | | | | Family | Parents |
| | | | | | Kids |
| | | | | | Vacations |
| | | | Documents | Work | Research |
| | | | | | Expenses |
| | | | | | Accounts |
| | | | | Books | |
| | | | | Notes | |

FIG. 22C

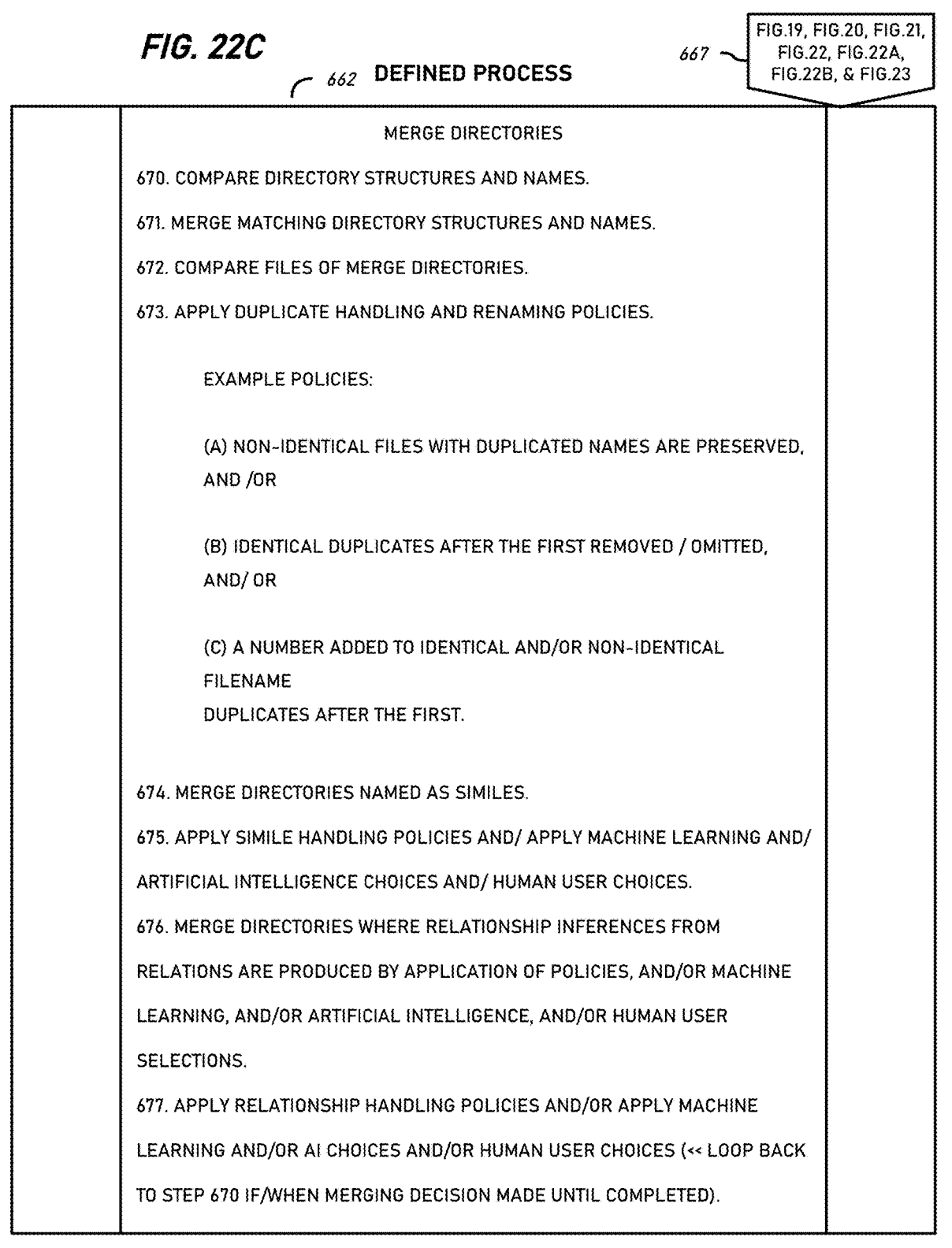

662 DEFINED PROCESS

667 ~ FIG.19, FIG.20, FIG.21, FIG.22, FIG.22A, FIG.22B, & FIG.23

MERGE DIRECTORIES

670. COMPARE DIRECTORY STRUCTURES AND NAMES.

671. MERGE MATCHING DIRECTORY STRUCTURES AND NAMES.

672. COMPARE FILES OF MERGE DIRECTORIES.

673. APPLY DUPLICATE HANDLING AND RENAMING POLICIES.

EXAMPLE POLICIES:

(A) NON-IDENTICAL FILES WITH DUPLICATED NAMES ARE PRESERVED, AND /OR (B) IDENTICAL DUPLICATES AFTER THE FIRST REMOVED / OMITTED, AND/ OR (C) A NUMBER ADDED TO IDENTICAL AND/OR NON-IDENTICAL FILENAME
DUPLICATES AFTER THE FIRST.

674. MERGE DIRECTORIES NAMED AS SIMILES.

675. APPLY SIMILE HANDLING POLICIES AND/ APPLY MACHINE LEARNING AND/
ARTIFICIAL INTELLIGENCE CHOICES AND/ HUMAN USER CHOICES.

676. MERGE DIRECTORIES WHERE RELATIONSHIP INFERENCES FROM

RELATIONS ARE PRODUCED BY APPLICATION OF POLICIES, AND/OR MACHINE

LEARNING, AND/OR ARTIFICIAL INTELLIGENCE, AND/OR HUMAN USER

SELECTIONS.

677. APPLY RELATIONSHIP HANDLING POLICIES AND/OR APPLY MACHINE

LEARNING AND/OR AI CHOICES AND/OR HUMAN USER CHOICES (<< LOOP BACK

TO STEP 670 IF/WHEN MERGING DECISION MADE UNTIL COMPLETED).

TREE VIEW 601

601

ADD TO DOORS
MASTER DIR
IN CLOUD DRIVE

FIG.26 & SYSTEM
PROCESS

135

Mark's
PC          400

Mark's
Phone       500

406    Cloud
Drive

MASTER
610

620
Pictures

622
Family

624
Portfolio

Parents
630

Kids
632

Vacations
634

774
More

770

```
Attributes: -

File: Mark Taylor.jpg
Date: 2023.04.28
Loc'n: Falls Church, VA, 22046

Class: Owner / User / Family
```

772

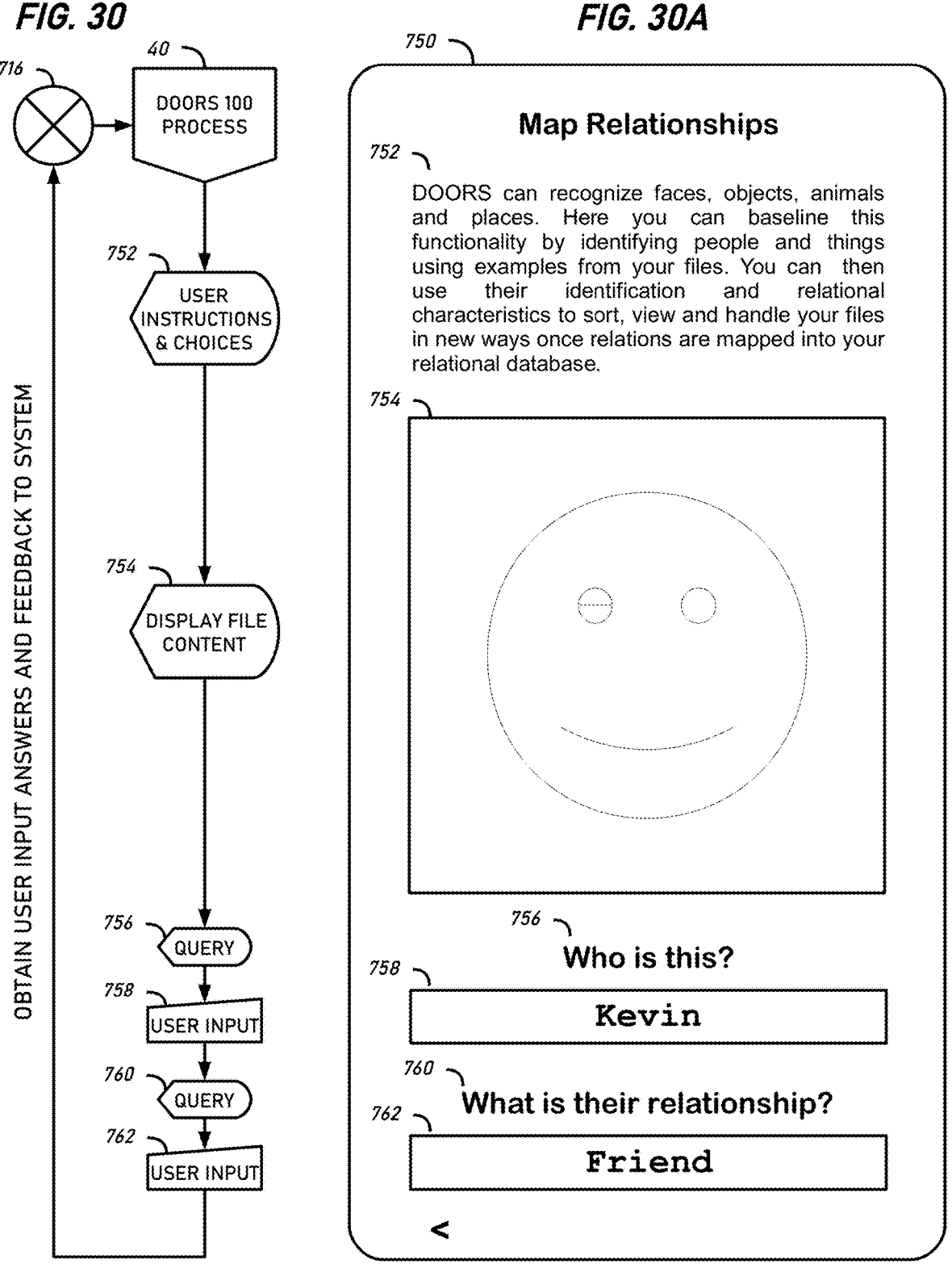

*40* DOORS 100 PROCESS

*716*

*752* USER INSTRUCTIONS & CHOICES

OBTAIN USER INPUT ANSWERS AND FEEDBACK TO SYSTEM

*754* DISPLAY FILE CONTENT

*756* QUERY

*758* USER INPUT

*760* QUERY

*762* USER INPUT

---

*750*

Map Relationships

*752* DOORS can recognize faces, objects, animals and places. Here you can baseline this functionality by identifying people and things using examples from your files. You can then use their identification and relational characteristics to sort, view and handle your files in new ways once relations are mapped into your relational database.

*754*

*756* Who is this?

*758* Kevin

*760* What is their relationship?

*762* Friend

Figures 32, 32A:
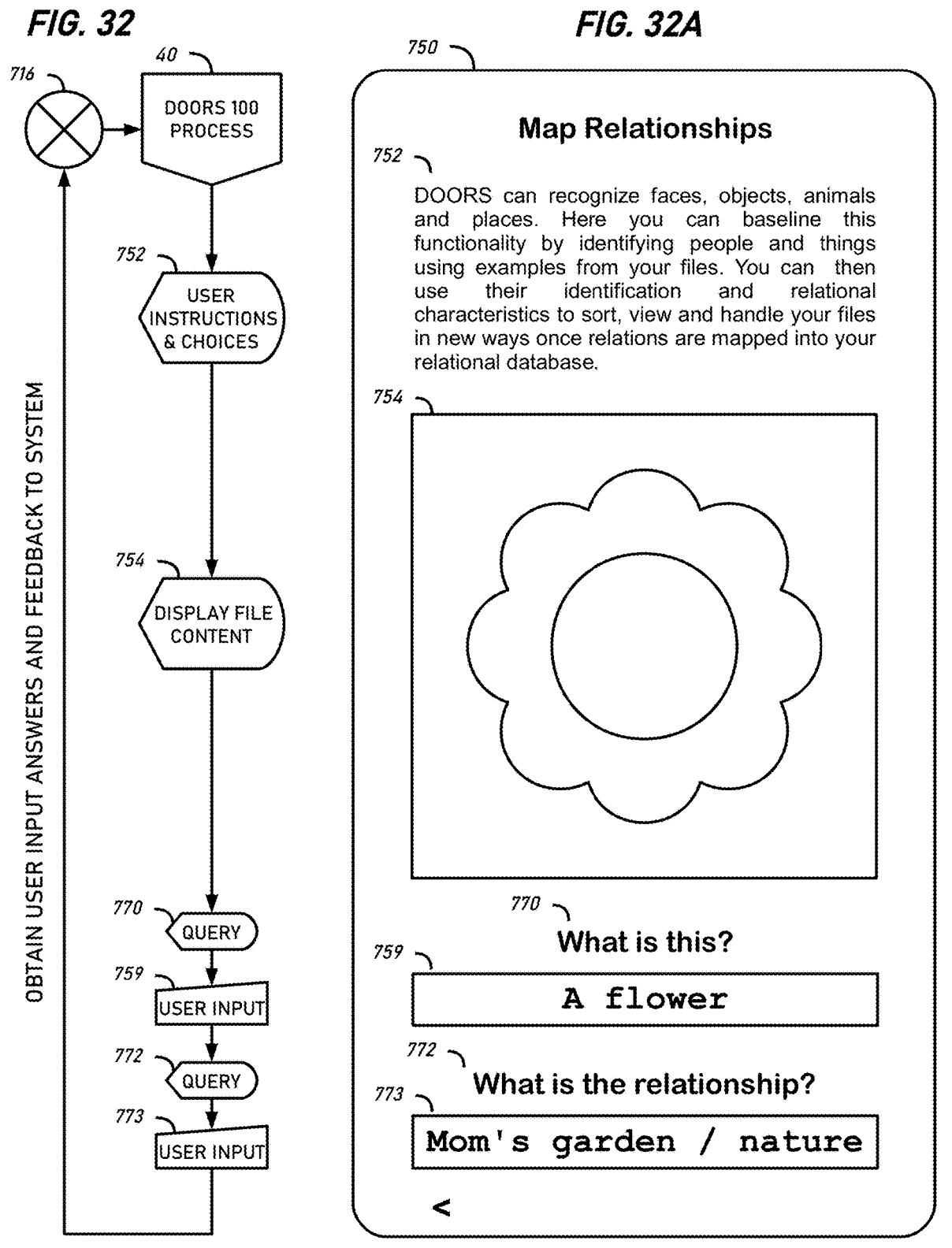

DOORS 100
PROCESS

*752*

USER
INSTRUCTIONS
& CHOICES

*754*

DISPLAY FILE
CONTENT

*770*

QUERY

*759*

USER INPUT

*772*

QUERY

*773*

USER INPUT

OBTAIN USER INPUT ANSWERS AND FEEDBACK TO SYSTEM

Map Relationships

*752*

DOORS can recognize faces, objects, animals and places. Here you can baseline this functionality by identifying people and things using examples from your files. You can then use their identification and relational characteristics to sort, view and handle your files in new ways once relations are mapped into your relational database.

*754*

*770*

What is this?

*759*

A flower

*772*

What is the relationship?

*773*

Mom's garden / nature

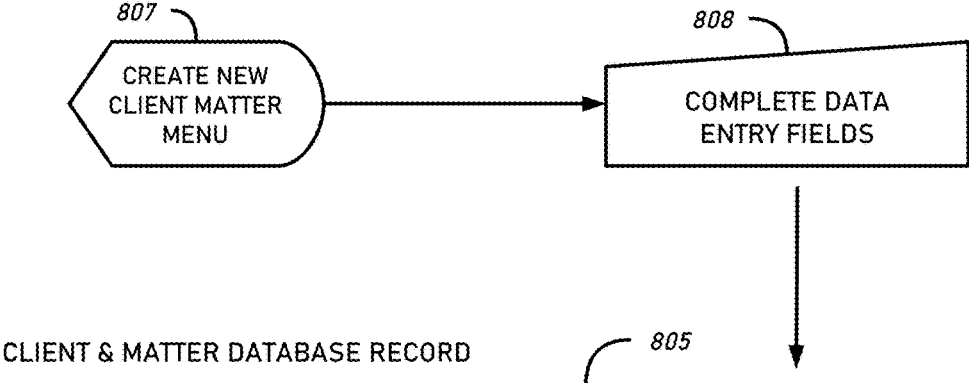

807 — CREATE NEW CLIENT MATTER MENU

808 — COMPLETE DATA ENTRY FIELDS

CLIENT & MATTER DATABASE RECORD    805

| | |
|---|---|
| CLIENT | *Systems Design Innovation LLC [SDI]* |
| DIRECTORY | *Cloud/MASTER/Documents/Clients/SDI/SDI001* |
| DATE | *07/04/2019* |
| NUMBER OF MATTER | *001* |
| MATTER | *SDI001* |
| CONTACT | *Mark Taylor* |
| TEL | *+1 571-338-1677* |
| EMAIL | *mark@systemsdi.com* |
| ADDRESS | *301 West Broad Street, Suite 226, Falls Church, VA, 22046* |
| DESCRIPTION OF PROJECT | *Prepare and file provisional patent application on Time Randomizing Interface Language Protocol Encryption (TRIPLE).* |
| CLIENT'S REFENCE | *SDI/MT/TRIPLE* |
| RELATED MATTERS | |
| NOTES | |
| PAYMENT HISTORY | |
| PRIMARY FEE EARNER | Joe Black [JXB] |

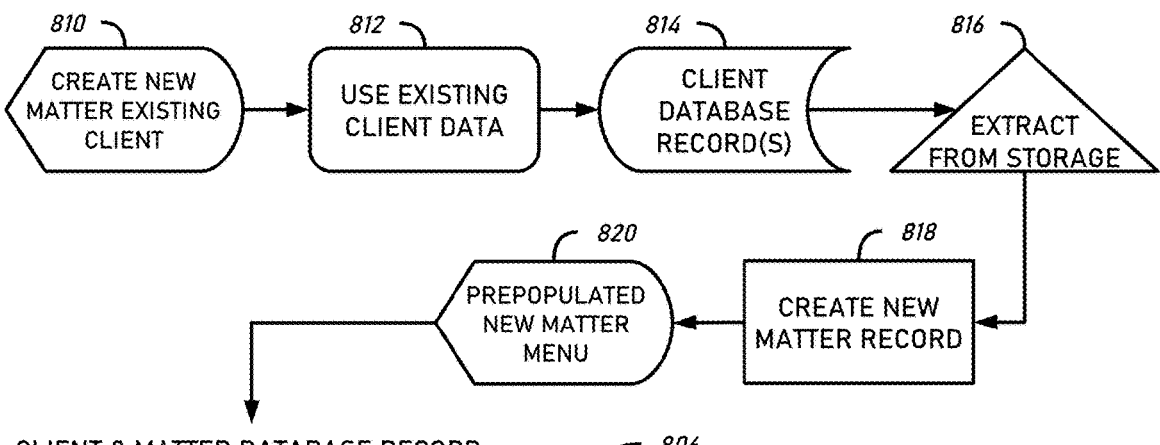

CLIENT & MATTER DATABASE RECORD          806

| | |
|---|---|
| CLIENT | Systems Design Innovation LLC [SDI] |
| DIRECTORY | *Cloud/MASTER/Documents/Clients/SDI/*SDI018 |
| DATE | 09/04/2024 |
| NUMBER OF MATTER | 018 |
| MATTER | SDI018 |
| CONTACT | Mark Taylor |
| TEL | +1 571-338-1677 |
| EMAIL | mark@systemsdi.com |
| ADDRESS | 301 West Broad Street, Suite 226, Falls Church, VA, 22046 |
| DESCRIPTION OF PROJECT | |
| CLIENT'S REFENCE | |
| RELATED MATTERS | SDI001, SDI002,SDI003, SDI004, SDI005, SDI006, SDI007, SDI008, SDI009, SDI010, SDI11, SDI012, SDI013, SDI014, SDI015, SDI016, SDI017 |
| NOTES | Some client applications are under Secrecy Orders. |
| PAYMENT HISTORY | Excellent |
| PRIMARY FEE EARNER | Joe Black [JXB] |

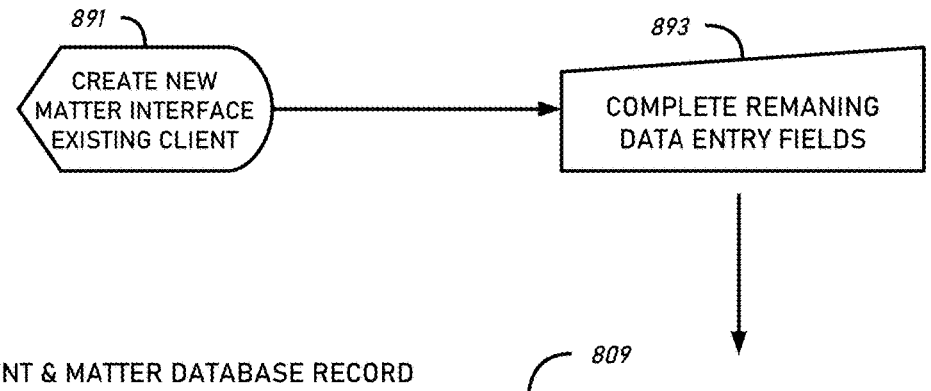

891 CREATE NEW MATTER INTERFACE EXISTING CLIENT

893 COMPLETE REMANING DATA ENTRY FIELDS

CLIENT & MATTER DATABASE RECORD    809

| | |
|---|---|
| CLIENT | Systems Design Innovation LLC [SDI] |
| DIRECTORY | *Cloud/MASTER/Documents/Clients/SDI/SDI018* |
| DATE | 07/04/2019 |
| NUMBER OF MATTER | 018 |
| MATTER | SDI018 |
| CONTACT | Mark Taylor |
| TEL | +1 571-338-1677 |
| EMAIL | mark@systemsdi.com |
| ADDRESS | 301 West Broad Street, Suite 226, Falls Church, VA, 22046 |
| DESCRIPTION OF PROJECT | *Prepare and file non-provisional patent application on a data organizer optimizing reconciling systems (DOORS).* |
| CLIENT'S REFENCE | *SDI/MT/DOORS* |
| RELATED MATTERS | SDI001, SDI002,SDI003, SDI004, SDI005, SDI006, SDI007, SDI008, SDI009, SDI010, SDI11, SDI012, SDI013, SDI014, SDI015, SDI016, SDI017 |
| NOTES | Some client applications are under Secrecy Orders. |
| PAYMENT HISTORY | Excellent |
| PRIMARY FEE EARNER | Joe Black [JXB] |

DOS DIRECTORY VIEW    *864*

```
MASTER:/SDI/SDI018/

MASTER:/SDI/SDI018/SDI018_SPECIFICATION.DOCX

MASTER:/SDI/SDI018/SDI018_CLAIMS.DOCX

MASTER:/SDI/SDI018/SDI018_ABSTRACT.DOCX

MASTER:/SDI/SDI018/SDI018_DRAWINGS.PDF

MASTER:/SDI/SDI018/SDI018_MEETING_03.20.2024

MASTER:/SDI/SDI018/SDI018_PETITION.DOCX

MASTER:/SDI/SDI018/DRAFTS/

MASTER:/SDI/SDI018/RECONCILE/
```

*865*

FIG. 39

EXMAPLE ATTRIBUTES    *866*

*868*

FILE INTRINSIC ATTRIBUTES:

- META DATA

- PROPERTIES

- OWNER

- AUTHOR

- SIZE

- DATE MODIFIED

- DATE CREATED

- EDITING HISTORY

- CONTENT

*870*

FILE EXTRINSIC ATTRIBUTES:

- LOCATION

- FILE NAME

- FILE TYPE / EXTENSION

- RELATED FILES

- LOCATIONS OF RELATED FILES

- INTRINSIC ATTRIBUTES OF RELATED FILES

- RELATED PEOPLE

- OTHER RELATED FACTS

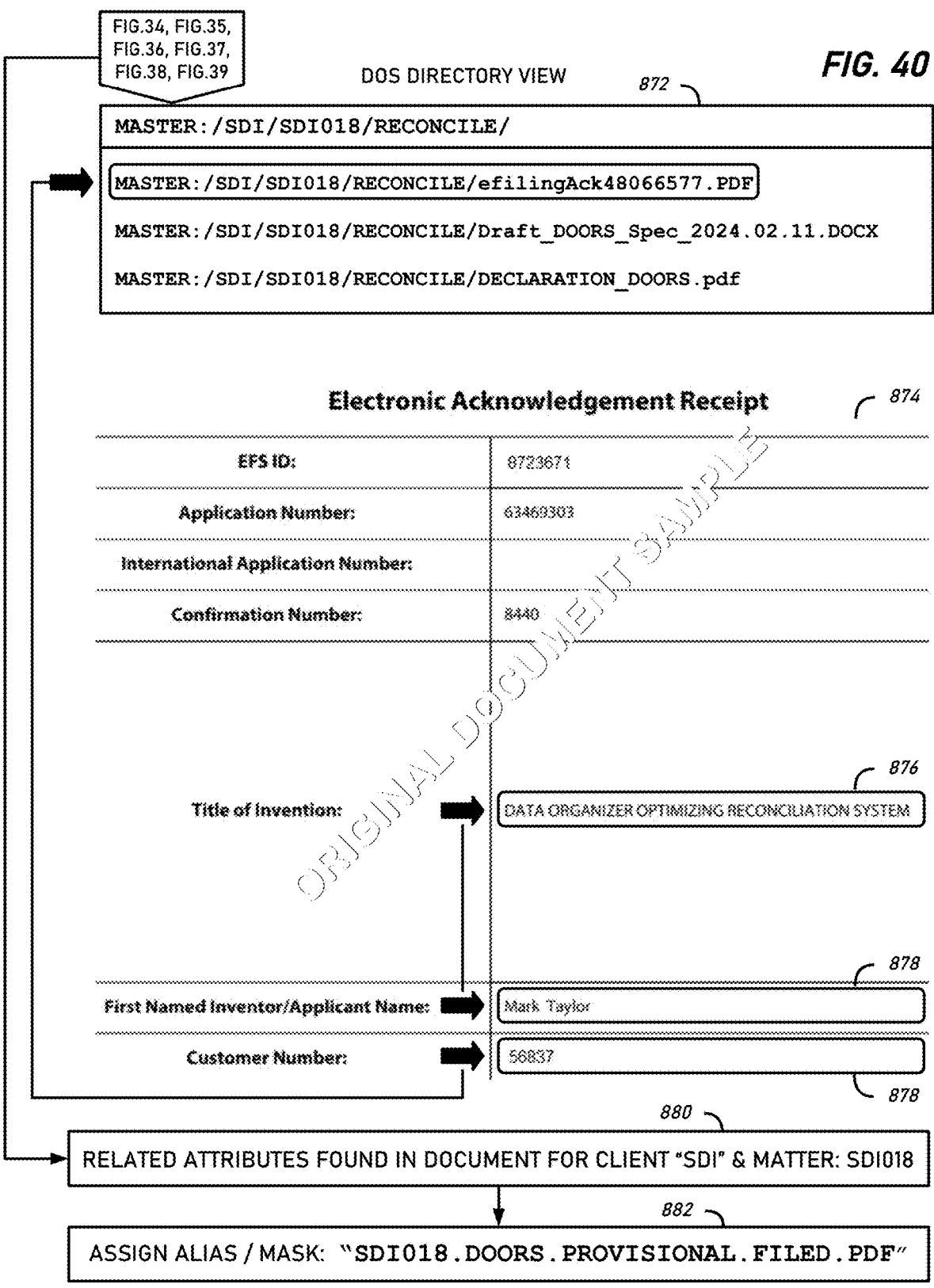

DOS DIRECTORY VIEW   872

MASTER:/SDI/SDI018/RECONCILE/

MASTER:/SDI/SDI018/RECONCILE/efilingAck48066577.PDF

MASTER:/SDI/SDI018/RECONCILE/Draft_DOORS_Spec_2024.02.11.DOCX

MASTER:/SDI/SDI018/RECONCILE/DECLARATION_DOORS.pdf

Electronic Acknowledgement Receipt   874

| EFS ID: | 8723671 |
|---|---|
| Application Number: | 63469303 |
| International Application Number: | |
| Confirmation Number: | 8440 |
| Title of Invention: | DATA ORGANIZER OPTIMIZING RECONCILIATION SYSTEM |
| First Named Inventor/Applicant Name: | Mark Taylor |
| Customer Number: | 56837 |

876

878

878

880 — RELATED ATTRIBUTES FOUND IN DOCUMENT FOR CLIENT "SDI" & MATTER: SDI018

882 — ASSIGN ALIAS / MASK: "SDI018.DOORS.PROVISIONAL.FILED.PDF"

FIG. 41

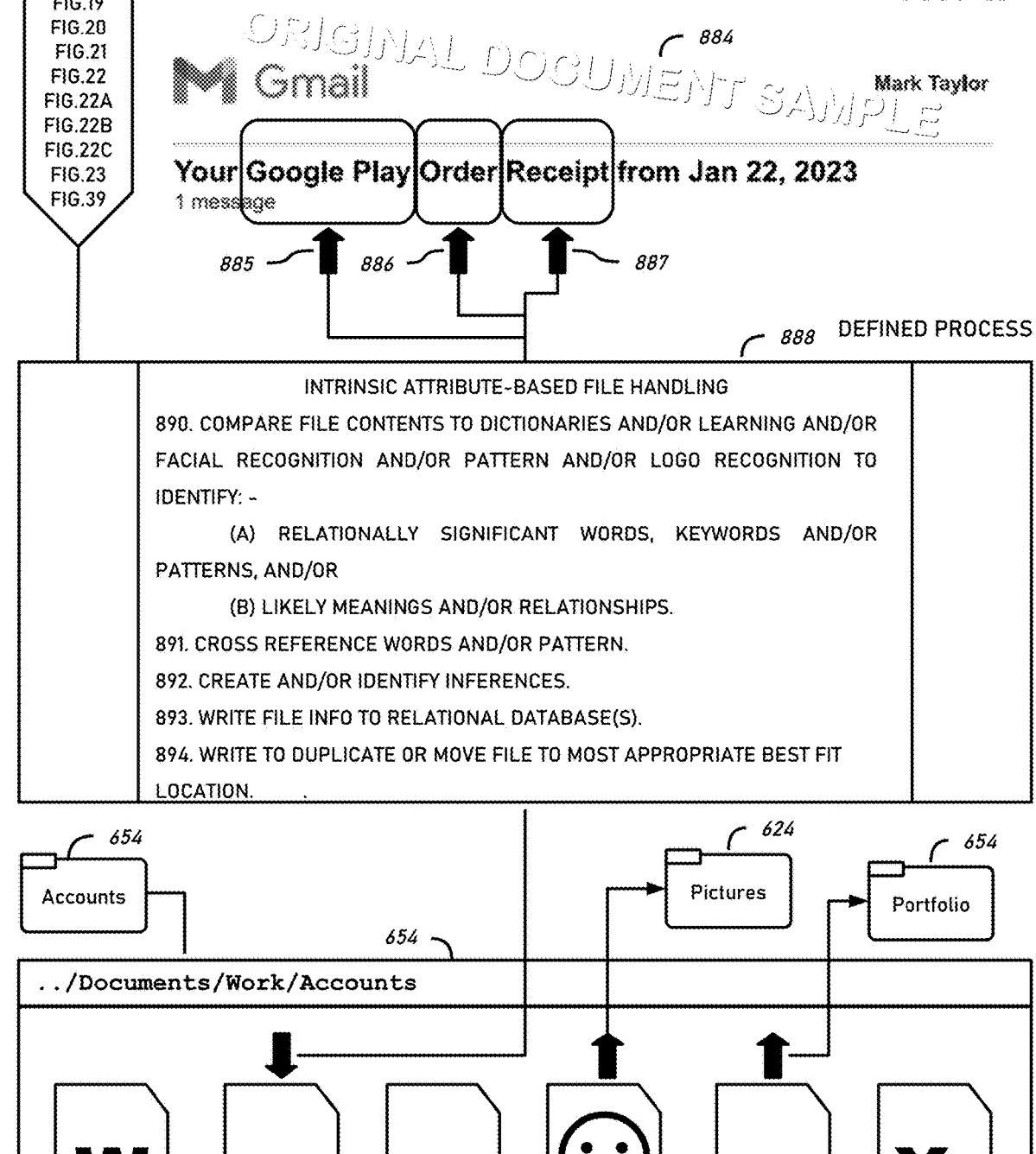

Gmail      Mark Taylor

Your Google Play Order Receipt from Jan 22, 2023
1 message

*885*    *886*    *887*

*888*   DEFINED PROCESS

INTRINSIC ATTRIBUTE-BASED FILE HANDLING

890. COMPARE FILE CONTENTS TO DICTIONARIES AND/OR LEARNING AND/OR FACIAL RECOGNITION AND/OR PATTERN AND/OR LOGO RECOGNITION TO IDENTIFY: -

(A) RELATIONALLY SIGNIFICANT WORDS, KEYWORDS AND/OR PATTERNS, AND/OR (B) LIKELY MEANINGS AND/OR RELATIONSHIPS.

891. CROSS REFERENCE WORDS AND/OR PATTERN.

892. CREATE AND/OR IDENTIFY INFERENCES.

893. WRITE FILE INFO TO RELATIONAL DATABASE(S).

894. WRITE TO DUPLICATE OR MOVE FILE TO MOST APPROPRIATE BEST FIT LOCATION.

*654*

Accounts      *624* Pictures    *654* Portfolio

*654*

../Documents/Work/Accounts

W    PDF    ::    ☺    CAD    XL

Marks Assets   Google email   Home System   Holly Birthday 9   Drone Designs   SDi Accounts

Figure 42:
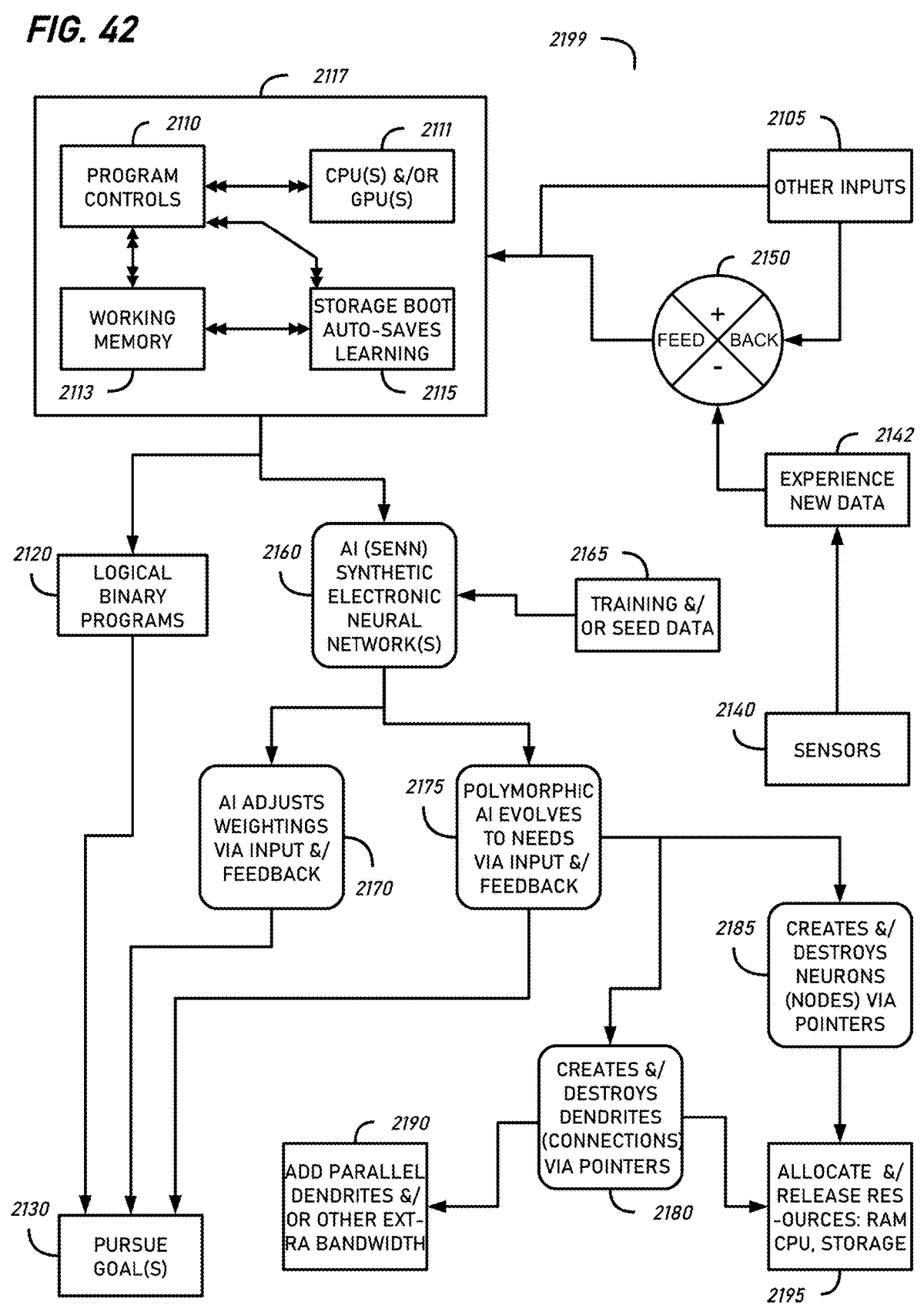

2110
PROGRAM CONTROLS

2111
CPU(S) &/OR GPU(S)

2113
WORKING MEMORY

2115
STORAGE BOOT AUTO-SAVES LEARNING

2105
OTHER INPUTS

2150
FEED + BACK -

2142
EXPERIENCE NEW DATA

2120
LOGICAL BINARY PROGRAMS

2160
AI (SENN) SYNTHETIC ELECTRONIC NEURAL NETWORK(S)

2165
TRAINING &/ OR SEED DATA

2140
SENSORS

AI ADJUSTS WEIGHTINGS VIA INPUT &/ FEEDBACK

2175
POLYMORPHIC AI EVOLVES TO NEEDS VIA INPUT &/ FEEDBACK

2170

2185
CREATES &/ DESTROYS NEURONS (NODES) VIA POINTERS

2190
ADD PARALLEL DENDRITES &/ OR OTHER EXT- RA BANDWIDTH

CREATES &/ DESTROYS DENDRITES (CONNECTIONS) VIA POINTERS

2180

ALLOCATE &/ RELEASE RES -OURCES: RAM CPU, STORAGE

2195

2130
PURSUE GOAL(S)

DATA ORGANIZER OPTIMIZING RECONCILIATION SYSTEMS

CROSS-REFERENCE TO RELATED APPLICATIONS

This application claims benefit under 35 U.S.C. § 119(e) of U.S. Application having Ser. No. 63/469,303 filed May 26, 2023. The application also claims benefit to U.S. application Ser. No. 18/439,687 filed Feb. 2, 2024, which are hereby incorporated by reference herein in its entirety.

FIELD

The subject disclosure relates to file management and storage within the field of information technology.

BACKGROUND

The number of data producing and handling devices is expanding, including into many portable platforms. Most of which are now more than mere word processing and analytical tools. Many of the growing number of devices most people use include computer processors and are capable of data acquisition, file creation, and storage. These devices include personal computers, tablets, scanners, cameras, and smart-phones. From which proliferation of data producing and handling devices, there has been a corresponding proliferation of personal, and work-related digital information. Some of which is stored on those devices, and or over networks, including the Internet in a growing number of file formats and types; often including within them meta-data that pertains to their characteristics.

There is also often an intermixing of personal and work-related data in and across devices due to overlaps between the work and personal lives of users. This cross-population of user data on devices can be a particular problem for persons whose work is of a confidential, sensitive, or secret nature. For example, in 2016 the Inventor suffered a large loss of personal data when his motel room was accessed by some hands-on cyber criminals who damaged his computer in the process of stealing intellectual property from him. Some of that personal data which was damaged or lost was truly precious and irreplaceable. More recently the Inventor has suffered both a ransomware attack and another breach of his security that included attempts to gain control of his online accounts. The effects of which on his personal data were mitigated by backups and cloud storage.

However, fixing the data breach, removing the high-end trojan applications left behind on his systems necessitated various resetting and data wiping processes. After which the Inventor then had to reinstall those systems, and to reconstruct both his personal, business, and investment related files from an assortment of devices and drives. Which cost a lot of time and effort over several days.

Our devices are increasingly connected to cellular telephone and other data handling networks. Which provide Internet access, there is also a return to the old paradigm of wide area networked (WAN) devices. With much user data being backed up to and or wholly stored into online "Cloud" storage. Which is reminiscent of the intuitively interfaced local storage users have become used to working with on their devices.

As connectivity and the bandwidth thereof expands all the moreso the trend back towards the WAN paradigm, reborn in Cloud computing is leading to the creation of vast data centers to store the mountains of data being produced. The trend-growth of which may be exponential for the foreseeable future. Large amounts of data are being warehoused now, for later decryption, once Quantum Computing becomes economically capable of cracking the math of encryption in the state of the art. Evidence of crimes happening now may thus become available to law enforcement agencies in the future. This stockpiling of data in bulk may also be a long-term project for intelligence agencies.

For all these reasons, the task of storing data, and organizing it into meaningful, easy to use structures has created a time-consuming job, that is escalating in magnitude. Which individual users as well as large corporations and government agencies have to endure. Often different versions of personal files and folders tend to get proliferated in similar but non-identical versions as users try to recreate a similar experience across different devices. This process entails much manual viewing, assessing, sorting and sifting and lost time in performing those chores. As well as sadness, frustration, and economic costs caused by permanently losing valuable files. Leading to a real cost to individual users and to the economy, comprising lost files, lost precious memories, lost documents and lost time spent trying to preserve, organize, and migrate user and or organization data over their lifetime's worth of legacy and new replacement devices and systems. But at least for individual users they mostly can recall the gist of where they put their favorite pictures and important documents, as well as their idiosyncratic uses of file names etc.

However, pity the poor legal secretary who inherits a vast filing system from retired staff. Which systems have been absorbing new user files in new matters for decades. As well as being subjected to the idiosyncrasies of every lawyer and secretary who ever worked at the firm and where some employees may have saved work into local hard drives rather than the firm's networked resources. This is a potential nightmare of lost files and economic damage to the law firm and to clients.

Indeed, other professional services firms in fields as diverse as medical doctors, accountants, and consulting engineers may all have their own versions of these data preservation and management problems. Furthermore, in some sectors such as banking there may be statutory minima for which data must be retained, and accessible. For example, if an accountant's clients fall under IRS audit; or where a civil engineering project becomes subject to litigation on aspects of its designed architectures. In aviation the burdens may be critical and lives may depend on accurate data logging, analysis, and retrieval. Such as where flight-data is streamed from avionics instrumentation for safety critical analysis, and in the event an accident were to occur. Then the abilities to manage and retrieve such critical data may be vital to large organizations including the aviation operating corporates, their aviation systems manufacturers and maintenance contractors. This is true for civilian and military aviation. More examples of the uses and benefits these subject technologies could be added though not all have been included here.

USB (universal serial bus) drives, and SD card (secure digital card, a proprietary non-volatile, flash memory card format, licensed by SD-3C LLC) drives can and do fail. Which may be typical of a mobile phone user's experience, in which many un-printed but precious pictures may become lost or inaccessible over time. Followed most recently by newer applications also allowing devices to backup or duplicate some files to cloud drives such as Microsoft's® OneDrive®. The rather clunky and unreliable ability to back up one device to a cloud-based location assisted by a helper application is just about the current state of the art for smart phones.

The Inventor has suffered a lot of data theft aimed at his intellectual property, as well as related collateral damage to his systems, disruption and loss of secret and personal data over many years. Causing the very costly loss of valuable inventions that appear to have been stolen and then sold on the black market. Some of which have been infuriatingly laundered and become commercially successful. QR (quick reference) codes (previously called by the Inventor Variable Information Service Transaction Area "VISTA") are one such stolen and laundered technology. Wherein the Inventor designed the layout and purpose of the visual codes we all scan on our phones without thinking. Others include aspects of multi-factor identification and Internet banking, online banking, and randomization of data addressing for improved security. This is not even a full list of all the various technologies Invented by and stolen from the Inventor.

What appears to have happened was that the Inventor's defense related inventions drew attention from hostile spies of adversary states such as Russia. Unfortunately, it seems to be the case that they steal everything they can. The defense related thefts go to the hostile state, but the non-defense related thefts however seem to get laundered to create a pedigree backstory, from where they can wind up being purchased by big tech. Like laundered money may be unwittingly accepted by honest people. Those adverse events in some ways created the necessity and hence have been "mother of invention" for these subject technologies.

In 2022 the Inventor suffered another intrusion event which prompted another cycle of data restoration from backups and a massive effort to reconcile files. The disentangling of secret data and personal data across various devices has been a long and arduous but necessary task. As has been the attempt to impose order on important documents, and photographs of friends and family from a lifetime of 59 years. Which is the point at which the Inventor said to himself. "There has to be a better, less time intensive, and tedious way to do this."

SUMMARY

In one aspect of the disclosure, a process for reconciling electronic files is provided. The process includes interrogating a plurality of electronic files. Intrinsic attributes and extrinsic attributes are identified from the plurality of electronic files. The identified intrinsic attributes and extrinsic attributes are mapped into a relational database. An artificial intelligence engine determines relationships between the plurality of files based on the mapped intrinsic and extrinsic attributes. Candidate related files are identified based on the determined relationships. A group of identified candidate related files are displayed.

In another aspect of the disclosure, a computer program product for reconciling electronic files is provided. The computer program product includes a non-transitory computer readable storage medium having computer readable program code. The computer readable program code is configured, when executed by a processor, to interrogate a plurality of electronic files. Intrinsic attributes and extrinsic attributes are identified from the plurality of electronic files. The identified intrinsic attributes and extrinsic attributes are mapped into a relational database. An artificial intelligence engine determines relationships between the plurality of files based on the mapped intrinsic and extrinsic attributes. Candidate related files are identified based on the determined relationships. A group of identified candidate related files are displayed.

In yet another aspect of the disclosure, a computing device is provided. The computing device includes a processor operating a dashboard user interface. Memory is coupled to the processor. The memory stores instructions to cause the processor to perform acts including interrogating a plurality of electronic files. Intrinsic attributes and extrinsic attributes are identified from the plurality of electronic files. The identified intrinsic attributes and extrinsic attributes are mapped into a relational database. An artificial intelligence engine determines relationships between the plurality of files based on the mapped intrinsic and extrinsic attributes. Candidate related files are identified based on the determined relationships. A group of identified candidate related files are displayed.

It should be understood that many other possible configurations and combinations of the subject technology will become readily apparent to those skilled in the art from this specification generally and the following detailed description, wherein various configurations of the subject technology are shown and described by way of illustration. As will be realized, the subject technology is capable of other and different configurations or combinations and its several details are capable of modification in various other respects, all without departing from the scope of the subject technology. Accordingly, the drawings and detailed description are to be regarded as illustrative in nature and not restrictive.

BRIEF DESCRIPTION OF THE DRAWINGS

FIG. 1A is a system diagram of a defined process according to the subject technologies.

FIG. 8 is a schematic diagram of relational data according to an aspect of the subject technologies.

FIG. 9 is a system block diagram of an array according to the subject technologies.

FIG. 13 is a system block-flow diagram, of various aspects of the subject technologies.

FIG. 14 is a relational database record according to an aspect of the subject technologies.

FIG. 15 is a relational database record according to an aspect of the subject technologies.

FIG. 17 is a system block-flow system diagram of an interface according to the subject technologies.

FIG. 17A is an interface display screen according to the subject technologies.

FIG. 22A is a mixed schematic and system block flow diagram of operations in accord with aspects of the subject technologies.

FIG. 22C is a system block flow diagram of a defined process in accord with aspects of the subject technologies.

FIG. 30 is a system block-flow system diagram of an interface according to the subject technologies.

FIG. 30A is an interface display screen according to the subject technologies.

FIG. 32 is a system block-flow system diagram of an interface according to the subject technologies.

FIG. 32A is an interface display screen according to the subject technologies.

FIG. 34 is a mixed schematic and system block-flow diagram, detailing an aspect of operation on a database according to the subject technologies.

FIG. 35 is a mixed schematic and system block-flow diagram, detailing an aspect of operation on a database according to the subject technologies.

FIG. 36 is a mixed schematic and system block-flow diagram, detailing an aspect of operation on a database according to the subject technologies.

FIG. 37 is a mixed schematic and system block-flow diagram, detailing an aspect of operation on data within a directory structure according to the subject technologies.

FIG. 38 is an interface view of a DOS directory operated according to an aspect of the subject technologies.

FIG. 39 is a schematic view of file attributes according to an aspect of the subject technologies.

FIG. 40 is a mixed schematic and system block flow diagram of an aspect of the subject technologies.

FIG. 41 is a mixed schematic and system block flow diagram of an aspect of the subject technologies.

FIG. 42 is a system block flow diagram of aspects of the subject technologies.

DETAILED DESCRIPTION

Figure 1:
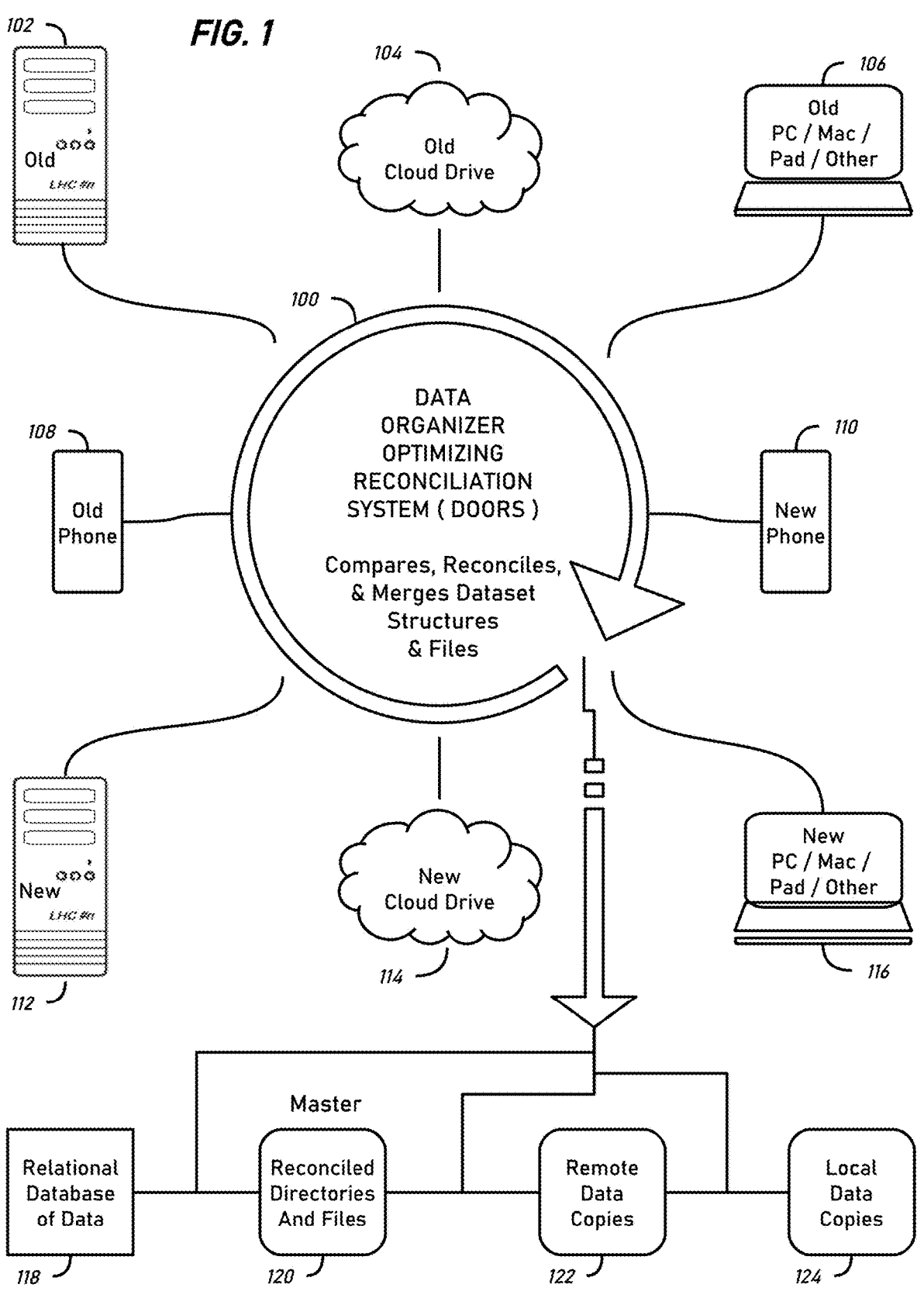
FIG. 1 is a mixed schematic and system block-flow diagram, providing an overview of various aspects of the subject technologies.

The detailed description set forth below is intended as a description of various configurations and/or combinations of the subject technologies and is not intended to represent the only possible configurations and/or combinations in which the subject technologies may be practiced. The appended drawings are incorporated herein and constitute part of the detailed description. The detailed description includes specific details for the purpose of providing a thorough understanding of the subject technology. However, it will be apparent to those skilled in the art that the subject technologies may be practiced without these specific details. Like or similar components may be labeled with identical element numbers for ease of understanding.

In general, embodiments of the subject technologies improve upon the state of the art, and/or their applications. Other possible embodiments may also improve upon the state of the art. In the drawings this symbol "&" means "and", this symbol "/" means "or" and this combination "&/" means "and/or".

The subject technology includes the aggregation and migration of data and files from and/or to a plurality of sources and systems, referred to herein as data organizer optimizing reconciliation systems ("DOORS"). Including porting data from legacy systems into newer systems and or networked resources. Specific functions of which may include making backups, comparisons, cataloging, other analysis, aggregation, preservation, or reproduction, organization, optimization, reconciliation of versions etc., and the presentation of data.

In the art, many of these functions are accomplished in part by methods controlled and/or operated by users. Human users may vary over time in the case of personal habits and idiosyncrasies, which tendencies and variations may be more pronounced in corporate systems that are operated by multiple users. This disclosure also includes the use of artificial intelligence (AI) and/or machine learning (ML). It is also envisaged and intended that an artificial intelligence may also become a user of these subject technologies within the life of this patent.

As used herein, reconcile or reconciliation may mean to take a plurality of data sets with a relationship, spread over one or multiple devices and moving those data sets into one file system. Reconcile or reconciliation may sometimes mean having different versions of a same file and naming the different files similarly InventionX.v.1.docx, InventionX.v.101 and also with multiple versions of a file comparing them internally (for example, through image recognition, to recognize different versions of the same image/video etc.). Some embodiments of reconciliation may include the destruction of 100% duplicates and obsolete versions of a file via applying policies; for example, retaining only the last two versions of a document, and deleting earlier versions older than a predetermined time (e.g., 1 year). So that over time redundant files are removed, but final/last versions remain available.

To provide a logical, and intuitively accessible filing system the AI/ML elements may learn naming and file placement habits and rules of systems operated by corporate users so that it should be apparent to a human user and an AI engine where any file should be kept and approximately what the file will be named.

The reconciliation aspect of which may entail reconciling a plurality of data sets of related files that are in disparate locations within the storage systems of multiple devices. Reconciling those data sets by merging them into a file system structure is a first type of reconciliation. Reconciliation may include the steps of identifying related directories and files from multiple sources, then either creating a library of links to them (which may be within a relational database) and/or creating a new directory structure into which they are copied. A naming convention may be applied to the reconciled files, where aspects such as their date and editing history may be used to set them into order, which order may be capable of providing different views by switching parameters. The attributes of files and directories including relationships between them and to real world facts may be interpreted and used to make inferences from which to suggest or operate the elimination of duplicates and merging of versions of files; as well as deciding where to store them within directory structures, including the names of those directories.

Reconciliation may also include the destruction of duplicates and obsolete versions via applying policies; with more intuitive embodiments that may include AI or ML and may be capable to make those choices autonomously. By way of example policies may include naming conventions and the use of a parameter being set to retain only the last two versions of a document, and/or deletion of earlier versions older than an age parameter. So that over time redundant files may be identified and removed, or preserved according to user preferences. Furthermore, an AI or ML helper module may learn such policies from observing user habits and preferences over time, or from a stock of training data, or even by mining legacy data. Such as corporate backups as well as current working datasets.

Furthermore, reconciliation may include the reconciliation of versions of files entailing identifying them from their contents or filenames or both, then naming them similarly.

For example, files might be reconciled into files with the names InventionX.v.1.docx, InventionX.v.101.docx and also with multiple versions of a file, and may include comparing them internally to ascertain intrinsic attributes. As used herein, "intrinsic" refers to attributes inside a file (for example, pixels that may be used for facial recognition, or text/machine language that may be recognized as metadata, or used for document analysis (e.g. keywords)). As may be appropriate in the further example of image recognition, and recognizing different versions of the same image, video, or sound recording whether in a regular user's smartphone or a movie editing business.

To provide a logical, and intuitively accessible filing system the AI or ML engine may learn naming and file placement habits, conventions, and rules of systems operated from smartphone users on up through corporates and everything in between. So that in each case of a DOORS implementation it should be discernable to its human user, or corporate user and/or an AI module where any file should probably be kept within a system's directory structures, and approximately what the file is likely to be named.

The subject technologies may be used for aggregating data from one device or from a diverse plurality of sources and devices. So that a user's data from their digital lifetime as recorded in multiple devices over many years may be sensibly and intuitively aggregated and organized into a directory structure that is in a style and nomenclature that is optimally based on the user's own style and habits of naming conventions and storage locations and structures. Like, similar, or related files and directory structures may be merged according to these principles to form a DOORS Master copy of the sum total or a subset of the user's data. The DOORS Master copy may replace all other versions of their data which may be fragmented across a plurality of legacy devices and systems, and or to back up their data as is, or into an organized optimized and reconciled DOORS Master copy to provide a more readily functional and useable data storage, handling, processing, and retrieval capability. Which in turn may save users a great deal of time and inconvenience in the tasks of comparing file versions, directory structure versions, with duplicates, partial duplicates, similar, and varying versions of the same directories and or files and related directories and files.

The saving of time spent doing this very tedious chore for individual users as well as corporate entities may free up personal time for recreation, and free up worker time for more productive and gainful activities. Consequently, a DOORS may increase the utility that users gain from operating their devices and more effectively finding, accessing, and using their data. Increase their leisure time, and with those things increase quality of life for users. While also helping to improve the efficiency and hence profitability of corporations that may benefit also from productivity gains. Because employees may spend less time finding files, wading through similar and or related directory structures. Leaving them with more time for higher value activities. Thus, helping to improve productivity.

The more efficient use of time and resources provided by a DOORS may also increase the efficiency of information technology (IT) systems by reducing the time spent interrogating them, and in duplication of effort plus duplication of redundant duplicates of files and directories, as well as reducing the need to compare multiple versions of directories and files. That is often caused by the proliferation of messy and fragmented data both within and across multiple devices and systems. In the ways that people function both at leisure and in work situations. As well as assisting user access times for finding and using their data. With directory structures and naming conventions based on the user's prior practices which may be used to train artificial intelligence or develop machine learning helper modules within the DOORS.

Furthermore, alternative ways of presenting files, by type, date, location, or by their cross-referenced relationships, or class—to other aspects such as their function or purpose of the user data may all help DOORS processing to achieve new levels of efficacy.

Artificial intelligence and/or machine learning is likely to also improve in efficacy and capabilities over the life of these subject technologies. Those improvements in such enabling technologies will if anything compliment these subject technologies. Because DOORS may incorporate improvements in the supporting and enabling technologies without deviating from the subject technologies.

FIG. 1 provides a top-level schematic and system view of one embodiment of DOORS 100. DOORS 100 compares, catalogs, merges, and reconciles data set structures and files locally, and/or on mutually connected systems and data storage resources. DOORS 100 may be run on any smart device with the necessary computational power, interfaces and connectivity (explained in more detail in relation to later figures). Typically, connectivity may be via the Internet, but it may also be via other coupling means such as RJ45 connectors on an Ethernet based local area network (LAN) or wide area network (WAN), USB drives or cables, Wi-Fi or Blue-Tooth. Generally, the faster these connections are the better.

The connections are indicated in each case by the connecting lines from the above identified devices and resources that couple them to the device on which a DOORS 100 runs. Details of the precise nature of these connections in each case may vary and does not impact the operation of the DOORS. In this example embodiment it should be understood that DOORS may be running on one of the devices shown, and operating on the storage resources of one or all of those devices plus the cloud storage locations 104, 114. A DOORS 100 may be installed and run on the new devices and to use cloud storage as data may be processed. However, these subject technologies may also be installed and run upon any device including a legacy older device or system provided it has the necessary resources of compatible operating environment, processing power, data handling, storage, and connectivity.

Using a DOORS, data may be migrated over from older legacy devices and reproduced into one or more of new devices where it may then be organized, optimized, and reconciled. Equally a DOORS may be used to migrate and reconcile data from an old device to another old device, or a combination of devices provided they have connectivity to enable necessary operations such as between two new devices. A DOORS may be capable to operate on any device new or old in any suitably connected configuration provided the system on which the DOORS application is running has sufficient computational processing power, memory buffering and/or file handling capacity, and storage capabilities. The nomenclature of old and new devices is used only because in practice users may generally be migrating from older to newer devices more often than the other way around. Though this is not material per se to the operation of a DOORS nor to the creation of a DOORS Master directory for user data.

Indeed, a DOORS Master directory may be virtualized and operated over networks without moving files per se, and/or virtualized locally using cloud data storage or any combination thereof. In the case of a virtualized operation of DOORS, the Master directory may operate on remote files over networks as though they are located locally or within the DOORS Master directory. However, as a matter of good practice users may prefer to leave files on legacy devices unaltered and to create the DOORS Master directory from them by duplicating their contents into a local storage location or a cloud infrastructure-based storage location. Then perhaps unplugging those legacy devices (to preserve them as is as backups) and then working off the files held in the DOORS Master directory from there onwards.

Preserving legacy devices with their files intact after creation of the DOORS Master directory may be useful for some users. Once the DOORS Master is created those old legacy devices may be retained as backups, or in some situations where data is of a sensitive nature they may be securely erased and/or disposed of.

The DOORS 100 may be run on any of the devices: old phone 108, new phone 110, old desktop computer 102, new desktop computer 112, old laptop computer PC, Mac, iPad, or other 106, new laptop PC, Mac, iPad, or other computing device 116. Data and directory structures from any of these, as well as from an old cloud drive 104 that is being replaced by a new cloud drive 14 may be processed from, through, on, and to any one of those locations to any other of those locations; and it may reproduce and/or merge their data sets, to create from a synergy of them a DOORS Master directory structure or backup that may be populated with the sum of the data found on some selected devices, or from all of them.

This process may create and populate a relational database of data 118 from those alternative sources or all of them comprised of local copies 124 and remote copies 122. Which may then be processed by the DOORS 100 application into the newly organized, optimized, and reconciled directories and files. To provide a DOORS Master copy file that may be comprised of a relational database of data 118 and a co-operable set of reconciled directories and files 120 or another lesser or partial set of reconciled directories and files 120.

FIG. 1A shows a defined process comprising steps of a method for operating a DOORS 100 comprising the following steps:

1. Create doors relational database(s).
2. Interrogate or scan user devices and connected storage for files.
3. Populate relational database(s) with details of file intrinsic and extrinsic attributes.
4. Compare file attributes.
5. Identify matching attributes.
6. Run expert system logic or machine learning and/or artificial intelligence.
7. Infer relationships for files with matching attributes.
8. Infer relationships for files with secondarily related attributes.
9. Query suspected relationships with user.
10. Apply user policies.
11. Apply query responses and add to policies.
12. Create doors master overview of files and their relational data.
13. Based on user selections create a doors master directory in desired storage location(s).
14. Populate master directory with sub-directory structures and files.
15. Terminate and or stay resident ("TSR" running loop in background).
16. Monitor user file creation and storage of files and locations of storage selected in each case.

17. Add user file creation and storage selections to seed data.

18. Periodically add new seed data to machine learning/ artificial intelligence learning to update and emulate user more accurately.

19. Offer to automate file naming and storage according to policies and/or learning to provide intuitive naming and storage file handling according to user emulation.

20. periodically or at user option merge and reconcile related dataset files & versions across devices according to policies and/or machine learning and/or artificial intelligence learning.

21. Source datasets may be left preserved on source devices and storage resources or at user option deleted.

22. Obsolete versions of files and datasets such as an email database may be deleted or preserved according to user selections and/or policies (loop back<<to step 15 in TSR mode).

In the current state of the art there are some problems with artificial intelligence systems that are based upon the operation of synthetic electronic neural networks. Firstly, it is often impossible to see into the operational states of the neurons that comprise the networks to see how they are operating, and what they are operating on. Sometimes, they make mistakes for which persons skilled in the art have coined the term "hallucinating". Artificial intelligence applications that are trusted with high level tasks could thus operate in dangerous and unsafe ways, by suffering from hallucinations that cause them to produce unwanted and possibly disastrous results. No user would be pleased if a DOORS 100 for example decided to wipe all their data by mistake. And that's not nearly as dangerous as some of the things that could go wrong with defense and medical applications of synthetic electronic neural network based artificial intelligence.

Figure 1B:
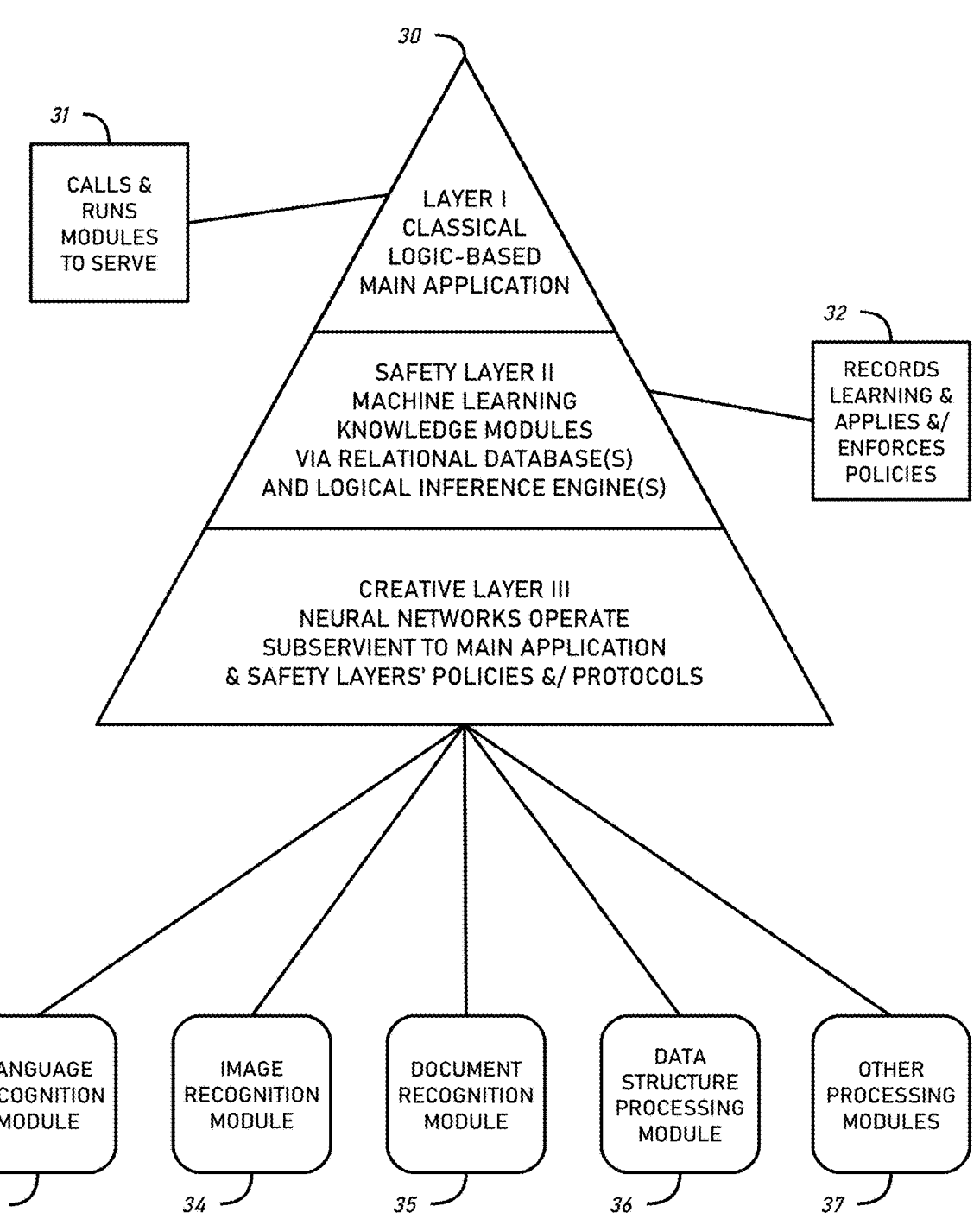
FIG. 1B is a mixed schematic and system block-flow diagram, providing an overview of aspects of the machine-based intelligence aspects of the subject technologies.

FIG. 1B is an overview of a solution to error-trap and prevent damage being caused by an artificial intelligence's hallucinations. This overview shows a machine-based intelligence of an embodiment of the subject technologies. There are three layers of the machine intelligence main application 30 (which may be operated as a module within a DOORS): layer one is a classical logic-based "main application" as most programmers who are schooled in modern modular programming and software engineering would understand it; "safety" layer two is based on machine learning knowledge modules, which may operate via relational database(s) and logical inference engine(s); and the creative layer three wherein neural networks operate-subservient to the main application and the policies and/or protocols of the safety layer. In operation the main application of layer one calls and runs modules to serve 31 its processing needs; the safety layer two records and applies and/or enforces policies (or rules); which may override the creative layer three, which is comprised of neural networks which operate subservient to the main application, and are governed by the safety layer's policies (rules) and/or protocols.

Within and below layer three the safe intelligent systems architecture may run various neural network modules. Which modules may be optimized for specific tasks, and which optimization may include the polymorphic artificial intelligence technologies described below in subsequent descriptions of drawings of polymorphic neural networks and processed. These subject technologies may also use modules comprised of various other configurations of neural networks. For example in the art neural networks based on the gradients of curves that represent the vectors of relative motion have been found to be good for control systems in real world kinetic motion such as self-driving vehicles; there are deeper neural networks with more layers in the large language models (LLM), and there are shallower neural networks which leverage a sort of math co-processor with each neuron (based on biological neurons extracted from slug brains), which are known as "Liquid" neural networks because of the way the data is pushed through the shallow network. In these subject technologies and in polymorphic aspects neural networks may be arranged into modules, and called to run by the main application, to run their specialist task; in much the same way as classical program coded modules may be called and passed parameters on which to operate, and return to the main application. In relation to those polymorphic artificial intelligence may create and destroy neurons, and may use machine learning and/or artificial intelligence to manage, other neural networks. Which may include also releasing resources back to the system once they have performed their task, as well as modification by creating or destroying neurons in the process of optimizing a neural network to suit a particular task. So that in relation to these subject technologies one or more of those neural network modules 33, 34, 35, 36, and 37 may be created and or operated and managed in some aspect by the polymorphic artificial intelligence aspect of the subject technologies of FIGS. 42 through 45 below.

Figure 2:
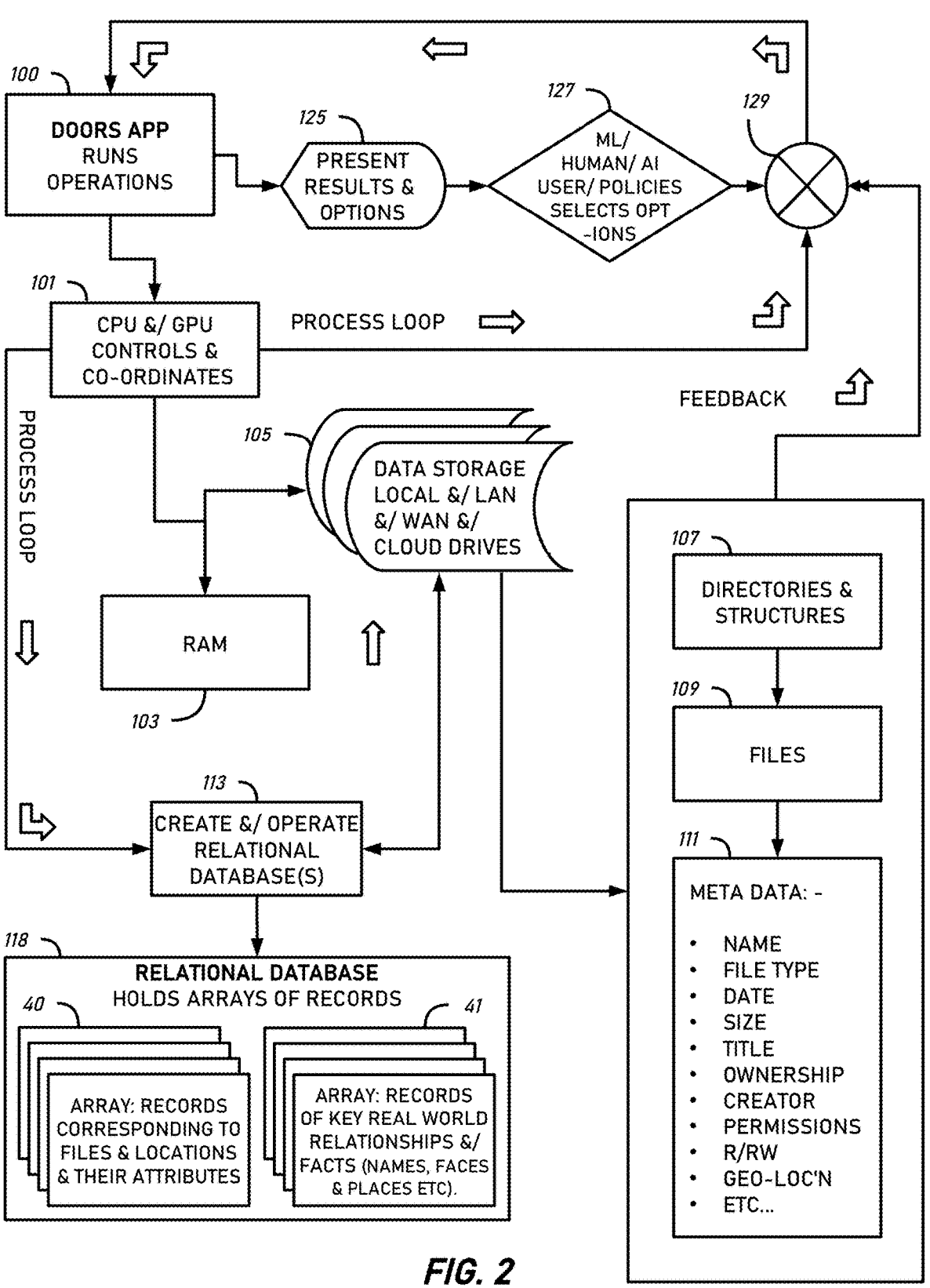
FIG. 2 is a system block-flow diagram, of aspects of the subject technologies.

FIG. 2 shows a system embodiment that integrated DOORS 100. The DOORS application/system 100 runs operations. It presents results and options 125, and the human and/or artificial intelligence user selects and/or policies are applied to select 127 from those options. Which selection choices may be provided as feedback 129 to the DOORS 100. This feedback loop may run whenever needed within the processing of data.

The DOORS 100 may execute its method via instructions in the form of an application (App) or software product or computer program that may be loaded onto and run on a central processor unit 101 (CPU) or group processor unit(s) (GPU) which controls and coordinates a system that performs the process in cooperation with a random-access memory (RAM) module 103. They act upon the connected data storage resources 105 and supporting hardware that may be accessed on local internal storage and/or LAN, and/or WAN, and/or Cloud drives. As the DOORS application runs by operating these resources, they may be interrogated to obtain details of their directories and file handling structures 107, including details of the files held in them 109, and their characteristic meta-data: name, file type, creation date, last modified date, size, title, ownership, creator, permissions, read and write status, geo-location, and other features 111. Which information may be fed-back 129 to the DOORS application 100.

This feedback data may then be used by the DOORS application 100 operating the processor 101, in combination with the random-access memory 103 which may then create and or operate an existing relational database 113. That may be populated with the data fed back to it 129, from interrogation of data storage 105, directories and structures 107 including their files 109 and any meta-data pertaining to those files 111. In which relational database the positional or locations data are combined with and cross-referenced to discernable relations between data items. So that the relational database 118 created and operated 113. The relational database 118 may include arrays of records corresponding to files, file locations and their attributes 40; which may be supported by an array of records comprised of more key facts and real world relationships (such as details of names, faces, and places) 41 that may also be used to categorize and or record data object attributes including placing them within classes which is explained further in relation to later figures and which may be used to produce a DOORS Master directory within a storage location.

Key facts, for example may be a person's identity and other information associated with the person. As shown in the later figures (FIG. 28A, FIG. 29), there is a picture 754 of Holly Taylor 780, and that Holly's relationship 762 is that she is the DOORS owner's/user's daughter which puts her in the relational classes "Family", "Kids", and "Daughter" recorded in attributes 782; all of which may be identified as key facts associated with Holly and the user. Another key record or field of such a record may include all image or facial recognition data from all available pictures of Holly, and of the user (or others tied to the user). This issue of the types of relationships that may be used and cross-referenced by relational databases and processing is a feature of the DOORS 100 that is likely to expand in the total number of types and sophistication during the life of this patent. So that with the progress of artificial intelligence, and or machine learning, if a picture of a new child of the user's were to be analyzed by a future DOORS application, the DOORS may be able to detect the new relationship (fact) using facial recognition plus other inferential, and fact pattern data that a picture of another person may be related to the user and/or to Holly and to attempt a guess, or hypothesis as to a possible relationship, that is based on reasonable assumptions and probabilities. So, the system may detect a picture of an unknown new image of a person and place the picture file into a directory for family, or children of the user. Furthermore, when a new face is encountered, as well as trying to deduce and infer as much as possible, DOORS may then prompt the user to describe the unknown person's relationship to the user or to Holly or to some other person. Again, in later FIGS. 30 and 31, a picture (as user input) 758 of Kevin 790 is identified in his attributes 792 as being a member of the class "Friends" and may be placed by DOORS into another directory associated with the user, for example, a "Friends" directory, automatically based on previous recognition of Kevin as a friend; or the user Mark may be prompted 760 to input Kevin's relationship 762. Then depending on further analysis his picture could be included into a library of friends, or friends and family, which may be determined by the DOORS application based on previous user choices. Every choice the user makes for the naming and storage of every file on every device connected to the DOORS 100 may thus be used as seed or training data that DOORS 100 may use to learn the user's habits and preferences as well as real world relational facts. So that while DOORS may be installed new with generic seed or training data, of generic file naming and data handling practices and conventions, also known as policies as the user makes choices, these can be incorporated (or learned) to personalize the DOORS. The effects of which over a lifetime of digital data creation, handling, processing, and storage may enable a DOORS 100 to take over those choices from the user and for the user to be able to access them as intuitively as though he or she created the file names and chose the storage locations. Because the locations and names given by the DOORS 100 helper application are sufficiently similar or the same as the human data owner would have made them.

A DOORS 100 may thus become an essential life-long helper application for users, and help to improve the accessibility, retention, and hence the sum total of the utility of human user data, and hence improve our economic wellbeing and happiness. As well as freeing-up user time for other more enjoyable and or profitable activities.

Figure 3:
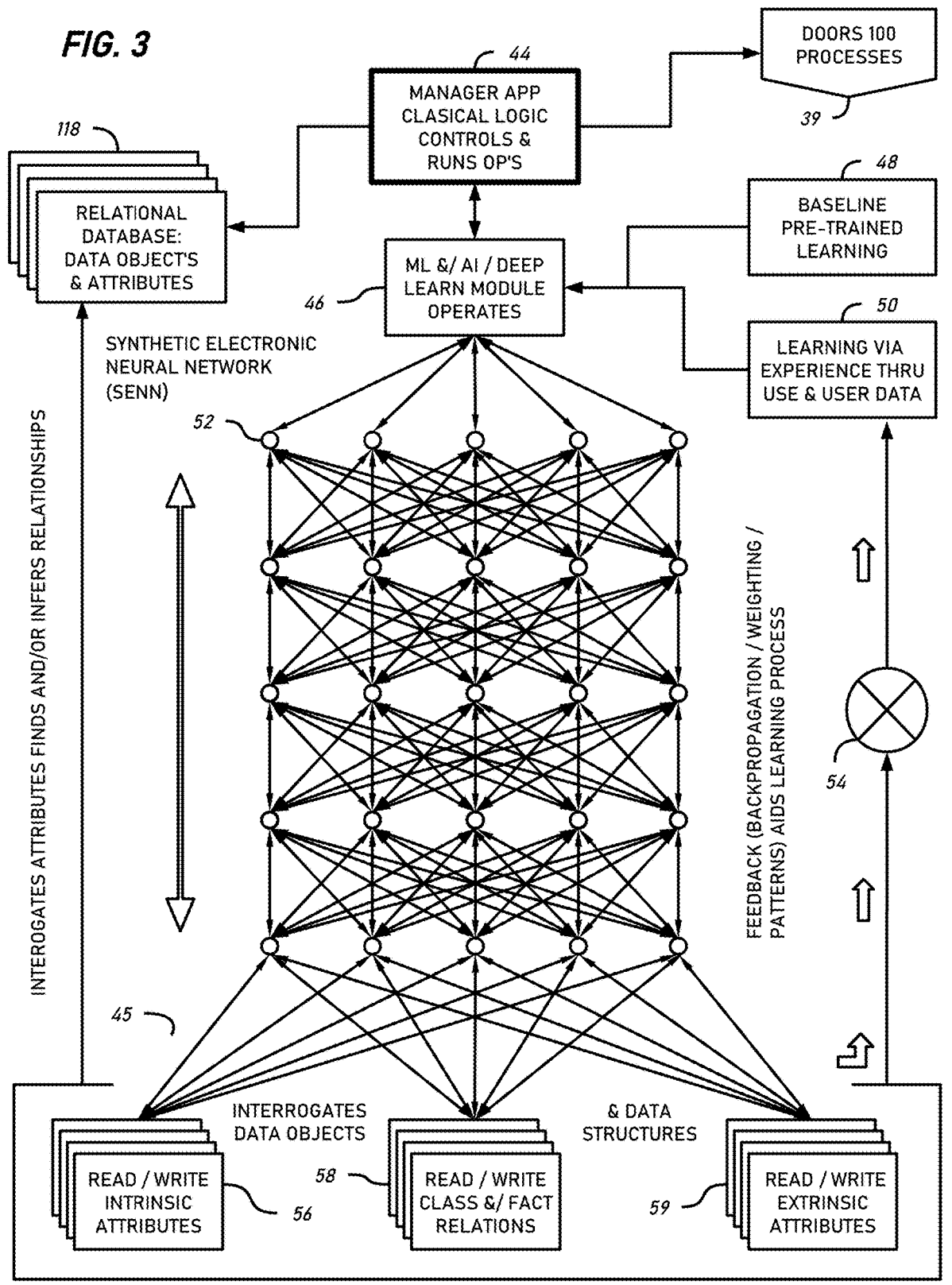
FIG. 3 is a mixed schematic and system block-flow diagram of an aspect of the subject technologies.

FIG. 3 may be a component part of an embodiment of a DOORS 100, or part of another embodiment of the subject technology that includes an artificial intelligence/machine learning module 46, that operates using a neural network 52, under the control of manager application 44. It shows an artificial intelligence/machine learning module that is employed within an embodiment of a DOORS 100 or which is connected to and running on system(s) hardware and processing 39 operations, under the control of a manager application 44, that controls and runs operations. The manager application 44 may control an artificial intelligence or machine learning helper module 46, which may include a neural network 52, that may be installed to a baseline specification that may be pre-trained, or may include a copy of pre-trained learning 48 of the neural network. Thereby enabling a desired baseline level of functionality to be provided to users by the DOORS from the first installation and boot-up of the subject technology.

The neural network 52 of the artificial intelligence helper module even though it may be imbued with prior learning datasets 48, may be further improved to suit the practices and preferences of a user. Which may be achieved by performing interrogation 45 (represented by lines leading to nodes of the neural network 52) of data objects and data structures, as may be comprised of data objects held on user devices from which naming conventions for files and directories as well as their structures may be obtained and used to populate a database. So that an artificial intelligence or machine learning helper module may access that data to obtain feedback 54 to aid in learning naming conventions for files and directories as well as structures as may be used to house files of varying types, and for various purposes.

Furthermore, in the case of corporate users, who may prefer to create strict policies for their naming, and structural conventions these may be directly stipulated via input into such a database or other record for this training purpose, similarly, a clean new filing system may be operated according to these subject technologies, and may record those same attributes of naming conventions for files and directories as well as structures. This recording may include naming conventions for files and directories as well as structures which may be created as feedback 54 as the user operates on files while using a device or system in their work tasks; while a DOORS application may also be operating according to these subject technologies; or it may be recorded afterwards, or periodically on a historical basis. Such as during regular corporate IT housekeeping jobs such as performing backups etc., over weekends and vacations.

The subject technologies may be operated using inference data obtained based on experience gained through observing usage of the user's data, of things such as naming and directory structuring conventions, and habits, learned from historic data as well as from the real time creation and management of new data objects 50 in the form of directory and file names, combined with their locations and other attributes. As may be obtained from connected data storage that is capable of being interrogated (scanned) then mapped into a database, that may be a relational database 118; where they may be recorded as data entries into fields, within records, of the relational database 118. All of which data, may then be used to determine where the DOORS may suggest or by default would seek to create a new directory or file, plus any learned feedback 54 into the machine learning process that may be gained from a user's actual choices.

Feedback in the context of neural networks 52 may be based on recording the successful outcomes of accurately predicting where a user would be most likely to place a file within a directory structure, and what names the user would be most likely to apply to a particular file, and similarly from the names chosen for directories, and their structure, placement of files within that structure or within existing pre-named directory structures. Feedback may be recorded into weightings of neurons which may be derived from back-propagation of correct outcomes in a form of pattern recognition of pathways of neurons that produce a correct outcome, and vice versa. A correct outcome would be achieved where a new filename and storage location within directory structures is made by the DOORS after having studied and learned from the user's legacy data, in the creation of the DOORS Master directory, and the supporting relational database that is populated with details of the attributes of files.

So, for example a DOORS may suggest a filename, and location for a file that has been recorded in historic data, or a seed data. The DOORS may then check the actual file name and directory location in the data to test how accurately the AI/ML helper's suggested names and locations were. Then depending how close the suggested answers were to the training data or real data, the feedback via back propagation adjusts the weights of neurons, so that over time with more data, those suggestions should tend to be closer to the actual or training data examples.

Furthermore, the user from whose data the file naming and storage preferences had been learned, would be highly likely to know intuitively where that file would be stored and would be highly likely to be able to identify it by the name that DOORS had given it, if DOORS had been instructed to automate file storage and naming. Similarly, if a user was trying to find a file a DOORS would be likely to be able to predict where it may be and provide an approximation of what it may have been named.

Returning to FIG. 3, also in the context of training data, the DOORS may work through legacy files stored on connected devices, and as it interrogates their attributes it may operate the neural network to record a data pattern of neurons that correspond to that filename, with its unique attributes, and the location it was found in, as test conditions. This may be achieved by attempting many combinations of neural connections until a match to the correct pattern of neurons is found that will connect the right file, with the right file name, and location. Once this pattern of neurons is known it has been learned. This is how neural networks learn, and with sufficient learning they can approximate to create new naming and storage locations according to the same style or habits of a user by predicting an approximation to the most likely choices of a particular user. So that a human user's idiosyncrasies good and bad may be reproduced to provide a very personally tailored functionality unique to users in their own style.

In the later FIG. 22, DOORS creates an alias or mask name 583, within a field of the database records arrays 578 without changing the original 581. In this way a DOORS can allow users to work with files using their alias or mask without needing to change an original name, and also if users desire, they may harmonize the two into a desired name which could be either original or an alias or mask or something else user specified.

Using an alias or mask name 583 may allow files to be presented to users with their alias names, that may be more intuitive and helpful than obscure names such as the ones cameras often produce by default such as "IMG8474.JPG"

which are meaningless to most users. If a user prefers the DOORS alias or mask name, then the DOORS alias or mask name can be applied and made permanent. But it does not have to be made permanent to use the improved intuitive functionality provided by a DOORS in file handling and presentation visualization views.

A reason why a user may wish to preserve the original name 581 but use the alias 583 in processing could be situations such as crime scene photographs taken by law enforcement agencies. Where it matters in Court to prove the original file name in a chain of custody sense. The DOORS may also make the alias or mask name the actual name by renaming a file, and the original name may be also retained by the DOORS as an alias or mask.

The DOORS feedback process 54 may then provide this to aid learning, over time user preferences may be reinforced and the accuracy with which they are reflected by the names and structures a DOORS may produce may be improved with experience.

In the case of corporate users, they may wish to impose naming and storage policies for consistency across and organization. A DOORS based on such bassline policies may be preferred in some corporate applications such as management of medical records, and lawyer's files. In such cases logical naming and structuring may be precisely set by policies, which policies may be entered by users, and then stored.

The neural network 52 may run testing against historic data as well as new data, to generate the feedback 54 with which to modify itself by adjusting the weightings and neural network patterns it holds for various neurons, and combinations of neurons that relate to specific choices. Which feedback may then become learned and incorporated into the choices the DOORS may make. So that over time, through use and the processing and analysis of historic data and or newly created data the neural network 52 may learn and improve its outcomes to more closely match user habits and preferences.

Many known neural network designs may be suitable for use within a DOORS and more are likely to be created over the life of this patent. Persons skilled in the art will appreciate that a growing number and variety of neural network designs may be used as part of a DOORS without deviating from these subject technologies; and those possible embodiments are intended to be included within the scope of this specification.

A relational database as used herein, is a type of database that stores and provides access to data points that are related to one another. Relational databases are based on the relational model, an intuitive, straightforward way of representing data in tables. In a relational database, each row in the table is a record with a unique identifier sometimes called the key. The columns of the table hold attributes of the data, and each record usually has a value for each attribute, making it easy to establish the relationships among data points.

Returning to FIG. 3 the relational database 118 that records a data object's attributes that are intrinsic or internal 56, examples of which internal data may be provided by meta-data, or file formats that suggest a particular file type, such as data pertaining to pixels, and their color. As may be utilized in facial recognition aspects of the subject technologies which may identify a person who may be the user or have a relationship to a user. Extrinsic data may be identified and used to determine relationships. "Extrinsic" as used herein, may refer to data external from the content of a document. For example, data object attributes may pertain to a class or category of data such as text-based word processing files, and the relationships of files with similar names, or file-type extensions such as ".DOCX", ".TXT", and ".RTF", all being text-based file types 58 and examples of extrinsic attributes. Furthermore, extrinsic or external attributes of data objects may be file names, directory names, locations of files and directories, their structures and locations 59. Which characteristic attributes may all be analyzed to record and indeed to help the DOORS artificial intelligence or machine learning module 46 to infer and/or comprehend the relationships of data objects with users, their wider factual matrix and/or their context and with each other, and relative to a whole data set, or set of sets as in the case of a DOORS Master directory. Which is why in the embodiments shown in many of the figures a relational database 118 is used, that is capable of recording attributes as well as inferred relationships, and applying these plus any directly input relationship data points. Such as the user flagging photographs of a relative and recording a relationship class such as "family" for a daughter, or mother, or a class of "friends" for a friend, or a class of "colleagues" for a colleague. Then when populating the relational database 118 with data relating to image files are processed, and perhaps in idle time the DOORS may work on scanning through the content of image files using image recognition a subset of which is facial recognition and other discernible data points to build-out the relationship-based data as between the various aspects of the user's data. Consequently, the performance, capabilities, and utility of the DOORS 100 may improve over time via the accumulation, and processing of the user's factual matrix of data points. The more a DOORS learns and adds facts to its matrix of data points the better it may serve the user.

The use of a relational database in combination with an artificial intelligence or machine learning helper module, may thus provide a very powerful tool for understanding user data structures at new deeper levels than was attempted in the art. The DOORS 100 then may use this deeper level of understanding to assist users with suggestions and or to make autonomous choices for file naming and file storage locations. Including the creation of appropriate file names, directory structures and names. Where these are helpful and are consistent with the learned preferences and practices of a user. So that the user may be enabled to intuitively find where the DOORS 100 has autonomously created new data, as easily as if he or she had made those decisions. This harmonization and personalization of DOORS may help to make it an invaluable helper application that users may wish to port to every new device for the whole of their digital lives; capable of harmonizing data handling and storage across a range of devices, and resources. As well as providing a full DOORS Master copy and/or backups of the user's entire digital life's work, and their digital legacy that may be suitable for inheritance by the user's heirs and assigns ad litem or post mortem. Children inheritors or corporate successor entities may clone a DOORS Master copy and/or the artificial intelligence helper module's learning for use on their data.

Figure 4:
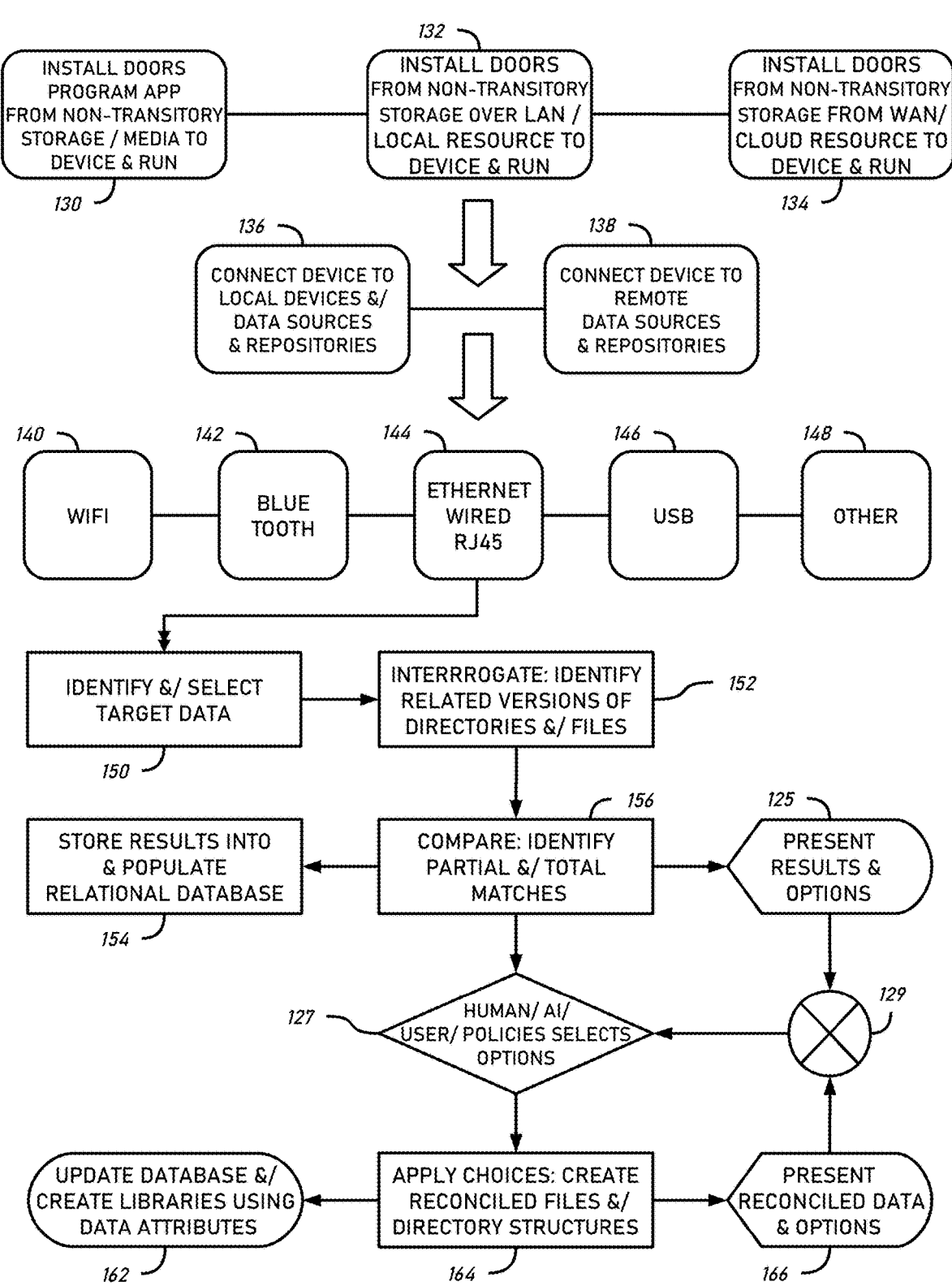
FIG. 4 is a system block-flow diagram, of aspects of the subject technologies.

FIG. 4 shows further detail of the installation and operation of the DOORS application. A DOORS software product or program, containing a set of machine-readable and non-transitory instructions executable by a processor may be installed and run on a device locally 130; alternatively, DOORS may be run from or on a local area networked (LAN) resource 132; or alternatively DOORS may be remotely run from or on a wide area networked (WAN) or Cloud resource 134. Suffice to say that the DOORS application may be run on or from any suitable platform device in combination with any other connected platform device or storage resource of a platform or device. In what may be a swappable and poly-connectable manner.

However, and wherever from the DOORS may be run, it may be connected to local devices and or data sources and repositories 136, and or alternatively it may be connected to remote data sources and repositories 138. Furthermore, in either case local sources 136 and remote data sources 138 may be connected in parallel together.

Connections of the DOORS application running device, or resource, to sources, may include any or all of the alternatives of Wi-Fi 140, Blue Tooth 142, Ethernet (wired) with RJ45 connections 144, USB 146, or other and even yet to be invented connection mechanisms—to or through or LAN 132, WAN, Internet or Cloud 134.

After which the DOORS 100 may identify and or select target data 150 in various connected resources, then interrogate those repositories and identify related versions of directories and or files 152. The DOORS 100 may then compare related files and or directories seeking to identify partial and total matches 156. The output of which may be stored into a relational database 150 and/or go to be output in the presentation 125 of results and options to a user. A human user or artificial intelligence module or user or policies may select options 127, from the options menu presented 125.

The DOORS may apply those choices to create reconciled files and or directory structures 164. As well as presenting the reconciled data and options to a user 166, and as a result of which the database and or libraries may be created and or updated 162 using the newly discovered data 152 attributes and user entries or choices 127.

Figure 5:
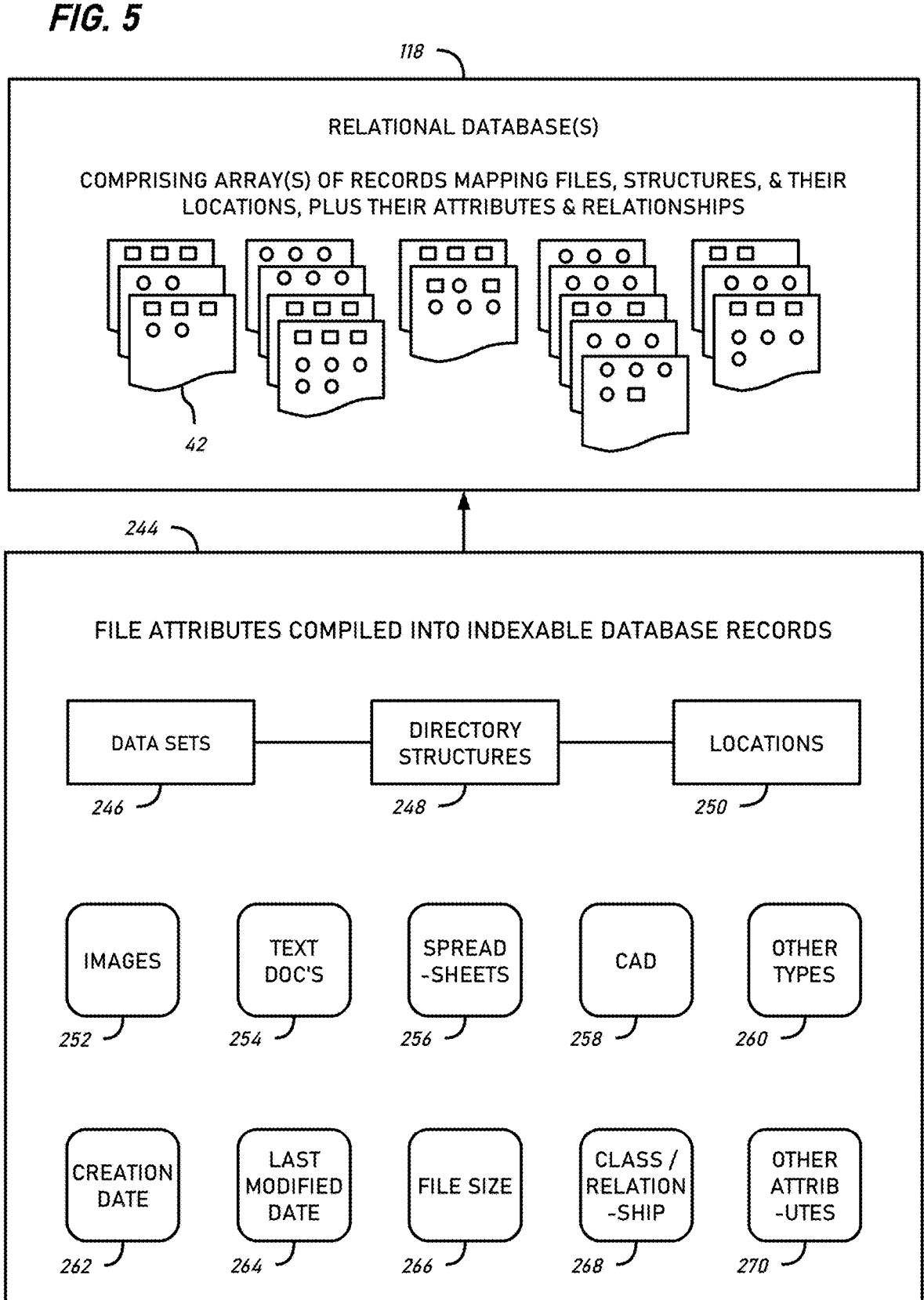
FIG. 5 is a system block-flow diagram, according to aspects of the subject technologies.

FIG. 5 shows in block system form a relational database 118, that is comprised of multiple arrays of records, mapping files, structures, and their locations, plus their attributes and relationships 42. Which records have various fields that detail their attributes as they may pertain to a particular record within an array of the relational database. This is illustrative but not an exhaustive or exclusive list of all the possible file attributes that may be compiled into indexable database records 244 that may be usefully included within those of a DOORS database capable to detail data that is meaningful and may allow relationships to be recorded and or inferred from the fields. Files and their locations may be understood by a DOORS using relational aspects that may be evaluated and inferred based on fields detailing Data Sets 246, Directory Structures 248, Locations 250 of the files and the directories in which they are stored. Furthermore, other alternative aspects of files may be used to associate them with other files by the DOORS 100 into a master directory or libraries. That may be used by users or by a DOORS to group, handle and present files or selections of files. Such alternative and complimentary attributes as may be populated into a DOORS database may include data entry fields for: images 252, text documents 254, spreadsheets 256, computer aided designs (CAD) 258, other file and data types of which there are potentially many 260, creation date 262, last modified date 264 which can be useful for inferring the latest version, which aspect will be noticed by both artificial intelligence as well as by human users as a very useful data aspect, file size 266 which also may be very useful for determining between differing drafts and versions of the same document or file such as cropped or photoshopped images.

Class or relationship 268 is a very useful field that may be populated by the user and/or machine learning and/or an artificial intelligence module that may for example be able to recognize faces, recognizing that Holly is Mark's daughter, and may be able to suggest that other pictures may be of relatives of Mark and/or Holly, etc. Relationships may also be discernable by strings within document names and other file names. For example, a work project may be named Mars Mission and its file types may include pictures, videos, documents, and computer aided engineering designs for spaceships, as well as budgetary spreadsheets. The DOORS 100 may notice that many disparate documents include the text "MARS", "Mars", "mars" and other variations of "mission" in common in the folders and/or filenames. A DOORS may decide to query the user regarding the relationships of these documents having found them in both work and personal devices and file structures. Furthermore, the DOORS 100 may then be able to disentangle these from other files within the DOORS Master copy file, and move them all over to the "Employers' VPN Drive" 228 or save them into a "Work" directory within the DOORS Master copy file. From where the user may later choose to move them to his Employers' VPN drive and perhaps remove them from his personal data structures and files. This is likely to be one of the most used features of any DOORS as users are enabled to disentangle different but intermingled data sets from across a plurality of devices.

Other attributes 270 is a field that might usefully allow sub-branches of fields within it as well as allowing limitless alternative fields that may be useful for the DOORS. This feature covers not only the fields that could be listed now, but also those that can't be listed yet because the technologies and applications they may relate to may not exist yet. But may come to be widely used within the life of the DOORS patent without departing from the subject technology.

Figure 6:
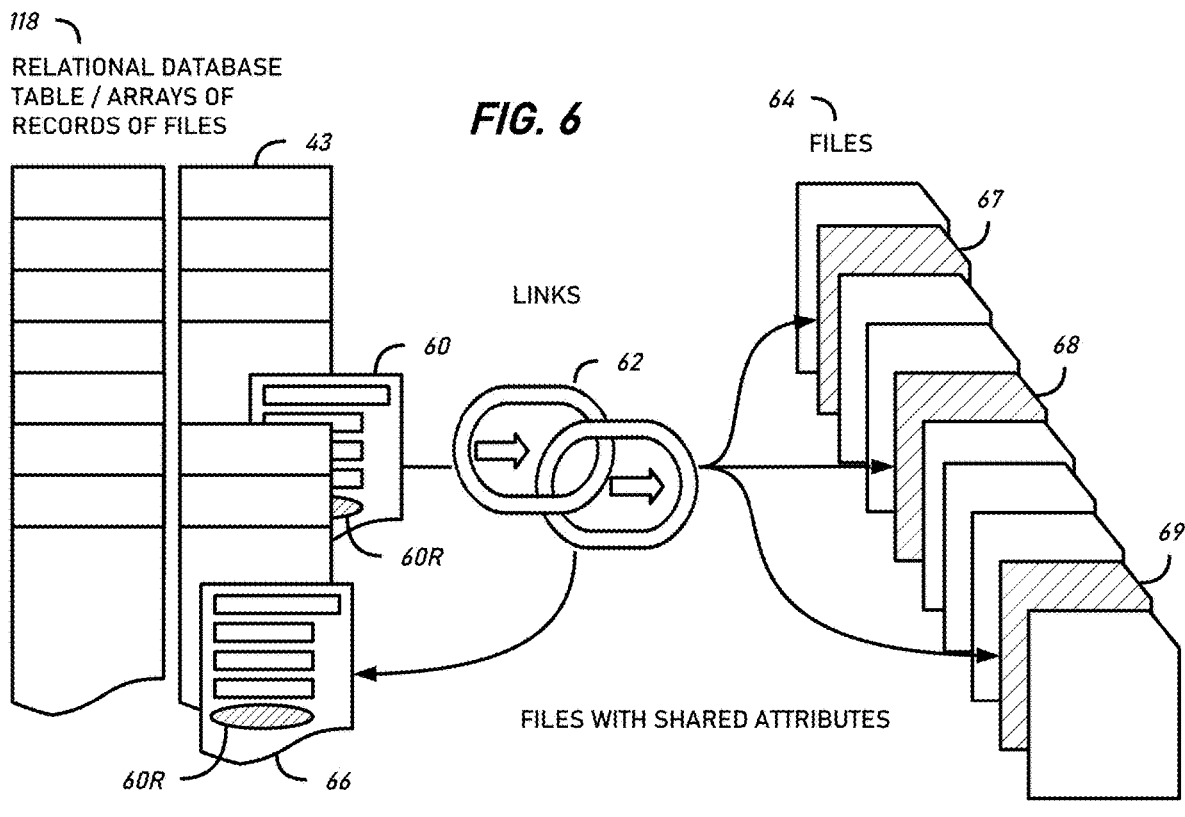
FIG. 6 is a mixed schematic and system block-flow diagram of a database according to aspects of the subject technologies.

FIG. 6 shows a relational database 118 that may include a table containing arrays of records 43 of files 64. Which may a selected record 60 that may contain links 62, that may be comprised of pointers, that point to the files 67, 68, and 69 which have been identified by the DOORS 100 as having shared attributes that may include relationships determined by A.I. Furthermore, one link points back to another record because of a shared relationship with another record 66 which has been identified within the record 60, as sharing a relationship 60R with the related record 66 which may share a relationship as one of its attributes. This mechanism of identifying and recording the relationships between data objects may include relationships to real world facts, which may serve to help build a comprehension model. Such a comprehension model which records relationships may provide a similar sort of machine learning in the comprehension of data, as may be created within synthetic essentially electronic information technology based neural networks. A key benefit of using relational databases is their transparency to humans. Which may make them auditable by reading and checking against textual records of facts. This is desirable because neural networks can sometimes malfunction and "hallucinate" in the creation of inferences which are incorrect. Which is why in these subject technologies, which handle critical files, and real-world facts may benefit from not relying solely on the young and fast evolving artificial intelligence technologies, at the time of writing this patent specification.

For these reasons the mechanism of linking relationships in these subject technologies may be suited for use safety critical systems. So that safety critical information pertaining to relationships is auditable, and is correctable. Whereas, in the state of the art of synthetic electronic neural networks precisely what is happening inside them can be unknowable and incapable of audit and/or correction. Which leads to the phenomena of artificial intelligence suffering from "hallucinations". Which risk may be mitigated by the use of machine learning which is stored in auditable, verifiable, and correctable fields, within the records of a relational database.

Users who may wish to operate a DOORS 100 in some aspect of fact critical or safety critical activities such as aviation or medicine may thus prefer, and be reassured by the machine learning approach of these subject technologies leveraging relational databases, that may support and hold accurate factual matrices, and hold these in non-volatile storage. However, persons skilled in the art will appreciate that synthetic neural networks based on electronics are a fast-developing technology in their own right, as well as an aspect of these subject technologies which may be used within a DOORS; and that neural network technologies may continue to evolve and mitigate the hallucination issue over the life of this patent. Which is why a DOORS 100 may include a synthetic neural networking module and/or a machine learning module and/or relational database without deviating from the scope of the subject technologies.

Furthermore, an embodiment of these subject technologies may be created which operates a machine learning capability that may not include a synthetic neural network and is operated in combination with a relational database; a corollary of which is that another embodiment may be based on a synthetic neural network. Toward the end of this specification are details of some interesting polymorphic neural network technologies which may be used within a DOORS and may have wider fields of application beyond.

In terms of the relational database 118, the links 62 may relate to files that share a "class" such as a work project name. The attribution of a class to relationships may help in the contribution of meaning and hence comprehension of user data objects. Machine learning that leverages logic to generate inferences that may trigger actions can be specific and may be used to impose hard rules for processed. Which may be very useful and desirable in a DOORS that is used within a professional services firm such as accountancy, law, and in defense applications.

Figure 7:
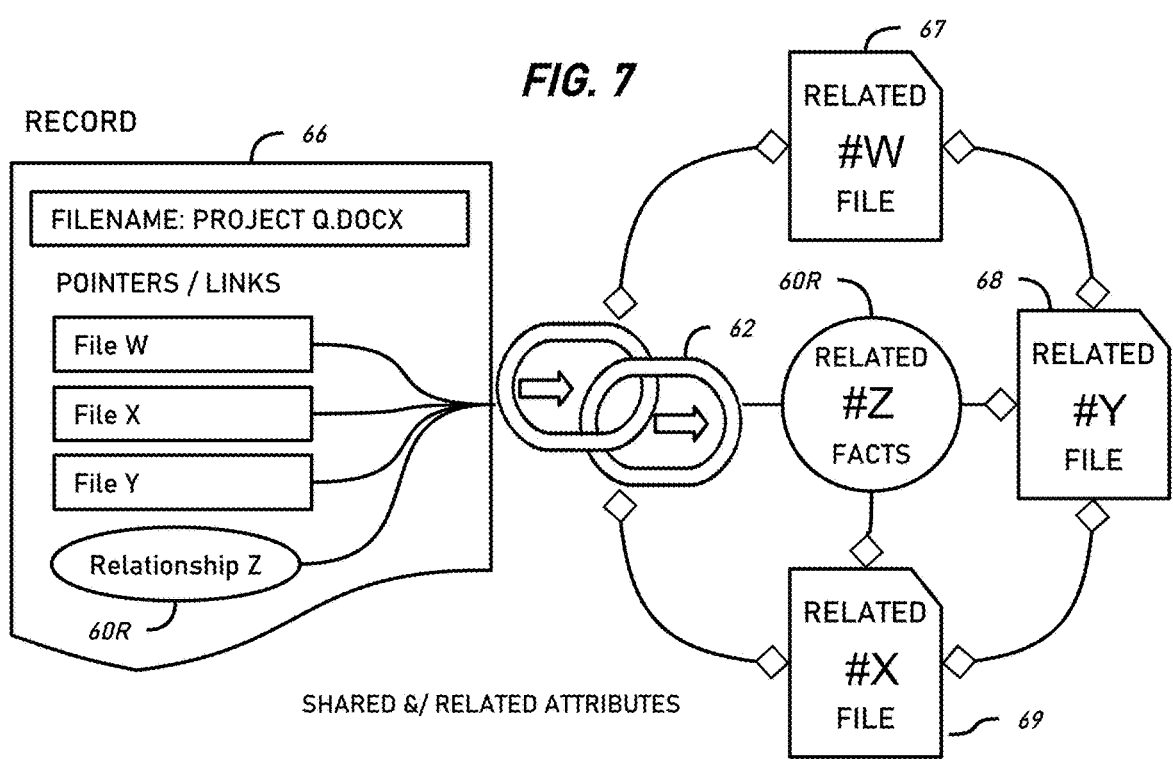
FIG. 7 is a mixed schematic system block-flow diagram of a record according to aspects of the subject technologies.

FIG. 7 follows on from the previous FIG. 6, and shows the record 66, from within the array 43 of the relational database 118. The record 66 contains the fields "FILENAME" which has the value "PROJECT Q.DOCX", and an internal nested array of fields each holding pointers enabled links 62 to files and/or other records having one or more shared attributes with "File W" 67, "File X" 69, "File Y 68", and/or to their shared "Relationship Z" 60R. These relationships are essentially part of the learned factual matrix that the DOORS 100 has learned from user input, and from working with those files, some of which may have also been inferred using similes and related words. Which learning may have been achieved by operating language models by artificial intelligence 390, and/or machine learning 381, and/or logical processing-based inferences as may be produced by an expert system 382 (see FIG. 13 regarding comprehension models for derivation of inferences 380) operating within a DOORS 100. Which processing has led to the population of the relational database 118. Persons skilled in the art will appreciate there are many potential structures that could be used within a relational database to order its contents, and there are many potential ways of presenting those aspects of the data. In practice, a group of candidate file that have been assembled based on relationships determined by artificial intelligence 390, and/or machine learning 381 may be presented to a user. Once a selection of one of the candidate related files (for example, a file representing the group is received, a filename associated with the selection may be generated, that denotes a relationship between the group of identified candidate related files.

The precise details of which may vary with applications. For example, the needs of a CGI studio operating a DOORS 100 in a moviemaking studio, is likely to be skewed towards handling motion picture files more than handling text documents; and a teenager with a mobile phone may be focused on her selfies and social media posting pictures. Relational databases may be tailored in terms of their internal structuring of records, fields, and links to their data storage facilities according to such specific needs without deviating from these subject technologies.

FIG. 8 shows a visualization of a factual matrix 71, which the DOORS 100 has been able to build from its relational database of knowledge (learning) and from the file named "IMG940916.JPG" 73. The file creation date is Sep. 16, 1994 which is a match for Holly's birthday. So, the DOORS has been able to infer or has been told by user input that this is a picture taken at Holly's birthday party. Similarly, DOORS has photographs of Mom's Garden and it may have been able to deduce the location of the birthday picture was Mom's Garden from the intrinsic image data, or from geolocation metadata, or from user input. As will be seen in the user interfaces DOORS may ask questions of users to help it to build out its factual knowledge base so as to be better able to help the user in future. The more facts the user provides through those interfaces the better. The knowledge DOORS may amass may be really helpful for people with poor memory recall, and perhaps there may be new fields of application for DOORS in helping memory impaired people; perhaps drawing on data from times before a user became memory impaired, so that persons skilled in the art may appreciate the power of these fact matrices, as being capable to add a lot of leverage to our ability to use our own information and information about our data through the lens of our digital life, and the data it produces and which grows with us over the course of our lifetimes. We can see also in the factual matrix that Holly is the daughter of Mark, and that Mark is the son of Barbara and either the DOORS has been able to infer or has been told through a user input interface that Holly Taylor is the granddaughter of Barbara Taylor, and that Barbara Taylor is grandmother to Holly Taylor, and mother to Mark Taylor. (In related figures it is shown that these relationships may be used in processing to group data objects or factual data points relating to Holly, Mark, or Barbara as sharing the attribute: "family"). In building this knowledge base of data points DOORS may create a powerful tool through which we may all see, comprehend, appreciate, and remember our lived experience of life and the events in it better than we otherwise would. Which is why the Inventor fervently believes the ability to build these factual matrices within the context of management of our digital lives using a DOORS may provide many more life improving applications and benefits.

FIG. 9 is of a record 77 from within an array of records detailing the type and/or class of "text" files which may include similes "txt", or "text-based" files DOORS 100 has found in a specific location in response to a user search query. The user may be trying to gather together related files for a project that have become fragmented over multiple devices such as a mobile phone, personal computer at home, and a work computer. The file the user wants from within this list may be identified in a further query, indicated here by the arrow 78 as "PROJECT X PROPOSAL.DOCX". The user may then use this file and its intrinsic and extrinsic attributes to help find other files that may be related to it. Which is what the user has done in the next figure by executing the query to request the DOORS to find and display files that have a relationship to the file "PROJECT X PROPOSAL.DOCX" 78R as indicated by the arrow.

Figure 10:
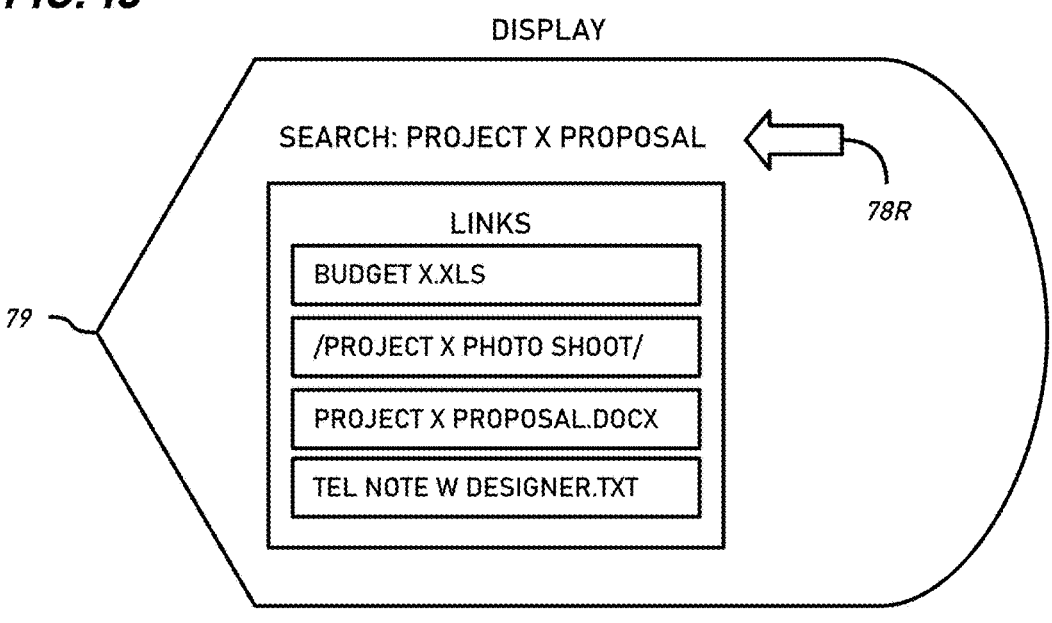
FIG. 10 is a system block diagram of an array according to the subject technologies.

FIG. 10 is the response to that query comprising a display 79 of the results of that search the user told the DOORS 100 to perform, using the search term "PROJECT X PROPOSAL" 78R which has interrogated its attributes, found and/or inferred relationships, and returned details of the files "BUDGET X.XLS", "PROJECT X PHOTO SHOOT", "PROJECT X PROPOSAL.DOCX", "TEL NOTE W DESIGNER.TXT". Which at first sight may not overly impress. But it's important to note that the DOORS 100 has returned one file "BUDGET X.XLS" that only mentions "X" and another file "TEL NOTE W DESIGNER. TXT" which searches in the prior art would not have been capable of finding because they don't contain enough extrinsic clues on the outside that they are linked to the search term. How the DOORS 100 has achieved this is by looking inside the documents and searching inside them for the search terms, and by leveraging its relational database along with one or more of an expert system logic, machine learning, or neural network artificial intelligence. Which has allowed the DOORS to find or infer relationships that would not have been found otherwise. How these example cases may have been achieved is the use of a partial match or simile inference in the case of file "BUDGET X.XLS", and by interrogating the internal contents of the file "TEL NOTE W DESIGNER. TXT", which may have contained a match, and/or partial match, and/or simile to the searched term, file name, and/or to a relationship fact associated with the searched term. More details of this aspect of the subject technologies regarding scanning into the intrinsic attributes (including contents) of files (and file reconciliation) are addressed in more detail in the description below and in particular FIG. 38, FIG. 39, FIG. 40 and FIG. 41.

This is a powerful feature which may be capable to allow a busy businesswoman to ask a DOORS 100 to find all the receipts from a given tax year and sort them into her expenses folder. So that they may be used to help complete her tax returns on time for the IRS. Indeed, using the capability to scan inside documents, a specialist embodiment of DOORS may be used to interrogate those documents and retrieve the totals and then to compile totals for expense items. So that the user may ask her DOORS to compile all my receipts for office supplies for 2023, postage, telephone bills, gasoline, and marketing. Then import those totals into a spreadsheet, or pass them to an accountancy application in an appropriate format. Persons skilled in the art will appreciate that a DOORS may be used in many ways too numerous to list here, and able to help the user better leverage and process their data to save time and make life easier. Leaving more time for more enjoyable activities than bookkeeping, and preparing tax returns for example.

Figure 11:
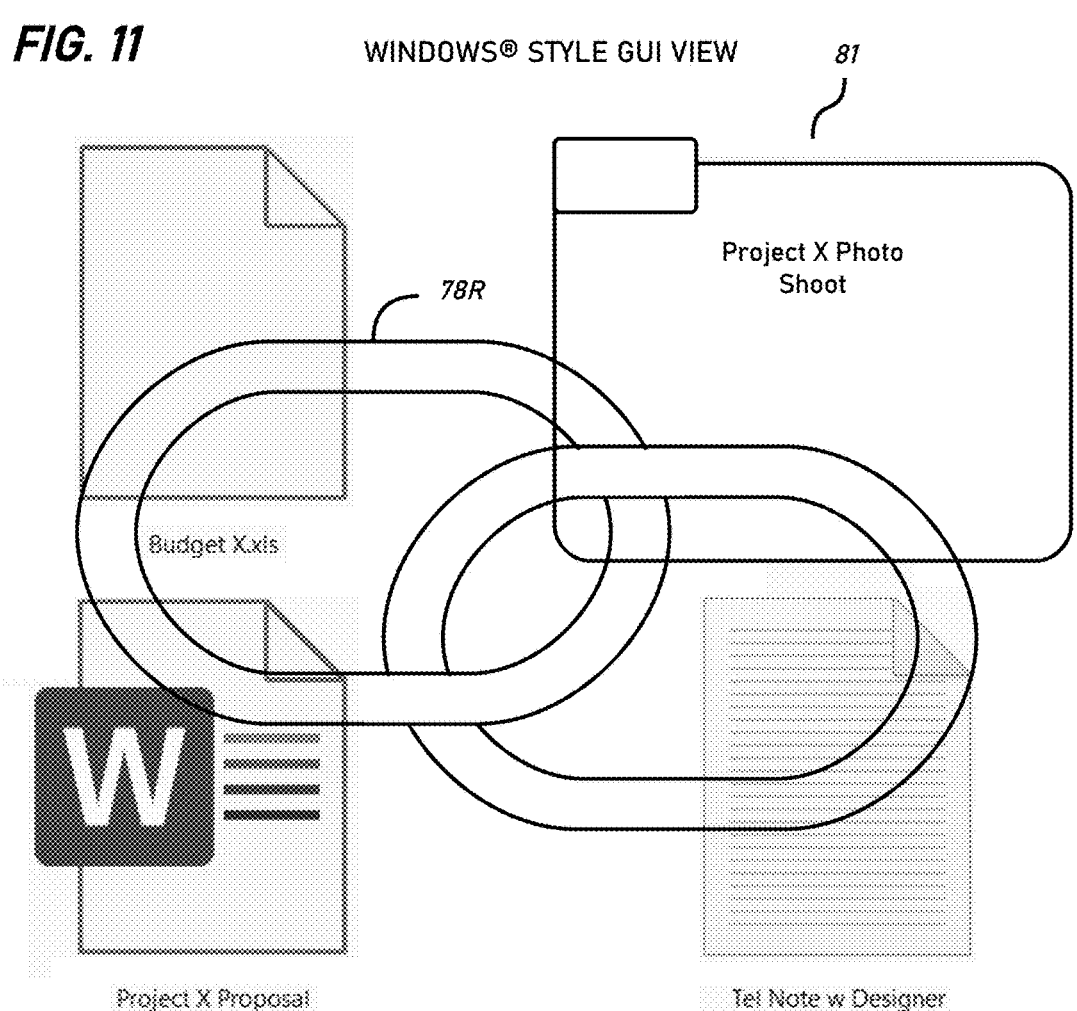
FIG. 11 is a schematic diagram of linked files according to an aspect of the subject technologies.

FIG. 11 shows a Windows® GUI style screen view 81 of how DOORS may represent on a device screen that it has found those linkages 78R, and linked those four documents to the search term "PROJECT X PROPOSAL".

Figure 12:
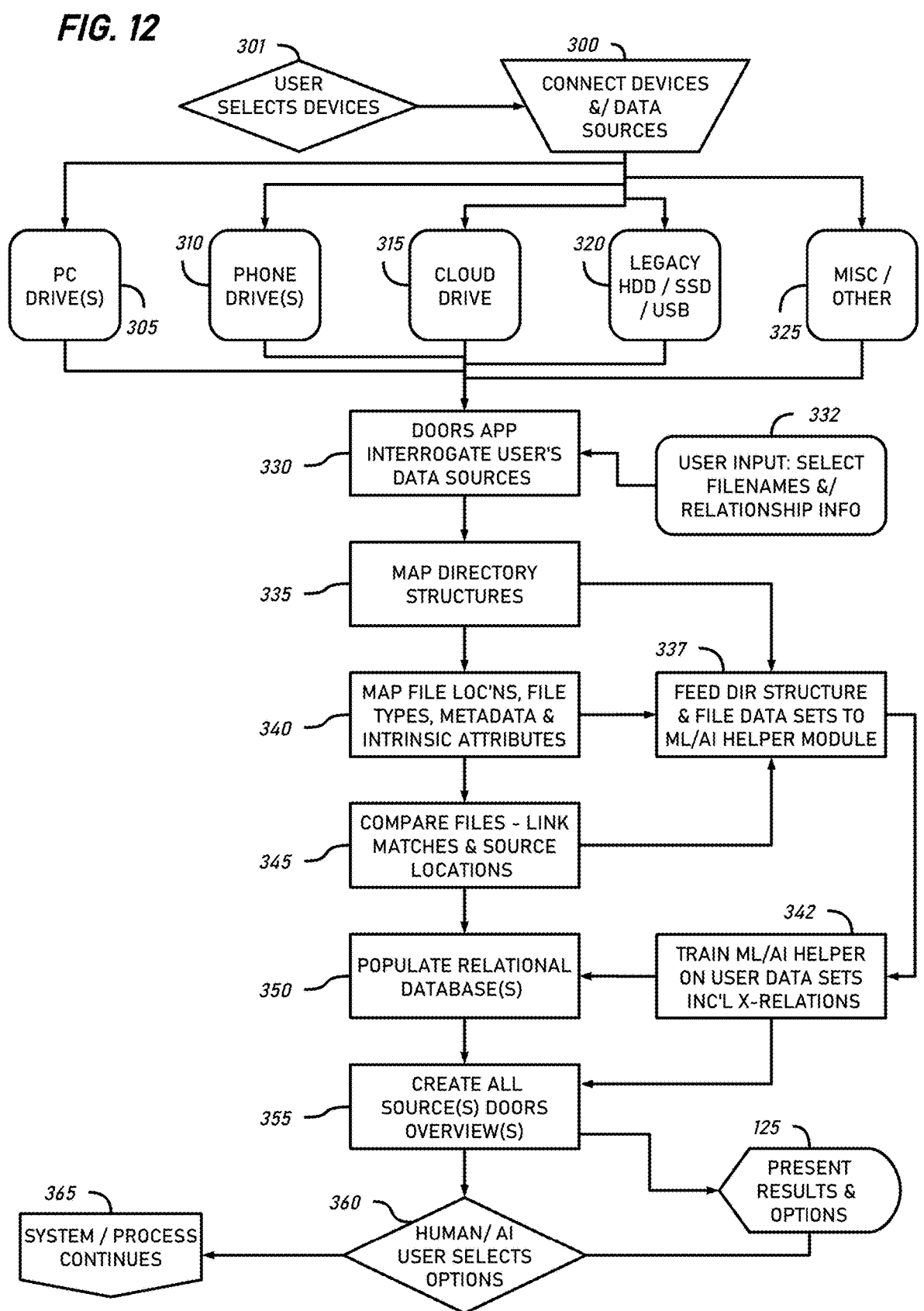
FIG. 12 is a system block-flow diagram, of various aspects of the subject technologies.

FIG. 12 shows a method of copying and reconciling files between different devices using DOORS according to an embodiment. In a DOORS 100, the user selects devices 301, and connects those devices and/or data sources 300, which may include for example, PC Drives 305, Phone Drives 310, Cloud Drive 315, Legacy hard disc drive (HDD) which may be either a rotating disc-type or a solid-state drive (SSD), or universal serial bus (USB) variants or backup drives of any type that connect via USB 320, or other miscellaneous alternative data storage drives that are not directly referenced or may not yet exist at the time of creation of this specification 325.

The DOORS 100 interrogates 330 the user's data sources, in an another or additional step the process may be augmented with user input to select 332 filename and/or relationship information, map 335 directory structures, and map 340 files located in those directory structures, including file types and meta-data and intrinsic attributes. Files and source structure locations comprising directories, directory trees, and the names of their branches may be compared and matches or partial matches of directory structures, names, and file data sets obtained 345, all of which data sets may then also be fed 337 to an artificial intelligence or machine learning helper module. Which helper module of the DOORS may then use to train itself on these user data sets 342; that may include the intrinsic data from within actual files. Such as details of human faces and physical places that may be subsequently used in facial recognition for people, and spatial recognition for geo-location. Other intrinsic aspects of intrinsic file data may be used to assist in the recognition of other objects such as cars, balls, bats, buildings, and animals such as the family pet or zoo animals. Then both the logic-based data, and the artificial intelligence training and learning events which may be gained while operating the DOORS 100, including the cross-relations and classifications of data objects may be used to populate 350 the relational database, and aided thereby the DOORS may create 355 overviews of data from all available and interrogated sources. The results of which and further options may then be presented 125 to a user. From which a human user or artificial intelligence or human assisted by artificial intelligence may select options.

When run for the first time a DOORS 100 may begin from a baseline. Having been initially installed as pre-trained using generic and widely accepted data handling and naming conventions, norms and rules. Over time the baseline out of the box versions of the DOORS application software will likely improve in the detail and sophistication that is achievable from the first installation. Learning may be copied from one iteration and then built upon by the DOORS in ways that the user should find are intuitive because the DOORS has learned the user's preferences. So that over time users will recognize directory structures and naming conventions as being in their own style, and may not conscientiously be able to determine whether they or DOORS created a specific directory structure or file name. Which may make accessing user data more intuitive and efficient for users.

Other features such as the ability to impose libraries that present file locations, and files in alternate views based on other relationships or attributes may further leverage the power of the relational database at the heart of the DOORS 100. All of which should make it much easier to find files, to use them and not lose them over time and across a lifetime's worth of devices, porting data across a wide variety of storage locations and platforms. Including some technologies that probably don't even exist yet. This sequence of steps in this aspect of a DOORS 100 embodiment may continue within a larger system or process 365.

FIG. 13 explains the relationship between comprehension models for the derivation of inferences 389. Logical expert systems 381, may be aided by machine learning 382. Machine learning may be achieved by various routes, it may be obtained by menus that ask the user to provide input data, which may be added to the learning of the fact matrices 71 (FIG. 8), comprised of user related data points and data related data points; intrinsic and extrinsic input data may also be gleaned from or written into the user data itself during processing. There are no particularly hard and fast rules by which a DOORS 100 may gain its stock of relational data from which to build fact matrices. An expert logical system 381 may both use and record relational data and fact matrices that constitute an aspect of machine learning, which is recorded into and accessed in relational databases. Other databases which may be used in comprehension models are dictionaries 383, including the subsets of similes 384, and thesauruses 385. All of which may be used also by artificial intelligence based on neural networks 390, as training data 391, and to help form, language models 392. The large language model (LLM) known as Chat GPT being one such example.

FIG. 14 is an extract from a relational database record for a class known as "family" 395, data objects may relate to persons who are related to the user. Image recognition may assist the DOORS 100 to recognize members of the class "family" from intrinsic data comprised of patterns of pixels, and or from meta data, or from clues in file names. The DOORS in the interface 750 of FIGS. 26 through 32A, shows an image 754, and asks the user questions such as "who is this" 756, to elicit a user input answer 758, and "what is their relationship" 760, to which user input answers 760 provided in the figures below include the class "daughter" 762. The DOORS 100 relational database may thus obtain this relationship data via various routes which may be derived from either intrinsic data or extrinsic data.

FIG. 15 is an extract from a relational database record for a class known as "friends" 396, data objects may relate to persons who are friends of the user. Image recognition may assist the DOORS 100 to recognize members of the class "friends" from intrinsic data comprised of patterns of pixels, and or from meta data, or from clues in file names. The DOORS in the interface 750 of FIGS. 26 through 32A, shows an image 754, and asks the user questions such as "who is this" 756, to elicit a user input answer 758, and "what is their relationship" 760, to which user input answers provided in the figures 760 include the class "class "friend" 762.

The figures that follow show mobile phone user interfaces 190, 192, 214, 700, 750, which share some common features. When a selection is made or changed, all the devices with a connected status may be accessed by the DOORS to interrogate, modify, create, or update files so that all files have matching content and/or filename (including filenames that are newly generated or suggested by the DOORS). Persons skilled in the art will appreciate that other similar variant embodiments such as ones configured for a personal computer or other devices may be created to perform the same or similar functions without departing from the scope of subject technology. As is also the case with all the figures being cross-compatible with various other embodiments that it is not necessary and may be unhelpful to clutter this specification up with too many exemplary embodiments.

Figures 16, 16A:
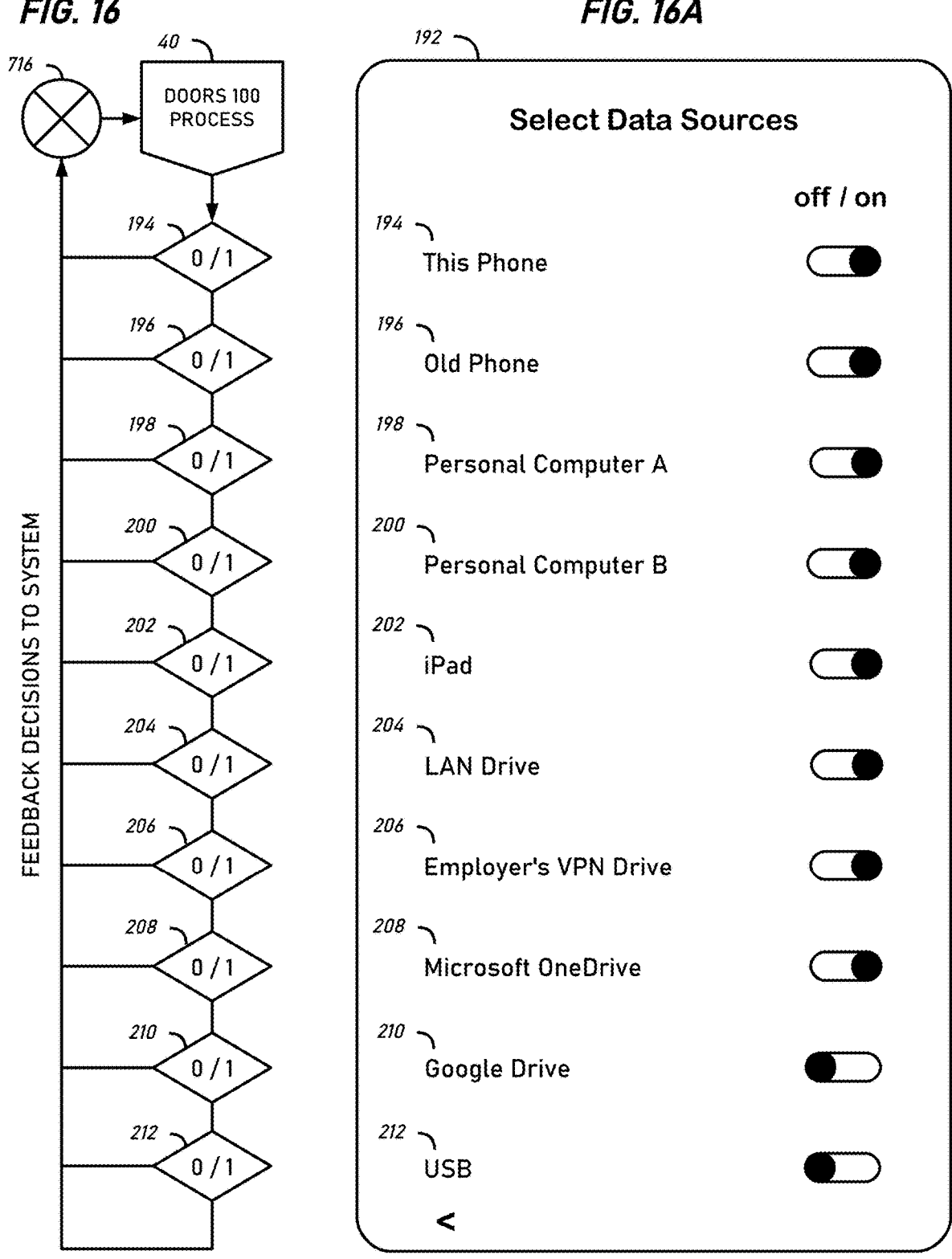
FIG. 16 is a system block-flow system diagram of an interface according to the subject technologies.
FIG. 16A is an interface display screen according to the subject technologies.

FIG. 16, should be read alongside and across side to side with FIG. 16A Which is one possible embodiment of an interface 192 suitable for the selection of data sources from which a DOORS 100 may build a DOORS Master directory or other user defined repository. It shows a DOORS user interface 192 is a continuing process 40 of a DOORS 100, relating to presentation of options to the user via the view screen user interface 192, in which the user is asked to "select data sources" via a button slider switch capable to toggle between the "off" to the left and "on" to the right positions. In the system flow diagram these decisions 194, 196, 198, 200, 202, 206, 208, 210, and 212 may be operated by the DOORS according to Boolean logic when zero "0" is returned for a user input selection of "off" and one "1" is returned for a user input selection of "on", the results of which decisions are returned via a feedback loop 716 and may be passed-on as values to the DOORS 100 according to system parameters.

FIG. 16A shows a DOORS user interface 192, including a menu entitled with the instructive title "Select Data Sources" being displayed on a mobile phone touch-screen. The user interface may include options of which data sources associated with the user's storage device network may be selected are displayed with a current status as being connected, and/or detected. The user interfaces may include toggle or other selectable feature that may switch a selected device from being connected to file storage updates and reconciliation of files in DOORS. In the illustration shown, the device 194 on which the user interface 192 is displayed "This Phone" 194 is set to "on", meaning that the device 194 is or will be actively running the DOORS 100 application, or connected to a device running the DOORS 100 application and that the storage on "This Phone" will be interrogated and used as a data source.

"Old Phone" 196 is set to "on", meaning that the storage on the device 196 will be interrogated and used as a data source. "Personal Computer A" 198 is set to "on", meaning that the storage on the device 198 will be interrogated and used as a data source.

"Personal Computer B" 200 is set to "on", meaning that the storage on the device 200 will be interrogated and used as a data source.

"iPad" 202 is set to "on", meaning that the storage on the device 202 will be interrogated and used as a data source.

"LAN Drive" 204 is set to "on", meaning that the storage on the device 204 will be interrogated and used as a data source.

"Employers VPN Drive" 206 is set to "on", meaning that the storage resource 206 will be interrogated and used as a data source.

"Microsoft OneDrive" 208 is set to "on", meaning that the storage resource 208 will be interrogated and used as a data source.

"Google Drive" 210 is set to "off", meaning that the storage resource 210 will not be interrogated or used as a data source.

"USB" 212 is set to off, meaning that the storage resource 212 will not be interrogated or used as a data source.

There may be a "<" back button to exit the screen interface once these selections are completed.

FIG. 17 should be read alongside and across side to side with FIG. 17A which shows a DOORS user interface 190 is a continuing process 40 of a DOORS 100, relating to presentation of "options" to the user via the view screen user interface 190, in which the user is offered various options via a button slider switch capable to toggle between the "off" to the left and "on" to the right positions. In the system flow diagram these decisions 172, 174, 176, 178, 180, 182, 184, 186, 188, and 190 may be operated by the DOORS according to Boolean logic when zero "0" is returned for a user input selection of "off" and one "1" is returned for a user input selection of "on", the results of which decisions are returned via a feedback loop 716 and may be passed-on as values to the DOORS 100 according to system parameters.

FIG. 17A shows another user interface 190 informatively titled "Options" operating on a mobile phone through its touch-screen display, that also employs "off" and "on" sliding (or toggle) switches on menu items. The options settings may include "Allow Duplicates" 172 that is set to "off", meaning that duplicate copies of files may not be reproduced, so that only one copy of any identical file that may be found within the source datasets may be created into a master copy of the datasets that are being merged and/or reconciled.

"Prefer Most Recent" 174 that is set to "on", meaning that if different versions of a file are found in the source datasets only the most recent version of such files will be reproduced into the master copy of the datasets that are being merged and/or reconciled.

"Archive Older Versions" 176 that is set to "on", meaning that the DOORS will archive older versions of any file that may be reproduced into the master copy of the datasets being merged and/or reconciled.

"Single Master Directory" 178 that is set to "off", meaning that multiple copies of the master directory and its contents may be created into selected locations.

"Multiple Master Synch" 180 that is set to "on", meaning that the DOORS may monitor multiple master directory contents and synchronize any changes across the affected master directories. This may be a useful way of ensuring that data is constantly being backed-up into duplicates of the master. For busy IT staff in the corporate world, this may be used to reduce the workload on staff time in the creation of backups.

"Primary Master in Cloud" 182 that is set to "on", meaning that when a master directory is created it may be set as "primary", meaning that it may be used to control synchronized duplicates or backups of itself, and that a master directory will be created into a cloud storage resource.

"Use Primary Master" 184 that is set to "on", meaning that when the user is working with files through a DOORS, on a device where the DOORS application is running then the user will be using (retrieving, working on, and saving back to storage in the primary master with any changes) the files stored within the primary master.

"Facial Recognition" 186 that is set to "on", meaning that when images are being interrogated for their intrinsic attributes that the DOORS 100 may call and run an image processing module capable to search within the contents of the image for data patterns that may be comprised of faces, and also to compare any potential faces found with facial recognition pattern data for persons who are contained in images that DOORS has processed previously; then to lookup any matches to interrogate and return any relational data. Such as an image found (for example facial recognition may be used to determine where best to place into storage an image file 780 of FIG. 29 or another one which contains a match for the facial recognition data of Holly Taylor, who has the attributes associated with her factual matrix that she is a member of the classes "family", "kids", and "daughter" 782; so that the DOORS may place the matched image into the directory "Kids" 632, which is a sub-directory of the master 610, which is stored in the cloud drive 406.)

"Library Group Views" 188 that is set to "off", meaning that views of files grouped by relationships that may be inferred from file attributes as the DOORS may produce to display related files in interesting new ways in not be enabled, so that files will be presented within the actual directories where they are placed by the DOORS. An example is provided in FIG. 10 and FIG. 11 of displays 79, and 81, both showing in differing view files that the DOORS has found to be related that are linked 78R to a particular project proposal ("PROJECT X PROPOSAL") even though residing in disparate locations. The user might be advised to set this option to provide "Library Group Views" 188 to "on", as he or she is missing out on this great feature on the current selections made.

"Merge Source Directories" 190 that is set to "on", meaning that where possible which is where two directories are the same or similar they will be merged and reconciled, rather than being reconciled to other parameters such as removing duplicates. An example of which may be the merging of two directories with names that are not identical but which the DOORS inference engine, and/or artificial intelligence engine may identify as similes "my kids", "children" and "the kids" into one directory.

There may also be forward ">" and backward "<" menu buttons capable to help users move between screen views in the interface. In addition, the features and settings above may present process steps invoked by a computer processor and/or a host platform server administering the services provided by the DOORS 100.

Figures 18, 18A:
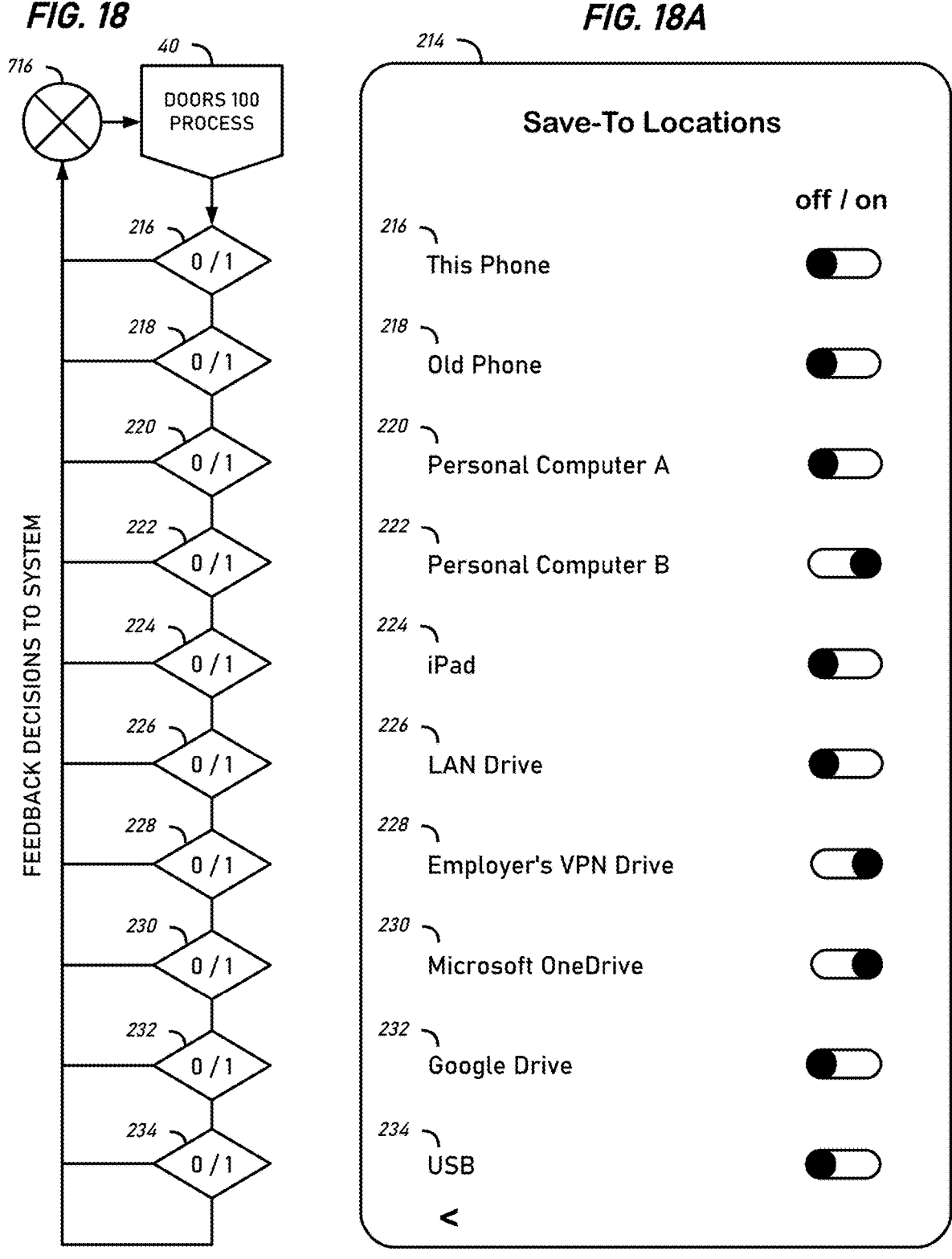
FIG. 18 is a system block-flow system diagram of an interface according to the subject technologies.
FIG. 18A is an interface display screen according to the subject technologies.

FIG. 18 should be read alongside and across side to side with FIG. 18A which shows a DOORS user interface 214 is a continuing process 40 of a DOORS 100, relating to presentation of locations as "save to locations" to the user via the view screen user interface 214, in which the user is offered various options via a button slider switch capable to toggle between the "off" to the left and "on" to the right positions. In the system flow diagram these decisions 216, 218, 220, 222, 224, 226, 228, 230, 232, and 234 may be operated by the DOORS according to Boolean logic when zero "0" is returned for a user input selection of "off" and one "1" is returned for a user input selection of "on", the results of which decisions are returned via a feedback loop 716 and may be passed-on as values to the DOORS 100 according to system parameters.

FIG. 18A is a user interface 214 informatively titled "Save-To Locations" 214 operating on a mobile phone through its touch-screen display, that also employs "off" and "on" sliding switches on menu items to determine where to save the DOORS Master copy file to: "This Phone" 216 that is set to "off", meaning that a master copy directory and contents will not be saved to the phone on which it appears to be running.

"Old Phone" 218 that is set to "off", meaning that a master copy directory and contents will not be saved to the device known as "Old Phone".

"Personal Computer A" 220 that is set to "off", meaning a master copy directory and contents will not be saved to the device known as "Personal Computer A".

"Personal Computer B" 222 that is set to "on", meaning that a master copy directory and contents will be saved to the device known as "Personal Computer B".

"iPad" 224 that is set to "off", meaning that a master copy directory and contents will not be saved to the device known as "iPad".

"LAN Drive" 226 that is set to "off", meaning that a master copy directory and contents will not be saved to the device known as "LAN Drive".

"Employers VPN Drive" 228 that is set to "on", meaning that a master copy directory and contents will be saved to the device known as "Employers VPN Drive".

"Microsoft OneDrive" 230 that is set to "on", meaning that meaning that a master copy directory and contents will be saved to the storage resource known as "Microsoft OneDrive".

"Google Drive" 232 that is set to "off", meaning that meaning that a master copy directory and contents will not be saved to the storage resource known as "Google Drive".

"USB" 234 that is set to "off", meaning that a master copy directory and contents will not be saved to the device known as "USB".

There is also "<" back button to exit this screen of the interface once these selections are completed.

Figure 19:
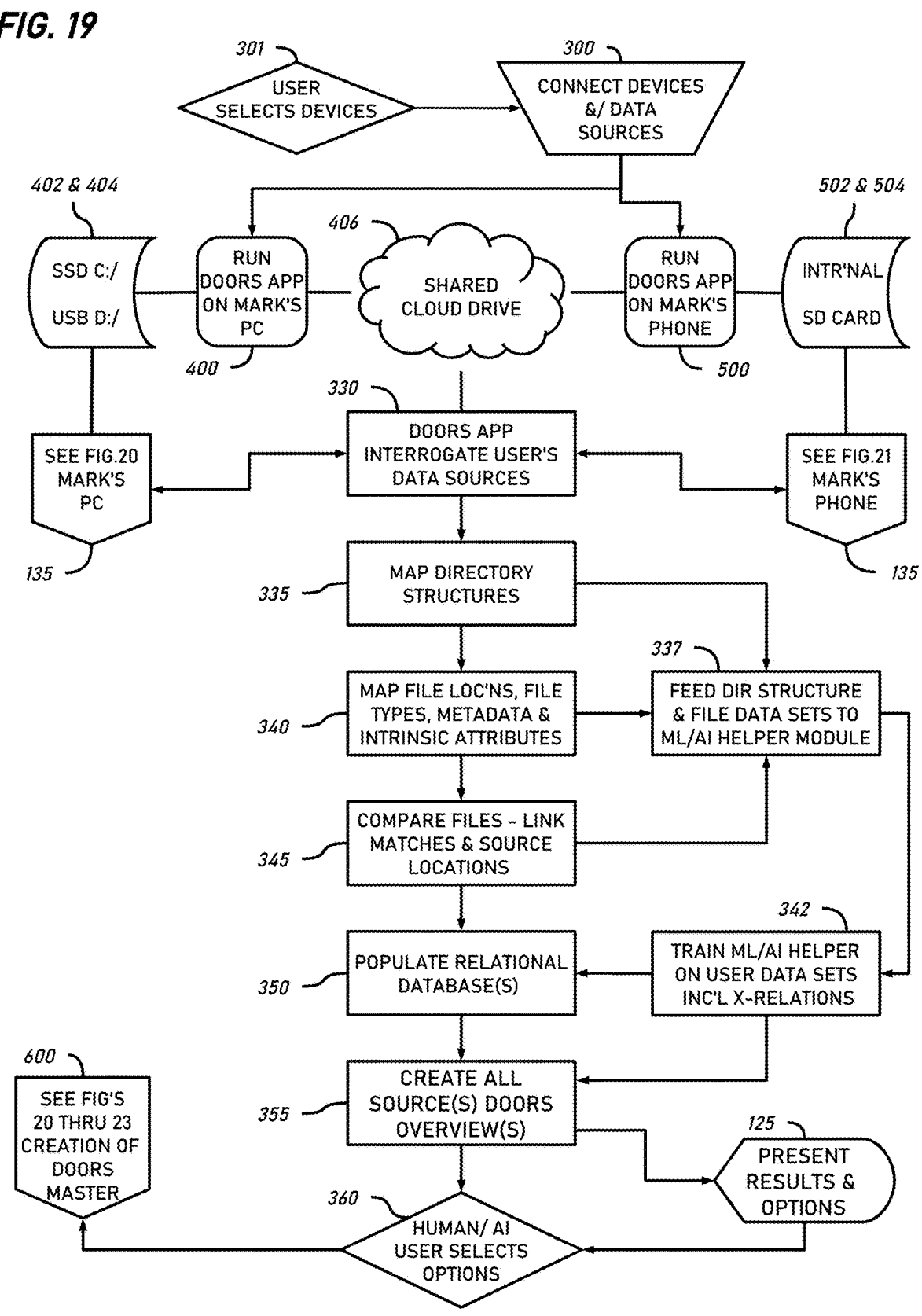
FIG. 19 is a system block-flow diagram, of various aspects of the subject technologies.

FIG. 19 is similar to FIG. 12 and similarly shows a method of copying and reconciling files between different devices using a DOORS according to a specific embodiment. In a DOORS 100, the user selects devices 301, and connects those devices and/or data sources 300. Which may then run the DOORS application on either: (a) Mark's PC 400, which has a solid-state drive (SSD) drive C:/ 402, and a universal serial bus (USB) drive D:/ 404, or (b) run the DOORS application on Mark's phone 500, which has an internal storage 502, and an SD card (secure digital card, is a proprietary non-volatile, flash memory card format, licensed by SD-3C LLC). Both Mark's PC 401, and Mark's Phone 501 link off page 135 to the system aspects shown in FIG. 20, and FIG. 21 respectively.

The DOORS 100 interrogates 330 the user's data sources, then proceeds to map 335 directory structures, and maps 340 files located in those directory structures, including file types and meta-data and intrinsic attributes. Files and source structure locations comprising directories, directory trees, and the names of their branches may be compared and matches or partial matches of directory structures, names, and file data sets obtained 345, all of which data sets may then also be fed 337 to an artificial intelligence or machine learning helper module. Which helper module of the DOORS may then use to train itself on these user data sets 342; that may include the intrinsic data from within actual files. Such as details of human faces and physical places that may be subsequently used in facial recognition for people, and spatial or object recognition for geo-location. Other intrinsic aspects of intrinsic file data may be used to assist in the recognition of other objects such as cars, balls, bats, buildings, and animals such as the family pet or zoo animals. Then both the logic-based data, and the artificial intelligence training and learning events which may be gained while operating the DOORS 100, including the cross-relations and classifications of data objects may be used to populate 350 the relational database, and aided thereby the DOORS may create 355 overviews of data from all available and interrogated sources. The results of which and further options may then be presented 125 to a user. From which a human user or artificial intelligence or human assisted by artificial intelligence may select options.

When run for the first time a DOORS 100 may begin from a baseline. Having been initially installed as pre-trained using generic and widely accepted data handling and naming conventions, norms and rules. Over time the baseline out of the box versions of the DOORS application software may improve in the detail and sophistication that is achievable from the first installation. Learning may be copied from one iteration and then built upon by the DOORS in ways that the user should find are intuitive because the DOORS has learned the user's preferences. So that over time users will recognize directory structures and naming conventions as being in their own style, and may not conscientiously be able to determine whether they or DOORS created a specific directory structure or file name. Which may make accessing user data more intuitive and efficient for users.

Other features such as the ability to impose libraries that present file locations, and files in various views based on other relationships or attributes may further leverage the power of the relational database at the heart of the DOORS 100. All of which should make it much easier to find files, to use them and not lose them over time and across a lifetime's worth of devices, porting data across a wide variety of storage locations and platforms. Including some technologies that probably don't even exist yet. This sequence of steps in this aspect of a DOORS 100 embodiment may continue within a larger system or process, please see FIG. 20, FIG. 21, FIG. 22, FIG. 22A, FIG. 22B, FIG. 22C, on through FIG. 23 inclusive for details of the creation of a DOORS master, which continues the method and which is applied in this example of its processing. In later figures all the way through to FIG. 33 examples are also provided of the user adding files, via interfaces, and of relationship mapping as may be used to place them appropriately and intuitively into the DOORS master directory from a mobile phone interface, and assisted by the DOORS 100. Though not shown similar equivalent interfaces as between those shown for display screens of phones, computers, and other devices may be used on compatible devices or systems on which a DOORS 100 may run.

Figure 20:
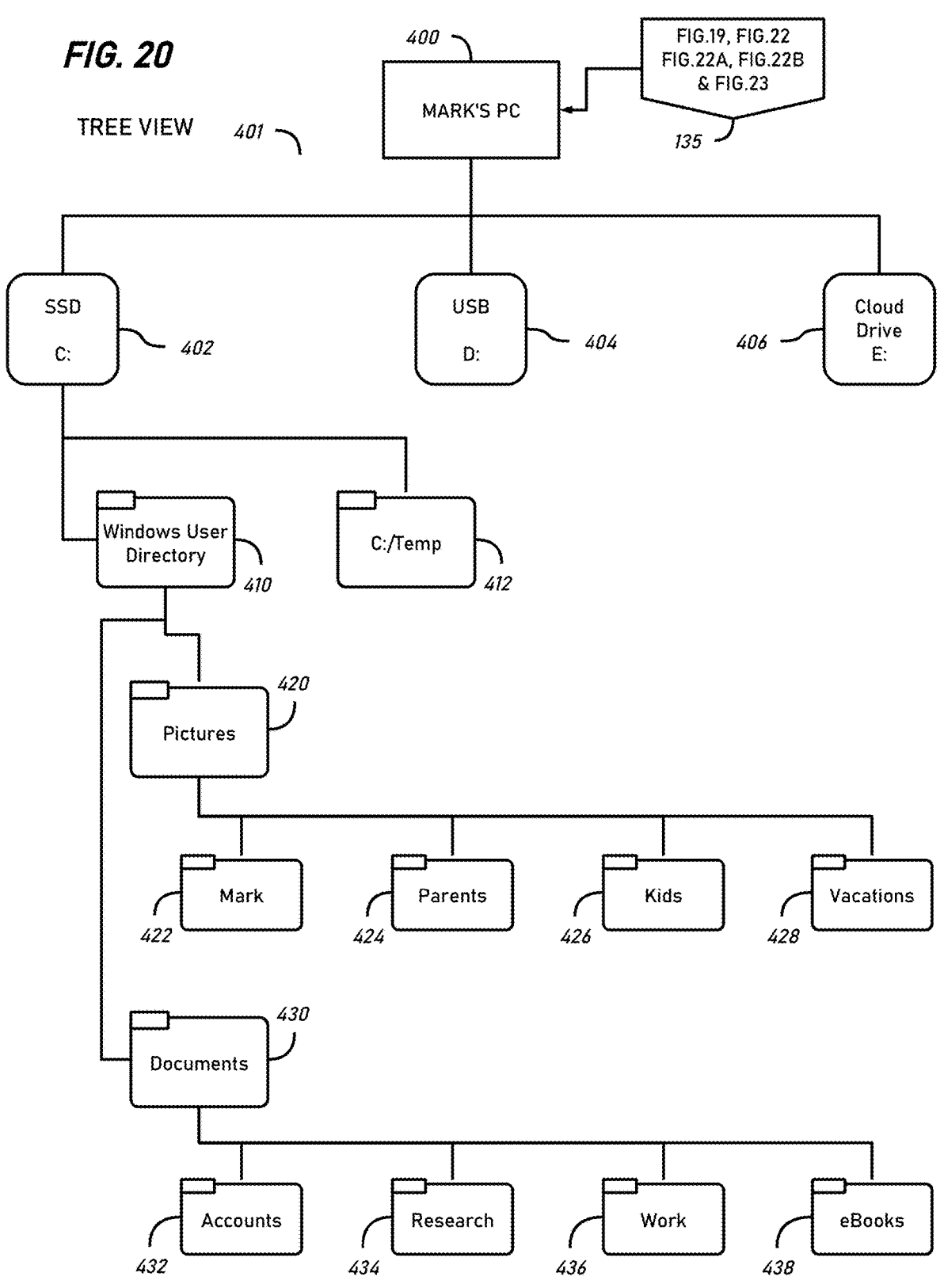
FIG. 20 is mixed schematic and system block-flow diagram, detailing an aspect of operation on data within a directory structure according to the subject technologies.

FIG. 20 shows a tree view 401 of an aspect of a DOORS operating within a continuing system or process which connects off page with FIG. 19, FIG. 22, FIG. 22A, FIG. 22B, and FIG. 23, 135. In actual disc operating system DOS interfaces as used on IBM® PCs and IBM clone devices spaces are not allowed. The naming conventions and nomenclature of Microsoft's® pseudo-DOS as used in their Windows® operating system (OS) graphical user interface (GUI), which is similar to that used for IBM PCs and IBM clone PCs may be used where it is helpful in describing disc drives and directory structures. The "/" symbol in this context indicates the division between a directory and an object within a directory, objects may be sub-directories or files. Spaces have been left in this description for reasons of clarity and compatibility with the graphical user interface (GUI) based examples in the drawings in which directories are indicated by folder icons.

The device upon which the DOORS is operating is Mark's PC 400, the alternative data sources and storage locations attached are the local HDD which is in fact an SSD with the DOS label "C:" 402, USB drive with DOS label "D:" 404, and Cloud drive with DOS label "E:" 406. In this view the directory structures and files of drives D: and E: are not shown or may be assumed to be empty for present purposes. But the directory structure of drive C: 402 is shown down to three levels.

The directory structure of drive C: 402 at level one, has two nested directories comprised of C:/Windows User Directory 410, and C:/Temp 412 further details of which are not shown. On the next level down into the directory structure within there is shown C:/Windows User Directory/Pictures 420, and C:/Windows User Directory/Documents 430. Both of which directories contain the nested directories C:/Windows User Directory/Pictures/Mark 422, C:/Windows User Directory/Pictures/Parents 424, C:/Windows User Directory/Pictures/Kids 426, and C:/Windows User Directory/Pictures/Vacations 428, plus C:/Windows User Directory/Documents/Accounts 432, C:/Windows User Directory/Documents/Research 434, C:/Windows User Directory/Documents/Work 436, and C:/Windows User Directory/Documents/eBooks 438. Comprising the directory structures on drive C: down to three levels as having been scanned and discovered or created by a DOORS 100.

Figure 21:
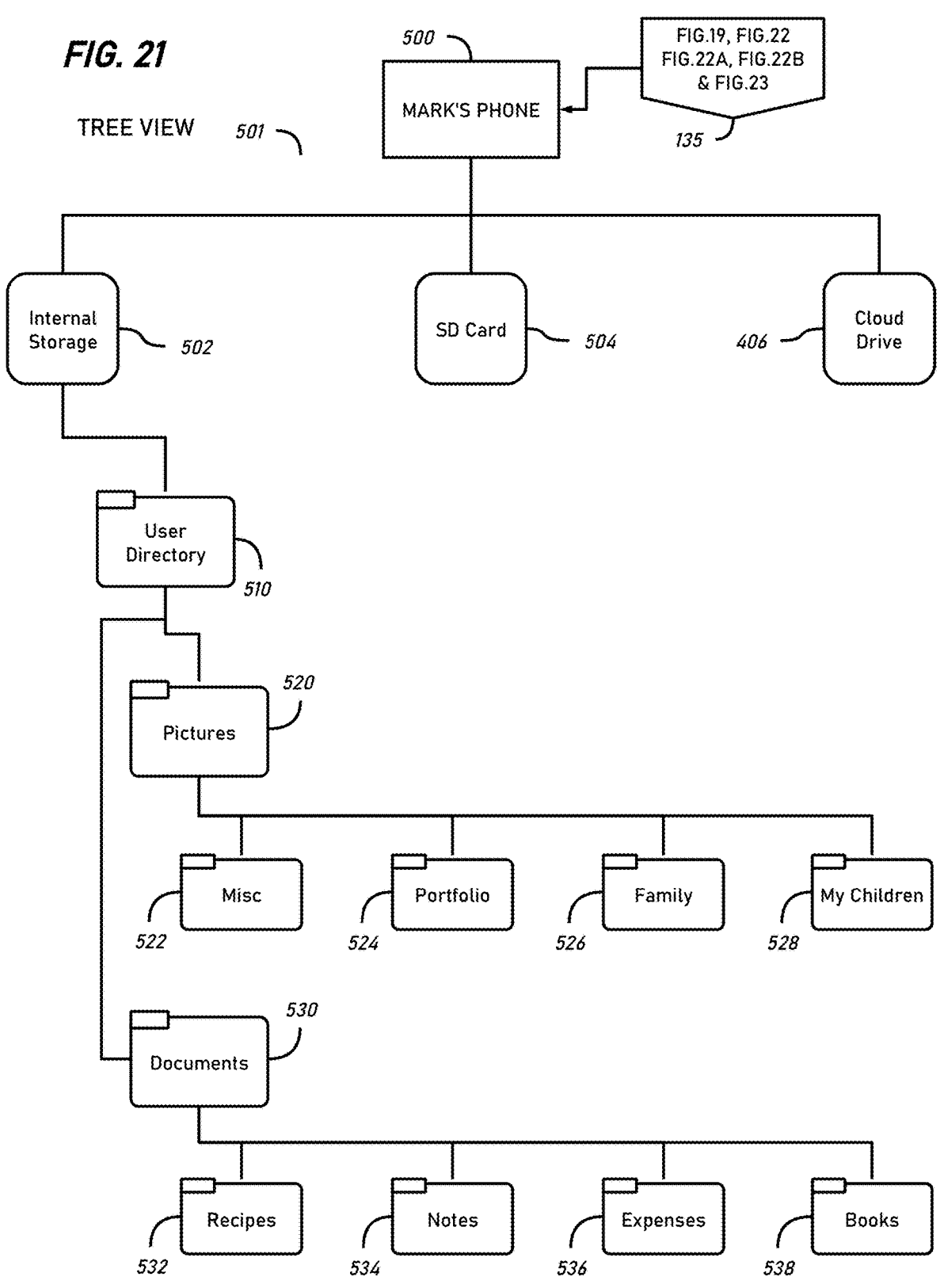
FIG. 21 is a mixed schematic and system block-flow diagram, detailing an aspect of operation on data within a directory structure according to the subject technologies.

FIG. 21 shows a tree view 501 with a block and flow-link off page connector 135 to FIG. 19, FIG. 20, FIG. 22A, FIG. 22B, and FIG. 23 of a continuing DOORS 100 embodiment or process that may be running upon or operating locally on or remotely upon the data storage within and or connected to Mark's Phone 500. Here we see only one part of the wider DOORS.

The drives that may be present include for example, the phone's Internal Storage 502, SD Card 504, and Cloud Drive 406. In this view the directory structures and files of SD Card 502, and Cloud drive 504 are not shown, and or they may be assumed to be empty. But the directory structure of Internal Storage: 502 is shown down to three levels. The first level has one directory Internal Storage/User Directory 510, which at the next second level has two directories Internal Storage/User Directory/Pictures 520, and Internal Storage/User Directory/Documents 530. At the third level there are the directories Internal Storage/User Directory/Pictures/Misc 522, Internal Storage/User Directory/Pictures/Portfolio 524, Internal Storage/User Directory/Pictures/Family 526, and Internal Storage/User Directory/Pictures/My Children 528 plus Internal Storage/User Directory/Documents/Recipes 532, Internal Storage/User Directory/Documents/Notes 534, Internal Storage/User Directory/Documents/Expenses 536, and Internal Storage/User Directory/Documents/Books 538. Which may be a picture of the directory structures in Mark's Phone Internal Storage down to three levels as either scanned and discovered or created by a DOORS 100. In the next FIG. 23 a DOORS 100 may be running concurrently across Mark's PC 400 and Mark's Phone 500 so that directories, directory structures, and files are being aggregated, reconciled, and merged by the DOORS 100 to create a DOORS Master directory 600 into a Cloud Drive 406.

Figure 22:
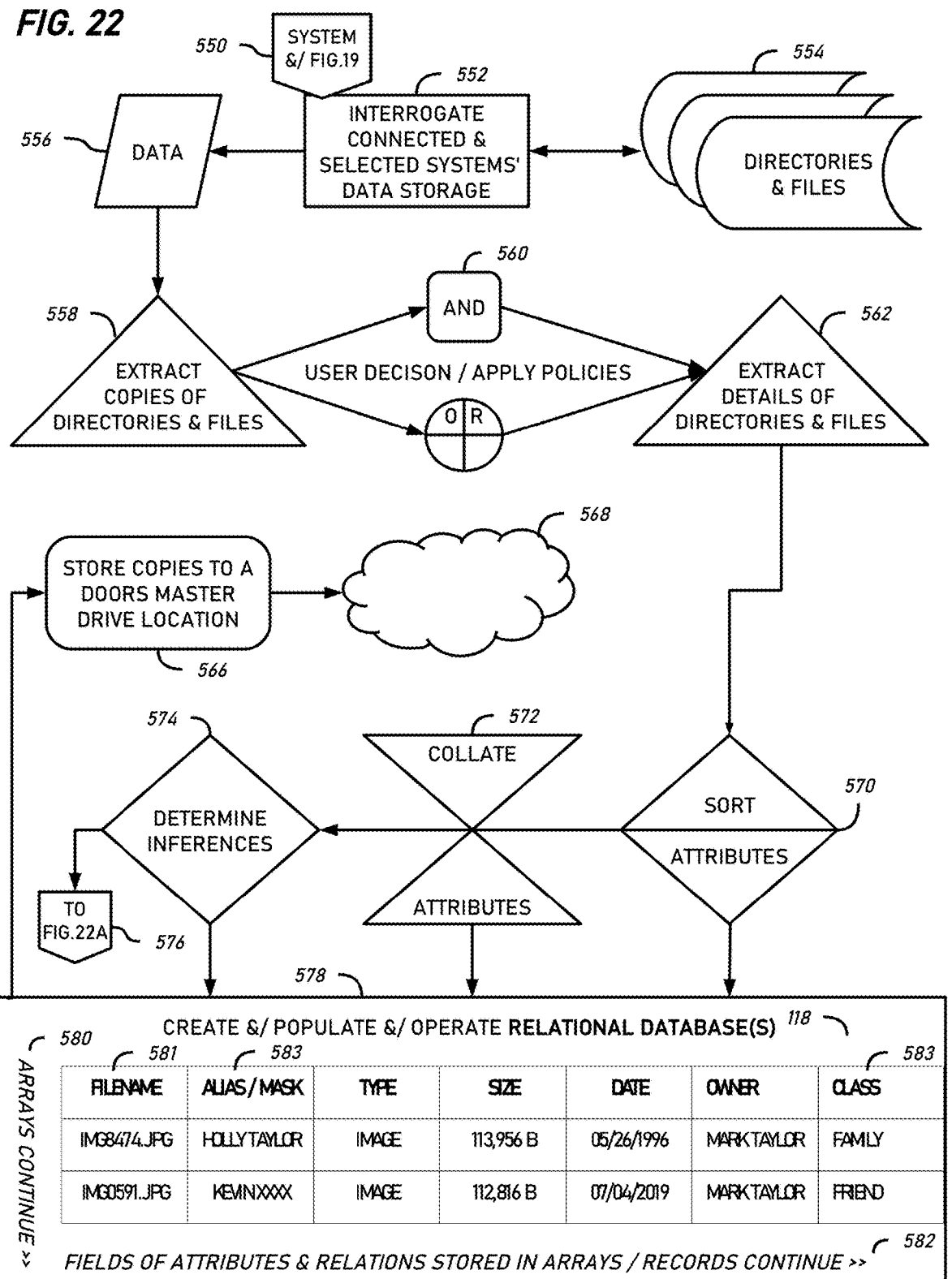
FIG. 22 is a mixed schematic and system block flow diagram of operations in accord with aspects of the subject technologies.

FIG. 22 shows an off page connection to the wider system, and/or specifically to FIG. 19, system 550. The DOORS interrogates connected and selected systems' data storage 552, reading into data and files within the storage 554, the data 556 is retrieved and processed to extract copies of directories and files 558, the user which may be human and/or an artificial intelligence engine makes the decision(s) to apply policies, and whether to also extract details of directories and files 562, then to sort data object attributes 570, to collate attributes 572, and determine inferences 574 (with an off page link to the process continuation is FIG. 22A, 576). Then taking those categorized data points creates and/or populates and/or operates relational database(s) 578 to record data and data points of the factual matrices such as a class 583, such as "family" having been found and including inferred relationships into and to operate a relational database 118. The file records may be in the form of arrays 580, which arrays of records may be infinitely extendable (and not finite or limited to a specific number) to suit the number of records needed scaling to the size of the datasets from which they are derived. Similarly, these records may have nested within them more arrays of fields 582 the number of which arrays of field may be infinitely extendable (and not finite or limited to a specific number) to permit further scaling to suit the numbers of attributes found or inferred for each file which is recorded into its record within the array of records 581 of the relational database 118. Files may have be recorded by their filenames 581, and the DOORS may also create for them an alias or mask name 583 based on the application of polices, and/or by intelligent generation via a machine learning and/or artificial intelligence module 46, as shown in FIG. 3. The use of an alias or mask name 583 may permit files to be handled by the DOORS, users may choose to replace the actual filename with a well-designed alias or mask name for easier more intuitive and inference engine friendly processing of files by the DOORS as well as user. Indeed, the original filename

581 may be swapped with the alias or mask name. So that a records of previous names for the same file can be preserved to permit greater utility and traceability of files. Which may be really useful in some cases, perhaps in law enforcement, project management, and perhaps safety critical applications where audit trails of historical data may be helpful.

FIG. 22A provides tabular views of the same structures of directories, and the with the same names as shown in tree and/or GUI views 401 in FIG. 20, and 501 in FIG. 21 as indicated by the off-page connectors 403, and 503. These tabular views provide a different view of those data structures. Which is compatible with the nomenclature and use of relational databases 118 displayed in rows and columns in tabular form, which may be more compatible with comprehension as components of relational database processes. To merge 660, data 540 from Mark's Phone, with data 460 from Mark's PC. Which process continues in more detail in the next figure.

Figure 22B:
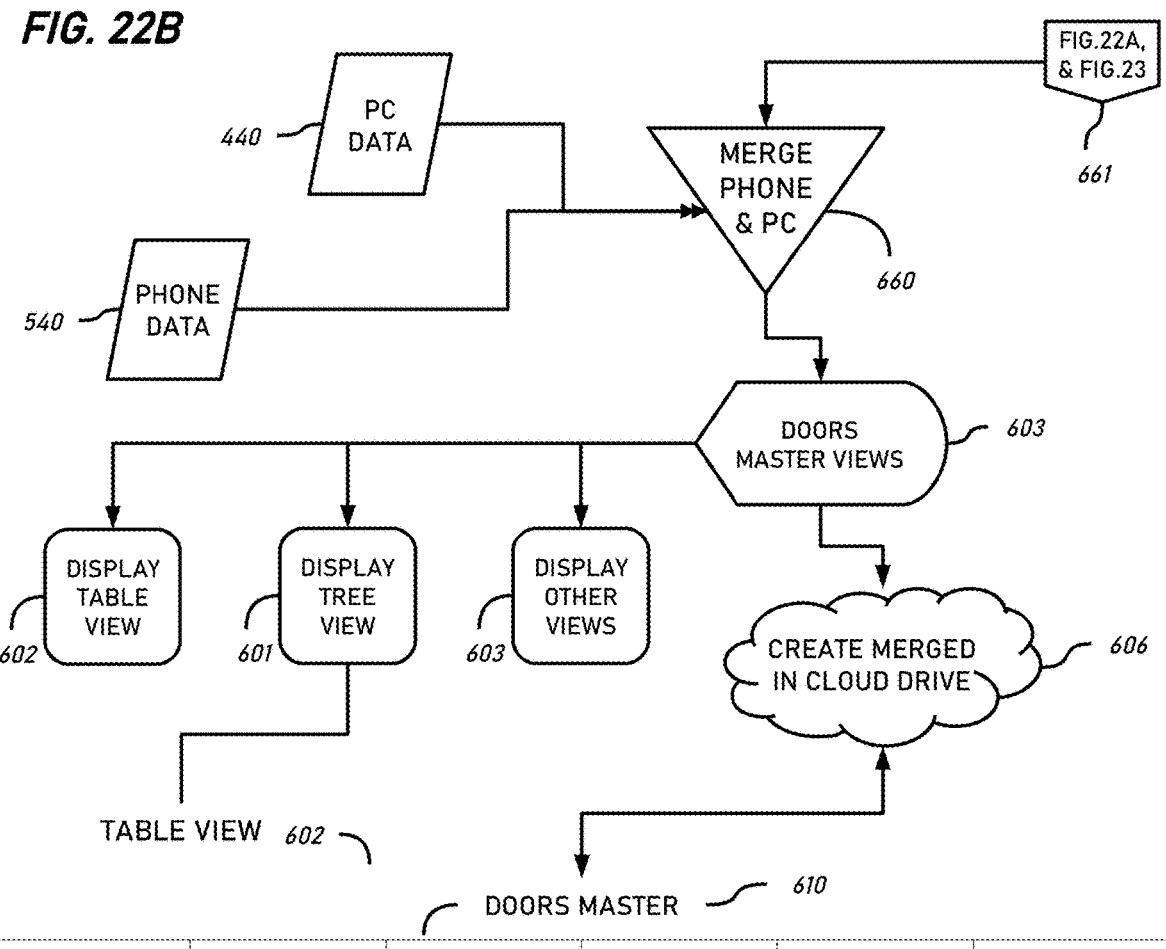
FIG. 22B is a mixed schematic and system block flow diagram of operations in accord with aspects of the subject technologies.
Figure 23:
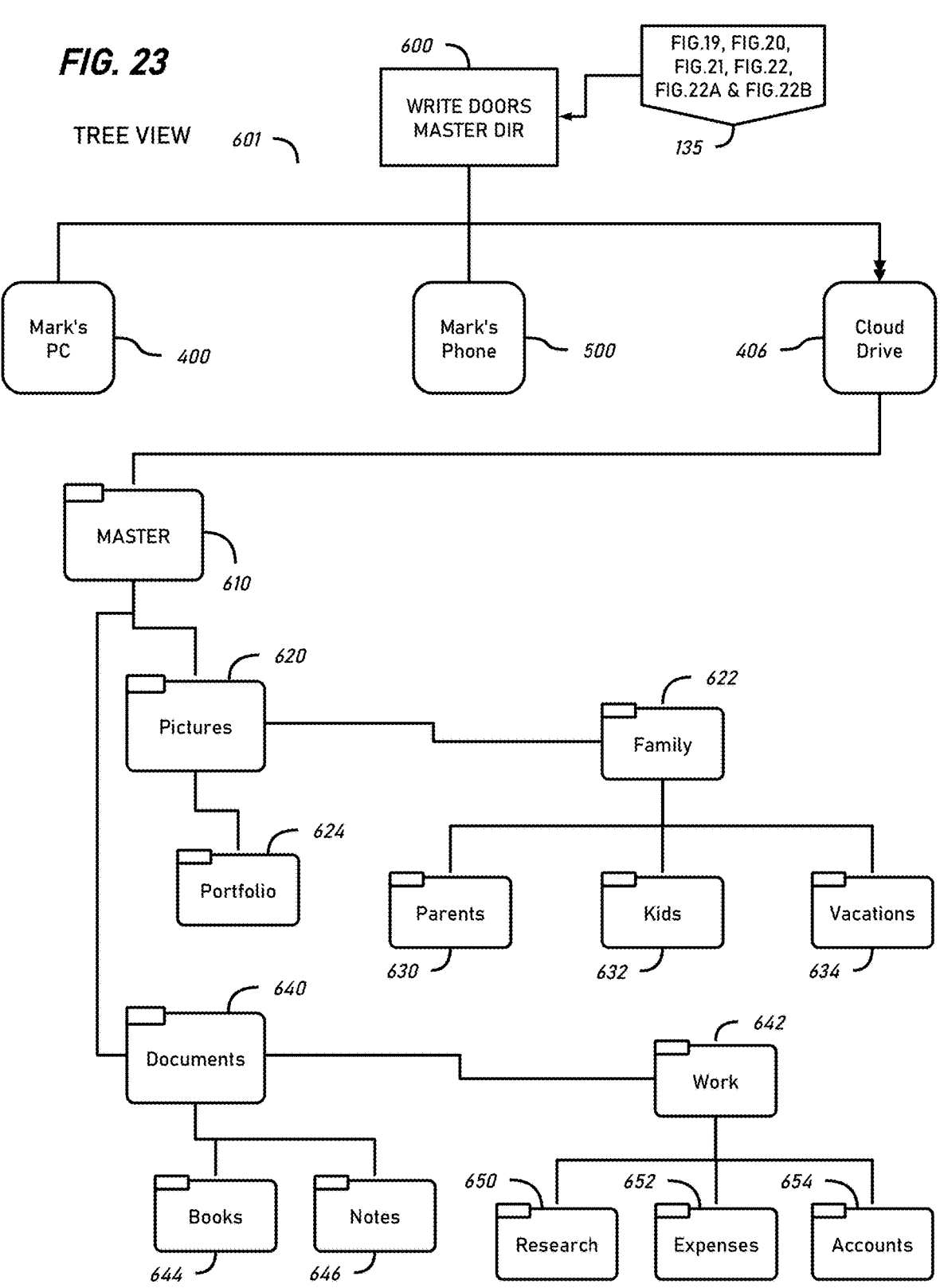
FIG. 23 is a mixed schematic and system block-flow diagram, detailing an aspect of operation on data within a directory structure according to the subject technologies.

FIG. 22B provides tabular views of the same structures of directories, and the with the same names as shown in tree and/or GUI view 601 in FIG. 23 as indicated by the off-page connector 661. The tabular view provides a different view of those data structures; which is compatible with the nomenclature and use of relational databases 118 displayed in rows and columns in tabular form. Which may be more compatible with comprehension as components of relational database processes. In this case the process steps are merge 660, PC data 440, with Phone data 540, which may be displayed in DOORS master views 603 which may be to display table view 602, or display tree view, or other views which could be GUI views for example. Which process continues, for the creation of the DOORS master 610, shown in tabular form here 602, to create the merged DOORS master 610, merged and reconciled into a cloud drive 606. In FIG. 23 below the same merged DOORS master and the decision made in reconciliation is shown in what may be a more readily accessible intuitive GUI and tree format view 601 which is functionally representing the same directory structures as this FIG. 602.

FIG. 22C begins with off page connections to FIG. 19, FIG. 20, FIG. 21, FIG. 22, FIG. 22A, FIG. 22B, and FIG. 23; and continues with a defined process of a method for operating a DOORS 100. Comprising the following process steps to merge directories:

670. Compare directory structures and names.

671. Merge matching directory structures and names.

672. Compare files of merge directories.

673. Apply duplicate handling and renaming policies. Example policies:

(a) non-identical files with duplicated names are preserved, and/or (b) identical duplicates after the first removed/omitted, and/or (c) a number added to identical and/or non-identical filename duplicates after the first.

674. Merge directories named as similes.

675. Apply simile handling policies and/or apply machine learning and/artificial intelligence choices and/human user choices.

676. Merge directories where relationship inferences from relations are produced by application of policies, and/or machine learning, and/or artificial intelligence, and/or human user selections.

677. Apply relationship handling policies and/or apply machine learning and/or ai choices and/or human user choices (<<loop back to step 670 if/when merging decision made until completed).

FIG. 23 shows the creation of a DOORS Master directory 600 into a Cloud Drive 406. By a DOORS 100 running in the local device or on a connected device 135 with access to all three of the alternative source devices and or locations of resources shown; comprised of Mark's PC 400, Mark's Phone 500, and Cloud Drive 406.

The directories from Mark's PC 400 as shown in FIG. 20, and Mark's Phone 500 as shown in FIG. 10 are being processed by the DOORS 100 application, to create a new DOORS Master directory in the Cloud Drive 406. The DOORS 100 analyzes the two source directories seeking to discover the contents and relationships between the contents and purposes of the data sets that are to be organized, optimized, and reconciled into one master data set, that includes both source data sets, and which is designed to follow the reasoning, storage, naming, and other patterns of the source directories. To understand this process FIG. 19, FIG. 20, FIG. 21, FIG. 22, FIG. 22A and FIG. 22B are considered together, as the DOORS works its way through the process of creating a DOORS Master to build the merged master directory structure and placement of files within that structure.

The DOORS interrogates the root and branch directories of attached source devices. In the root directory of Mark's PC 400, of the SSD 402 there are found the C:/Windows User Directory 410 and C:/Temp 412, the latter of which is found to be empty and is thus ignored. The root directory of Mark's Phone 500, Internal Storage 502 is then similarly interrogated, and only the Internal Storage/User Directory 510 is found. So, the DOORS compares these two source directories. The two directories may be merged to create in the Cloud Drive 406 the DOORS Master directory Cloud Drive/DOORS MASTER 610 at the first level. Into which all the source files and any sub-directories are duplicated.

At the second level the DOORS 100 creates the new directories Cloud Drive/MASTER/Pictures 620, by merging the Pictures 420 directory from Mark's PC 400, and the Pictures 520 directory from Mark's Phone 500. As an example, DOORS 100 was able to detect that these directory names are a direct and total match, furthermore that their contents are mainly or exclusively comprised of file formats that are used for images and have file extensions of known image data file types such as ".JPG", and ".PNG", plus there is intrinsic recognizable image data, and meta-data in the files they contain.

The new directory Cloud Drive/MASTER/Documents 640, is created by merging the Documents 430 directory from Mark's PC 400, and the Documents 530 directory from Mark's Phone 500. In this case the DOORS 100 was again able to detect that these directory names are a direct and total match, furthermore that their contents are mainly or exclusively comprised of file formats that are used for various documents such as text-based word-processed files with extensions such as ".DOCX", ".RTF", ".TXT", spreadsheet files such as ".XLS", and portable document files ".PDF". So far so good, the DOORS is merging these folders logically and sensibly just as a user would by operating the process or applying the method in person.

However, it is at the next level of directories that directories are encountered in one source location on one device that have no direct match on the other device and vice versa. This increases the difficulty level of the decisions that the DOORS 100 has to make to effectively design a truly new data structure—with no direct equivalent in any of the source drives of the connected devices. This is where the DOORS 100 has to get smart, and where it can take not only the tedium out of looking after and managing user's precious data, but also at this level DOORS 100 may be used to free the user of the mental work needed to make and implement those choices.

In the current example the DOORS artificial intelligence helper module has detected that in Mark's PC 400 the Pictures directory 400 there are sub-directories named "Mark" 422, "Parents" 424, "Kids" 426, and "Vacations" 428, and found filenames such as "mom 2016.jpg" and inferred that this is probably a photograph of the user's mother. "DadsBirthday2000.jpg" and inferred this is probably a photograph of the user's father. In the Pictures directory 520 of Mark's Phone 500 there are sub-directories "Misc" 522, "Portfolio" 524, "Family" 526, and "My Children" 528.

The DOORS 100 has also detected that the "Misc" 522 directory is empty and hence decides to record its presence, but not to bother reproducing it into the Master. The directory "Portfolio" 524 contains images of paintings, some of which have been signed with the name "B. A. Taylor" and DOORS 100 knows from its previous interactions with user data and with the user that B. A. Taylor is Barbara Ann Taylor, who is the user's mother, also known as "mum" or "mom", and that she is a member of the class "Family". Which data and relationships are already recorded in the relational database 118. The DOORS processing of the data of the source directories continues to work its way through them to notice that "Family" 526 is also a directory within Mark's Phone. Reading further along the next directory "My Children" 528 is a name that is a simile of the "Kids" 426 directory name, and the file names found in both directories are pictures of Mark's children. At this point the DOORS is able to decide to create within the DOORS Master 610, the "Pictures" 620 directory, with the sub-directories "Portfolio" 624 and "Family" 622 which are reproduced there as is. Then to nest within the "Family" directory the sub-directories "Parents" 630, and "Kids" 632 which is comprised of the merged contents of the "Kids" 426, and "My Children" 528 directories. Finally, inside the new "Pictures" 620 directory the DOORS artificial intelligence helper module having noticed and connected the relationships that the "Vacations" 428 directory from Mark's PC contains mainly photographs also of identifiable "Family" members in vacation locations. For this reason, the DOORS is able to infer that this directory would probably be intuitively easy to find if it were kept with the others that include a "Family" member, and so the new "Vacations" 634 directory is created also as a sub-directory within the "Family" 622 directory. Whereas the contents of the "Mark" directory 422 are reproduced to the root directory of "Pictures" 620 because the DOORS has noticed that there are already other images of the user Mark in the root directory and this seems to be his preferred or default place to store the majority of the pictures of himself on his phone.

When trying to understand how the DOORS has reconciled the data from Mark's PC and Mark's Phone to create the Master 610 in his Cloud Drive 406, it is helpful to look at FIGS. 20, 21 and 23 side by side because they are presented in a graphical user interface (GUI) format, which will greatly aid the reader's ready comprehension of how in practice the subject technology operates in the intuitive ways to which we are now accustomed to interacting with data. There it may be understood that the "Documents" 430 directory from Mark's PC is merged with the "Documents" 530 directory from Mark's Phone, to create duplicates of their files in the merged Master as the sub-directory "Documents" 640, with sub-directories "Work" 642, that has its own further sub-directories "Research" 650, "Expenses" 652, and "Accounts" 654. While "Books" 644, and "Notes" are sub-directories of "Documents" 640 on the same level within the structure as the "Work" 642 directory. The DOORS has created this merged master Documents directory using the same principles, logic, and artificial intelligence helper module in the same way as it did with the "Pictures" 620 directory, explained in detail (above).

Figures 24, 24A:
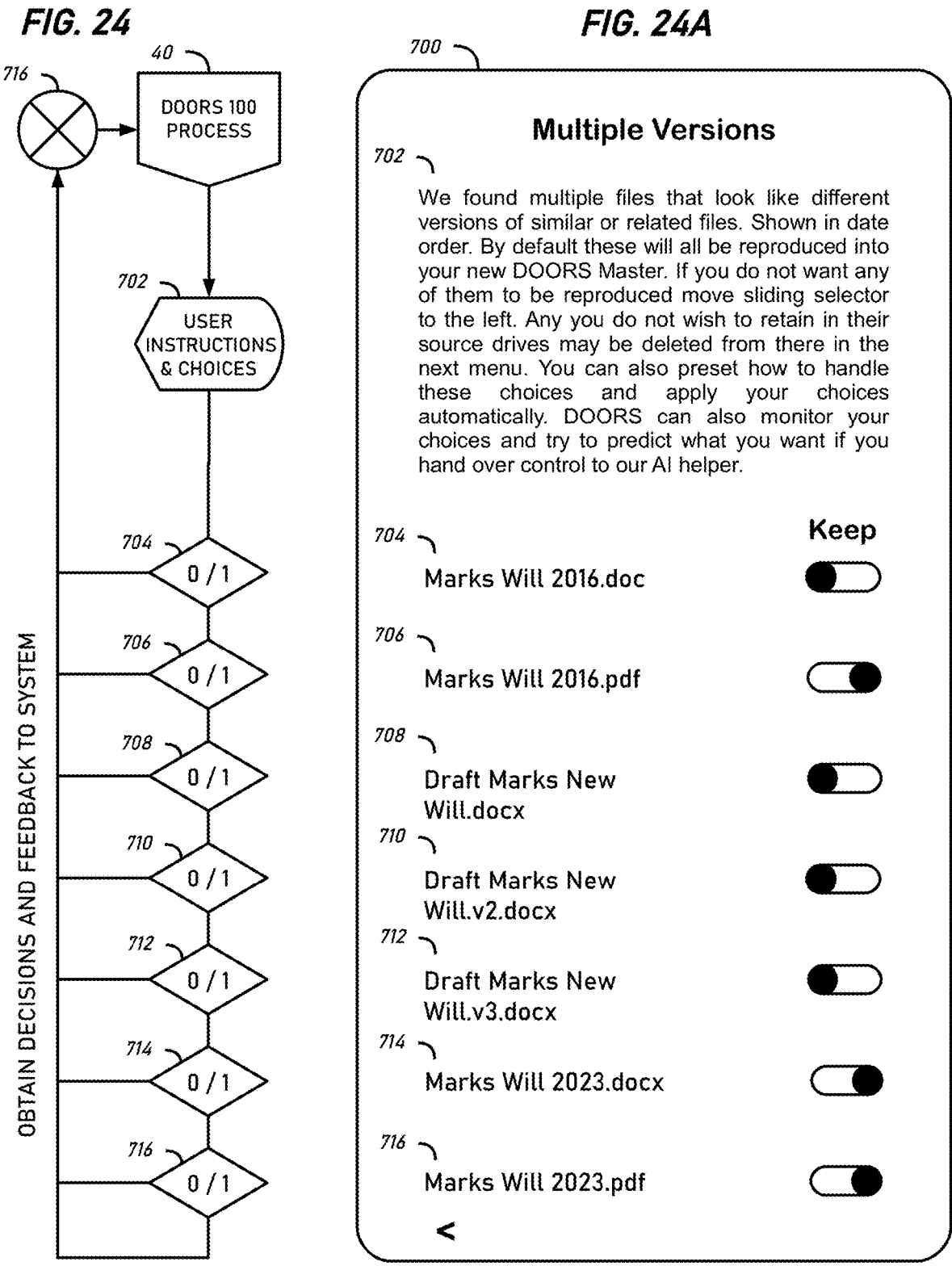
FIG. 24 is a system block-flow system diagram of an interface according to the subject technologies.
FIG. 24A is an interface display screen according to the subject technologies.

FIG. 24 should be read alongside and across side to side with FIG. 24A which shows a DOORS user interface for handling "multiple versions" of files 700 is a continuing process 40 of a DOORS 100, relating to presentation of options and obtaining the user's decisions via the view screen user interface 700, in which the user is offered various options via a button slider switch capable to toggle between the "off" to the left and "on" to the right positions to select to "keep" a file. In the system flow diagram these decisions 704, 706, 708, 710, 712, 714, and 716 may be operated by the DOORS according to Boolean logic when zero "0" is returned for a user input selection of "off" and one "1" is returned for a user input selection of "on", the results of which decisions are returned via a feedback loop 716 and may be passed-on as values to the DOORS 100 according to system parameters.

FIG. 24A is a mobile phone touch-screen interface operating as the platform the DOORS 100 interface for obtaining user choices in relation to "Multiple Versions" 700. It presents this message to the user:

"We found multiple files that look like different versions of similar or related files. Shown in date order. By default, these will all be reproduced into your new DOORS Master. If you do not want any of them to be reproduced move sliding selector to the left. Any you do not wish to retain in their source drives may be deleted from there in the next menu. You can also preset how to handle these choices and apply your choices automatically. DOORS can also monitor your choices and try to predict what you want if you hand over control to our AI helper." 702

The files shown may have been identified by the DOORS 100 in the process of creating a master copy. Which process may be assisted by a language recognition module 33, and/or document recognition module 35 and/or other inference engine as may operate on the relational database 118. So that using intrinsic and/or extrinsic attributes they may be identified as versions of the same original file.

A slider button is provided, that the DOORS 100 may set to the right by default, which indicates the version will be reproduced into the new central master directory in the cloud drive, unless the user swipes (toggles) the slider to the left to omit that particular file. The decisions made by the user are:—"Marks Will 2016.doc" 704, is set to the left meaning do not reproduce this file into the master; "Marks Will 2016.pdf" 706, is set to the right meaning reproduce this file into the master; "Draft Marks New Will.docx" 708, is set to the left meaning do not reproduce this file into the master; "Draft Marks New Will.v2.docx" 710, is set to the left meaning do not reproduce this file into the master; "Draft Marks New Will.v3.docx" 712, is set to the left meaning do not reproduce this file into the master; "Marks Will 714 2023.docx" 714, is set to the right meaning reproduce this file into the master; "Marks Will 2023.pdf" 716, is set to the right meaning reproduce this file into the master; Mark's reasons for these choices are that he only needs portable document (.pdf) version of his old Will, plus the new 2023 Will in both the Microsoft Word (.docx) version for editing and rewrites plus the portable document format (.pdf) version for a read only record of the final version that is to be signed and notarized. From which choices the artificial intelligence helper module may record them in the relational database 118 and from this experiential data the DOORS 100 may learn the user's preference for retaining copies of historic documents in portable document format, and also keeping current working versions of files in both word processing format and in portable document format.

Figures 25, 25A:
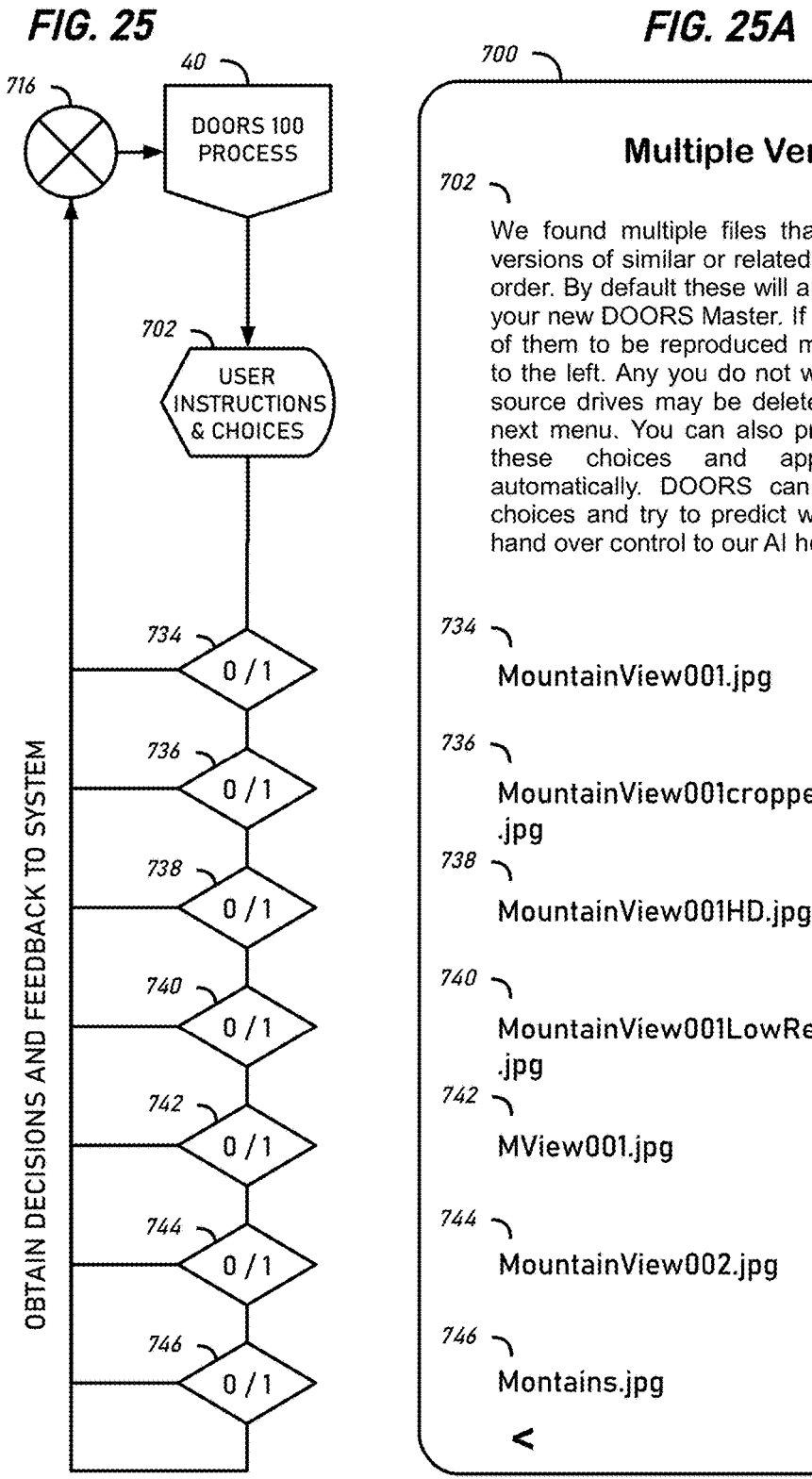
FIG. 25 is a system block-flow system diagram of an interface according to the subject technologies.
FIG. 25A is an interface display screen according to the subject technologies.

FIG. 25 should be read alongside and across side to side with FIG. 25A which shows a DOORS user interface for handling "Multiple Versions" of files 700 is a continuing process 40 of a DOORS 100, relating to presentation of options and obtaining the user's decisions via the view screen user interface 700, in which the user is offered various options via a button slider switch capable to toggle between the "off" to the left and "on" to the right positions to select to "keep" a file. In the system flow diagram these decisions 734, 736, 738, 740, 742, 744, and 746 may be operated by the DOORS according to Boolean logic when zero "0" is returned for a user input selection of "off" and one "1" is returned for a user input selection of "on", the results of which decisions are returned via a feedback loop 716 and may be passed-on as values to the DOORS 100 according to system parameters.

FIG. 25A contains another example of the "Multiple Versions" interface 700, which is similar to FIG. 24, in relation to building a master directory. Except that the former related to multiple versions of similar or related documents, and this one relates to similar or related image files (with the extrinsic attribute the ".jpg" extension). With other extrinsic attributes in the form of machine learning or artificial intelligence using such attributes to infer one of more of their relationships, and hence that they have been identified as probable variants of files due to inter alia their file names on the theme of mountains: "Mountain View001.jpg" 734, "Mountain View001cropped.jpg" 736, "Mountain View001LowRes.jpg" 740, "MView001.jpg" 742, which may be categorized as abbreviated versions of a first image file, which may be inferred by the DOORS 100 by textual analysis and the identification is similarities in their extrinsic attributes of their file names and type; and also by image recognition of their intrinsic pixel data in which patterns may be recognized as common to them all, which may be assisted by a language recognition module 33, and/or image recognition module 34 and/or other inference engine as may operate on the relational database 118. So that interrogating and using their intrinsic and/or extrinsic attributes they may be identified as versions of the same original file. The DOORS has also successfully recognized the file with misspelled named "Montains.jpg" 746, as probably a misspelled form of the word mountains as an extrinsic attribute, again this decision may have been reinforced by image recognition 34, and the various decisions made regarding whether or not to reproduce them in each case. Again the user's decisions as are provided as feedback 716 to the DOORS 100 may be recorded and/or used as learning experience through use 50, and thereafter added to the stock of training data 48, for a neural network 52 as part of the artificial intelligence engine and/or recorded into the relational database 118 from where feedback data 716 may be used by an inference engine, that may be based on machine learning 46, and be assisted by condition matching classical logic-based 30, computing module 44, of a DOORS 100.

Figures 26, 26A:
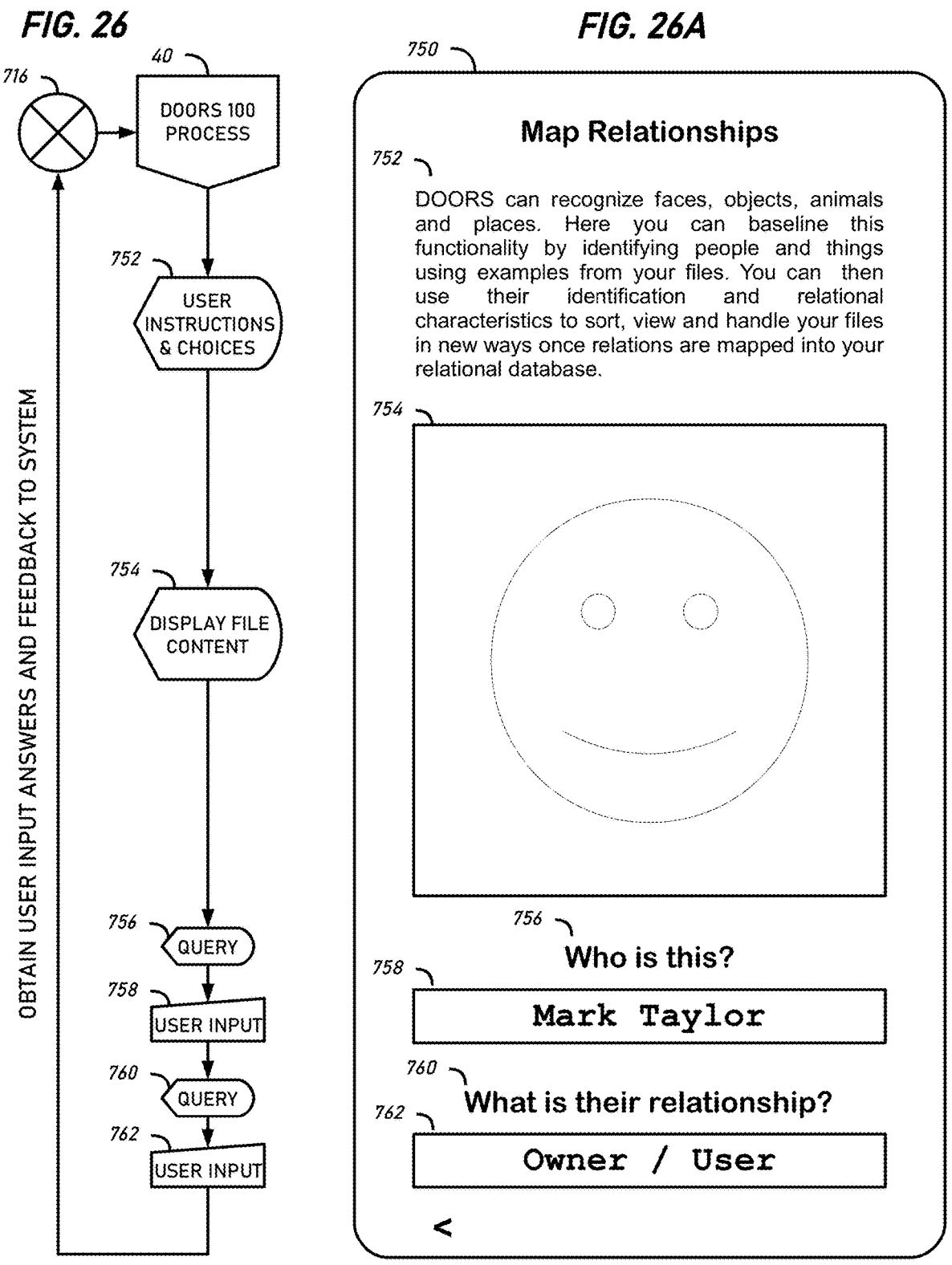
FIG. 26 is a system block-flow system diagram of an interface according to the subject technologies.
FIG. 26A is an interface display screen according to the subject technologies.

FIG. 26 should be read alongside and across side to side with FIG. 26A which shows the same system component parts organized and implemented to operate as a DOORS user interface on a mobile phone, capable of assisting to "Map Relationships" 750, which is a continuing process 40 of a DOORS 100, relating to presentation of instructions and choices 752. The interface presents this message to the user:

"DOORS can recognize faces, objects, animals and places. Here you can baseline this functionality by identifying people and things using examples from your files. You can then use their identification and relational characteristics to sort, view and handle your files in new ways once relations are mapped into your relational database." 752

The interface continues by displaying file contents 754, which in this case includes an image of a person 754, then reading down the screen presenting the query "Who is this?" 756, is presented as a prompt for user input (as a text string) 758, to which the user has replied "Mark Taylor" 758 and the query "What is their relationship?" 760, as a prompt for user input (as a text string) 762, to which the user has replied "Owner/User" 762; which inputs are returned to the system via a feedback loop 716 and may be passed-on as strings of text to the DOORS 100 according to system parameters.

FIG. 26A, shows the "Map Relationships" user interface 750. Which may have been presented because the DOORS 100 may have been running the background (in terminate and stay resident (TSR) mode 15). So that it may interject within user operations as and when desirable. Which condition may have been triggered because the user has just used his mobile phone to take a new selfie, for use in a user profile for some random purpose. So that the DOORS 100 while running in the background, may have been triggered so the user may be prompted to use the "Map Relationships" interface 750, operating on the touch-screen of his mobile phone.

It may be that the DOORS 100 would be able to infer the identity of a person in an image without invoking the "Map Relationships" interface 750 if it already has experienced an image of that same person, and has mapped pixel data patterns into its relational database 118, for machine learning, and/or added its experiences 50, to train the weightings of a synthetic neural network 52 of an artificial intelligence module 46.

The more user-based input the DOORS can obtain at apposite times, when the user is engaged with the data in question—the better and more comprehensive the image processing and/or learning may be made. Especially, because the DOORS is designed to customize itself to the user, so that it may more perfectly emulate his or her file naming, placement, and other preferences. Persons skilled in the art will appreciate that a similar interface configured for and used with a computer, and monitor screen interface when encountering a new file or image could perform the same function as these interface embodiments shown here which are configured for use in combination with mobile phones.

Referring to the image displayed 754, and using the question "Who is this?" 756 the DOORS seeks and gains the answer "Mark Taylor" 758 from the user, then asks "What is their relationship?" 760 in seeking to obtain the class or relationship of the person in the image 754, and he has replied "Owner/User" 762. These are just a few of the relationships that DOORS has been able to discover and then map into machine learning, and/or into a relational database, and/or into the learning of a synthetic neural network. Furthermore, the DOORS may learn and/or generate inferences from the files and data structures the user may create for this image and/or obtain from correctly relating it to other files 62, and/or related facts 60R, and/or fact matrices 71 as may found on Mark's PC, and Mark's Phone in this example of operations using a DOORS.

Figure 27:
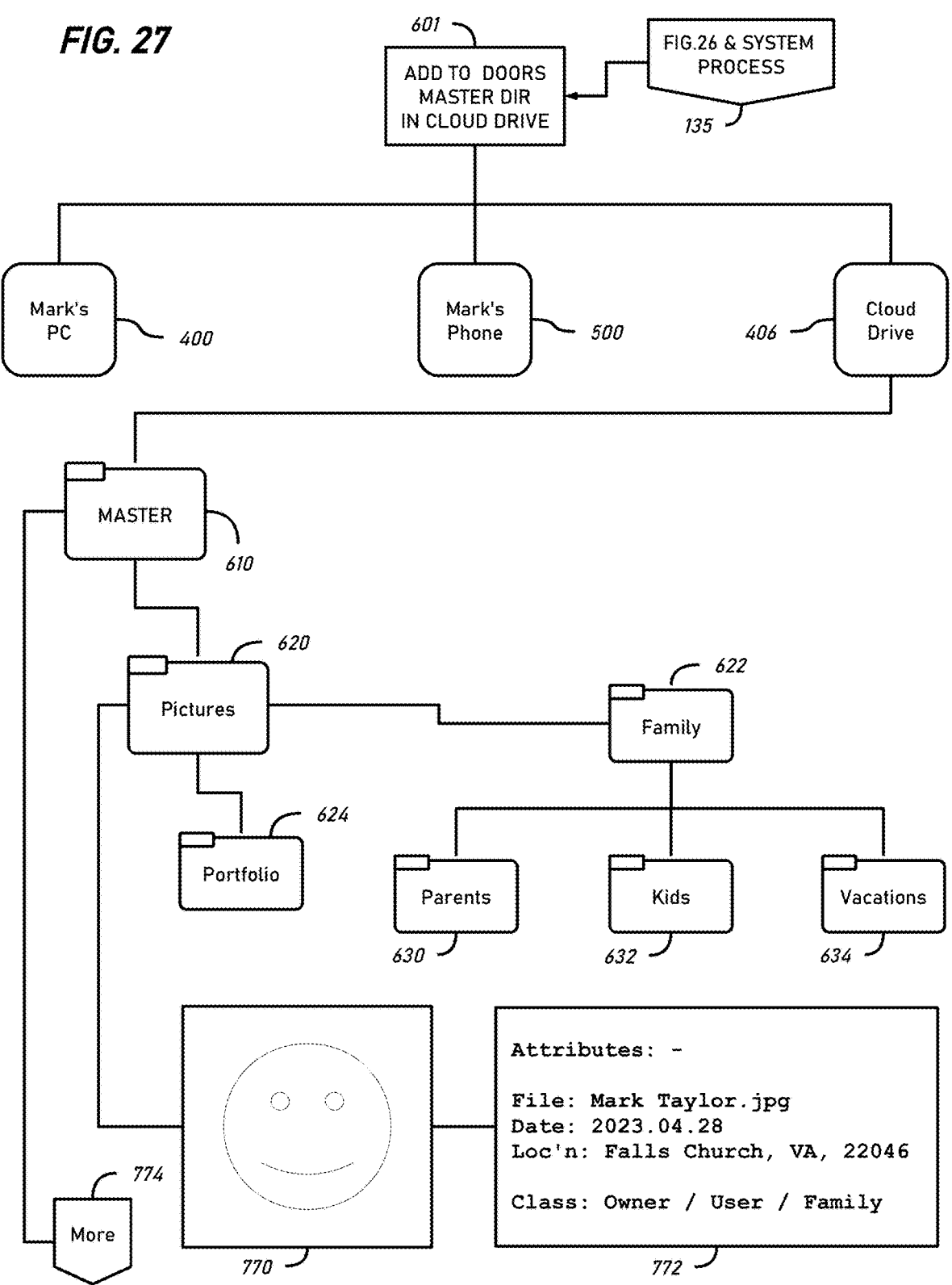
FIG. 27 is a mixed schematic and system block-flow diagram, detailing an aspect of operation on data within a directory structure according to the subject technologies.

FIG. 27 shows the image file for "Mark Taylor" 758, being saved or reproduced by the DOORS into the "Pictures" 620 directory (also known as a folder) of the "MASTER" 610 directory or folder. Readers may recognize the DOORS MASTER directory 610, in the Cloud Drive 406 from previous figures, and may also recall, that the user's preference is in previous was to store such image files into the Pictures 620 directory. The image file 770 is stored with the name "Mark Taylor.jpg", and other attributes recorded including the date, location, and class 772 inspection of which reveals that the classes that apply to the user are "Owner/User/Family". These classes are useful when building-out a factual matrix 71 for a data entity. Data entities may be just about anything, such as and event, a person, corporation, or place. Data entities may be useful in building a bigger factual matrix 71 for the whole of a DOORS 100 knowledge of which may be recorded and stored within the machine learning data and data patterns as may be stored within a relational database 118, and/or be recorded and stored within the weightings of neuronal nodes within synthetic electronic neural networks (SENN) 52. Diverse examples of which SENN may be found in FIG. 3 above 52, and item 2298 of FIG. 43 below.

Figures 28, 28A:
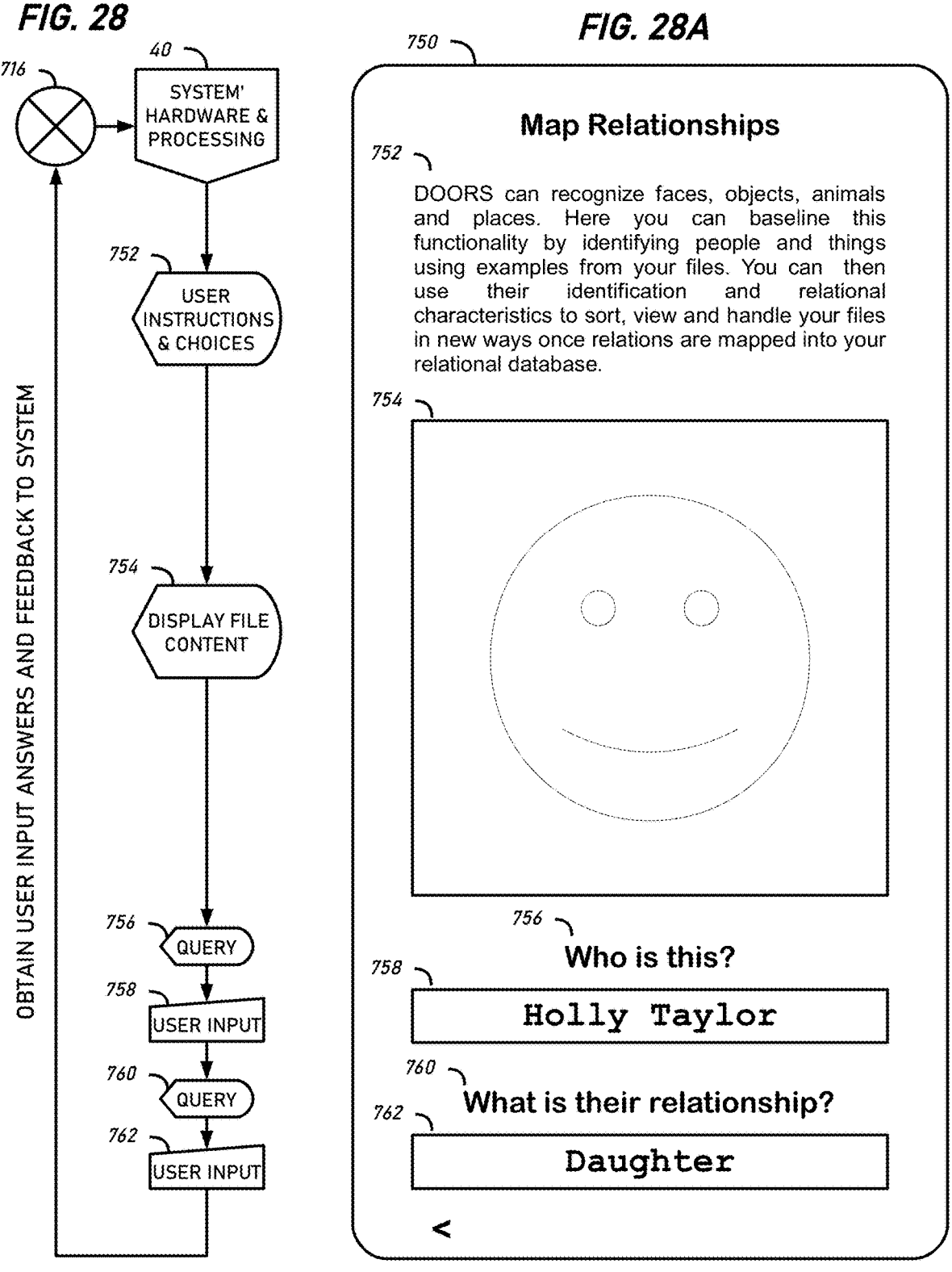
FIG. 28 is a system block-flow system diagram of an interface according to the subject technologies.
FIG. 28A is an interface display screen according to the subject technologies.

FIG. 28 should be read alongside and across side to side with FIG. 28A which shows a DOORS user interface for handling "Map Relationships" 750 is a continuing process 40 of a DOORS 100, relating to presentation of instructions and choices 752, displaying file contents 754, presenting the query "Who is this?" 756, to obtain user input (as a text string) 758, and the query "What is their relationship?" 760, to obtain user input (as a text string) 762, which inputs are returned via a feedback back loop 716 and may be passed-on as strings of text to the DOORS 100 according to system parameters.

FIG. 28A shows the "Map Relationships" screen interface 750 of a DOORS 100 running on a mobile phone. It may be that DOORS is running a periodic routine update to a DOORS Master, stored in a Cloud Drive, or perhaps the user may be creating a new DOORS master. In such a process an unknown picture has been found and displayed 754, and the user is being prompted with the question "Who is this?" 75 and "What is their relationship?" 760. To which interrogation questions the user replied "Holly Taylor" 758, and "Daughter" 762 respectively.

Figure 29:
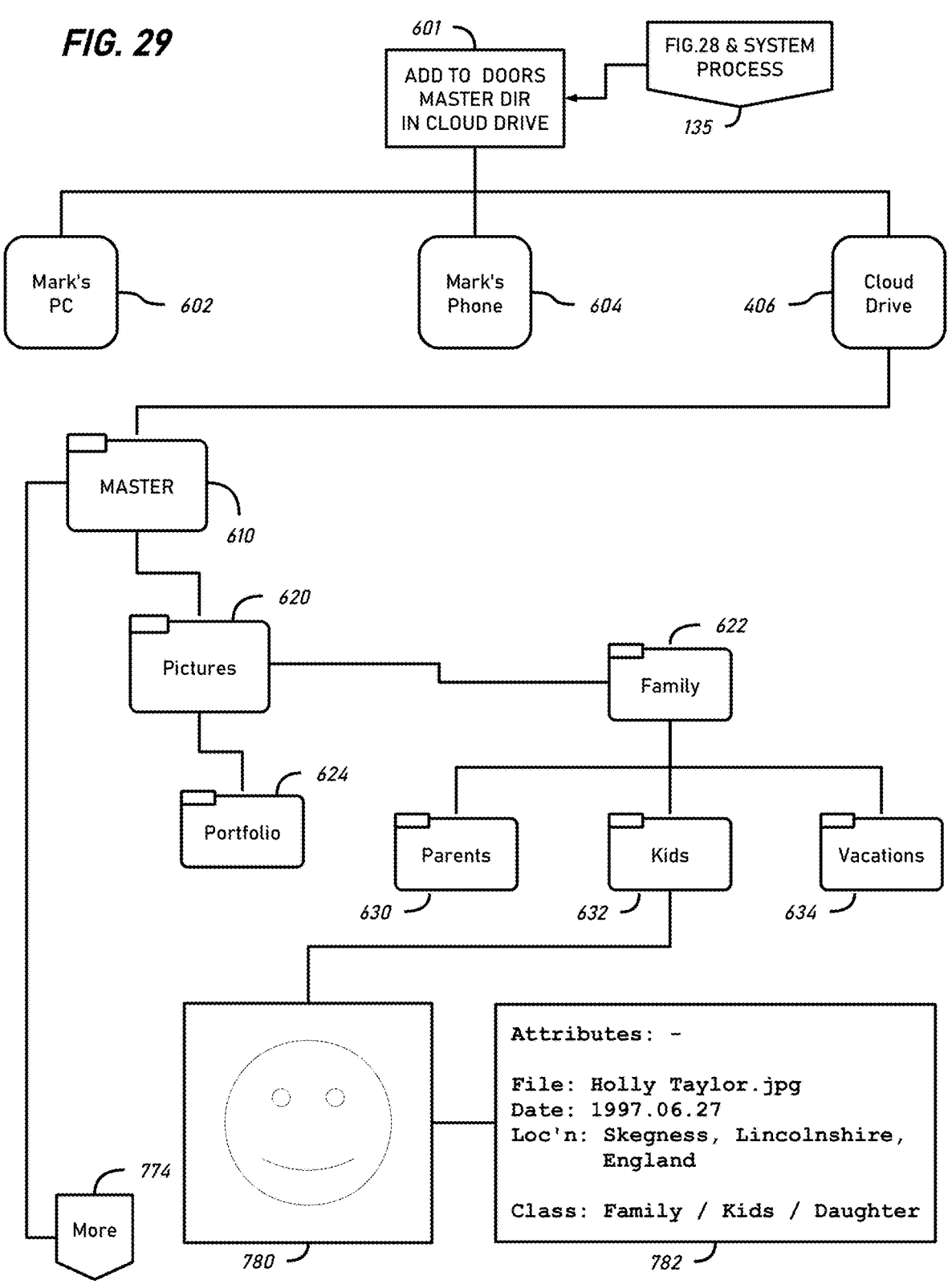
FIG. 29 is a mixed schematic and system block-flow diagram, detailing an aspect of operation on data within a directory structure according to the subject technologies.

FIG. 29 shows the DOORS 100 having performed its relational inferencing and applying its prior learning, so that the DOORS is seen adding the newly discovered image of "Holly Taylor" 780, with relationship 762 "Daughter" to the DOORS master 601 directory which is unsurprisingly named "MASTER" 610, in the Cloud Drive 406.

To accomplish this fete the DOORS 100 checks the attributes 782 of the image file 780, noticing that the extrinsic relationship "Daughter" is included within the factual matrix 71 which contains the data points and/or factoids "Holly Taylor", "Daughter of Mark Taylor", "Mark is father of Holly and son of Mom", "Granddaughter of Mark's Mom, Barbara Taylor" as well as including "Facial and/or image recognition data" which may be recorded in a field of the records for classes (see FIG. 14, which shows the records of the relational database for the class "family" 395, and includes a field confirming the presence of facial recognition data for Holly) matching the person in the image file. From class of relationships the DOORS is able to infer that the image file should be given the alias or mask name and/or if no naming collisions will be created by using that name, then the file should be renamed "Holly Taylor" and added to the classes: "Family", "Kids", and "Daughter" in the relational database 118, and/or run on the SENN as and recorded into the weighted learning aspect of the nodes of the SENN as a pattern match for Holly Taylor. So that in future the DOORS may more efficiently and easily identify other images of the person in the image Holly Taylor, and be able to store them into the most appropriate location within the master copy of the user's data, in the directory labelled "MASTER" 610, in the user's Cloud Drive 406.

Hence the applicable main class is "Family" and the sub-sets are "Kids" the simile "Children" and "Daughter". The DOORS 100 then checks the available directories for a match to the inferred relationships from the factual matrix 71 and/or class or classes 583 in the relational database 118.

The directory "Pictures" 620, includes the sub-directory "Family" 622, which includes the sub-directory or folder "Kids" 632. Which is the best match that the DOORS 100 can find in which to put the image file "Holly Taylor.jpg" 780, with those attributes 782. Which process steps are executed, before the process moves on, to more 774 next steps in the DOORS processes that are off page.

FIG. 30 should be read alongside and across side to side with FIG. 30A which shows a DOORS user interface for handling "Map Relationships" 750 is a continuing process 40 of a DOORS 100, relating to presentation of instructions and choices (shown above in full) 752, displaying file contents comprised of an image file 754, presenting the query "Who is this" 756, seeking user input (as a text string) 758, and the query "What is their relationship" 760, user input (as a text string) 762, which inputs are returned via a feedback back loop 716 and may be passed-on as strings of text to the DOORS 100 according to system parameters.

FIG. 30A shows a touchscreen interface on a mobile phone the same interface dialogue 750 for the next image file and displays the image 754. Which the DOORS has found and which is to be relationally mapped to assist the naming and placement of the file within a DOORS master copy of the user's files, which is to be stored into a Cloud infrastructure. Asking "Who is this?" 756, and "What is their relationship?" 760. To which interrogatory questions the user has replied "Kevin" 758, and "Friend" 762 respectively.

Figure 31:
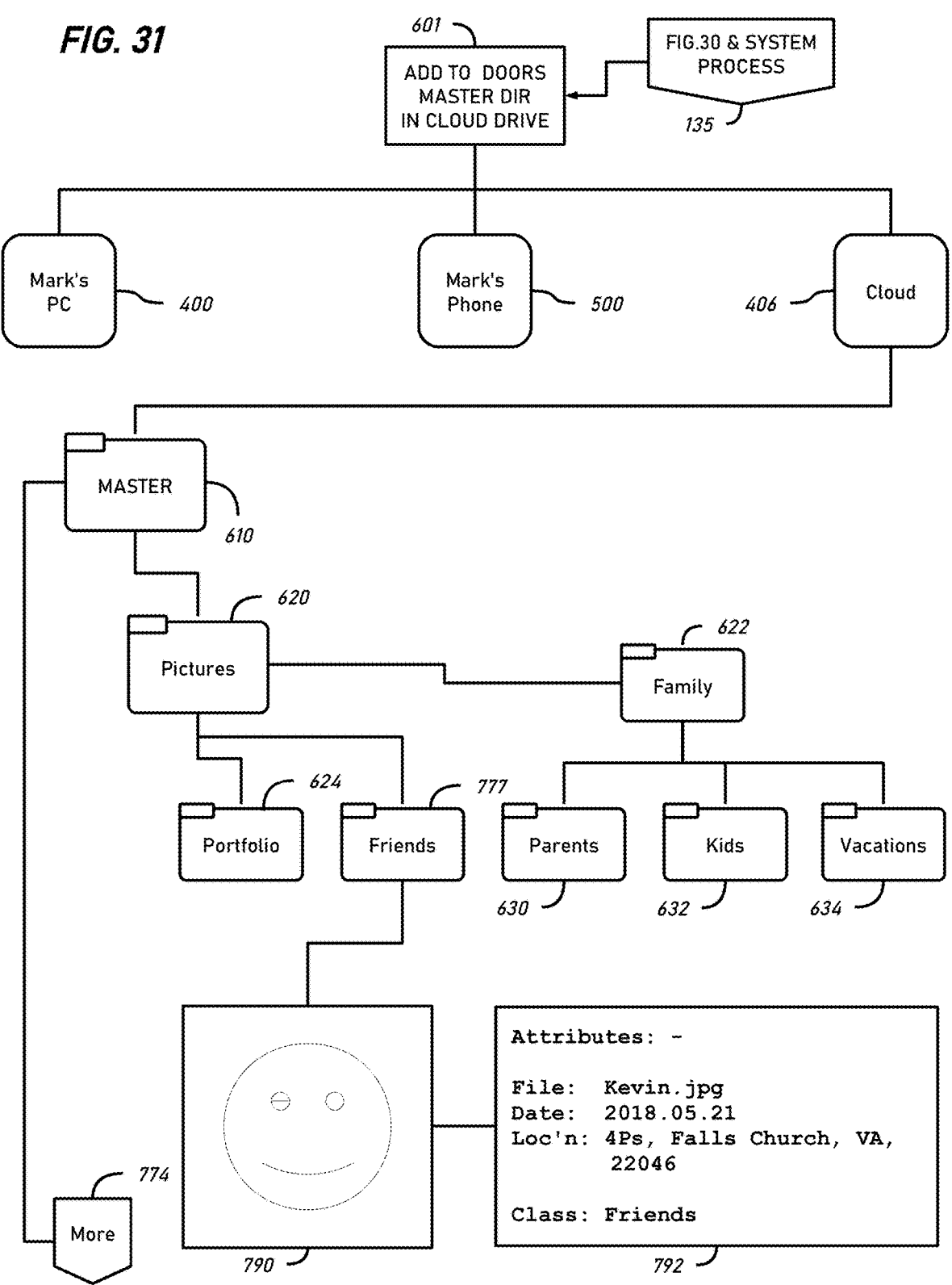
FIG. 31 is a mixed schematic and system block-flow diagram, detailing an aspect of operation on data within a directory structure according to the subject technologies.

FIG. 31 shows the DOORS 100 adding the new image of "Kevin" 758, with relationship 762 "Friend" which is also a class 583, recorded in a field of the relational database records the records for the class "Friends" 396 (see FIG. 22, and FIG. 15 respectively) recorded 578 in the relational database 118. Which attributes are used by the DOORS to determine where to place the file within the applicable master directory, which is unsurprisingly labelled "MASTER" 601 and can be seen as a directory 610, inside the Cloud drive 406. The DOORS 100 checks the attributes 792 of the image file 790, noticing that the relationship 762 "Friend" to identify that this relationship is included within the class of relationships designated "Friends" within the relations and classes recorded in relational database 118. Hence the DOORS 100 knows that the applicable class 583, for pictures of Kevin is "Friends". The DOORS 100 then checks among the available directories of the cloud drive for a match to the inferred relationships and or classes. The directory "Pictures" 620, includes the sub-directory "Friends" 777. Which is the best match that the DOORS 100 can find, in fact a perfect match into which to store the image file "Kevin.jpg" 790, with those attributes 792. Additional relational location attributes are also recorded with other details of the file into the relational database 118, that may help build a fact matrix around the file and Kevin. This Kevin is a partial match with the "Kevin XXXX" found in the relational database and these files thus become linked with other files which have some nexus with Kevin. Which process steps are executed, before the process moves on, to more next steps in the DOORS process that are connected 774.

FIG. 32 should be read alongside and across side to side with FIG. 32A which shows a DOORS user interface for handling "Map Relationships" 750 is a continuing process 40 of a DOORS 100, relating to presentation of instructions and choices 752, displaying file contents 754, presenting the query "What is this?" 770, seeking user input (as a text string) 759, and the query "What is the relationship?" 772, seeking user input (as a text string) 773, which inputs are returned to via a feedback back loop 716 for processing and may be passed-on as strings of text to the DOORS 100 according to system parameters.

FIG. 32A shows the same interface dialogue 750 as previous figures, for the next image file that has been found in the storage of one of the source devices and which is to be mapped into the relational database 118 and which image the interface displays 754. Image recognition 34 processing has noticed that the image does not contain any data patterns that would indicate the presence of a person, and consequently the DOORS 100 is not asking who is this, but instead is asking "What is this?" 770, and "What is the relationship?" 772. To which interrogatory questions the user replied "A flower" 759, and "Mom's garden nature" 773.

Figure 33:
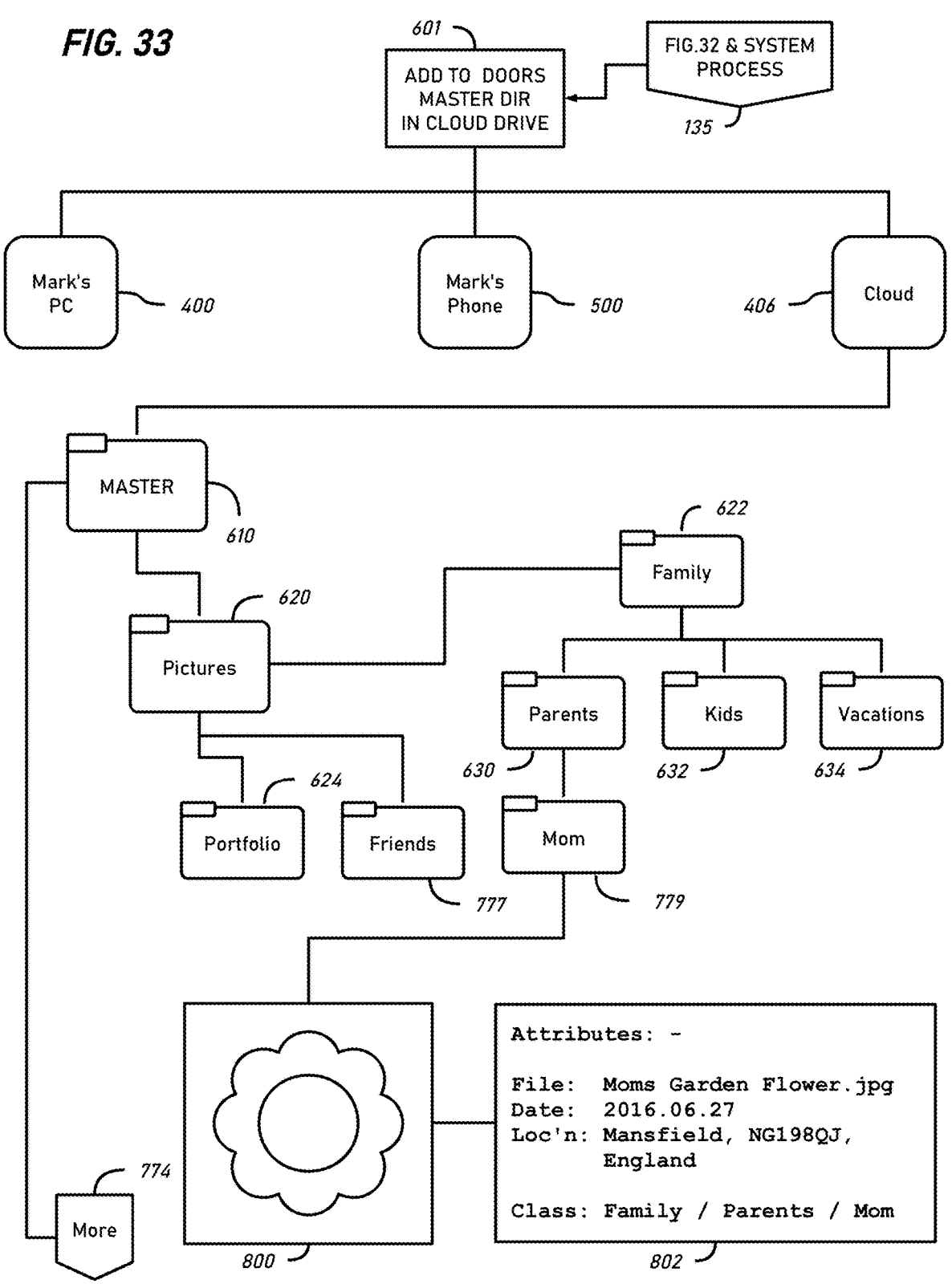
FIG. 33 is a mixed schematic and system block-flow diagram, detailing an aspect of operation on data within a directory structure according to the subject technologies.

FIG. 33 shows the DOORS 100 adding the new image of "A flower", with relationship 773 "Mom's Garden/nature" to the DOORS 100, master copy 601, the directory of which is unsurprisingly named "MASTER" 610, and is located within the Cloud Drive 406. The DOORS 100 checks the attributes 802, of the image file 800, noticing that the relationship 773 "Mom's garden nature" as well as the attributes 802 include the file name "Moms Garden Flower.jpg" to identify that the relationship descriptors "Mom's" and "Moms" are the possessory simile for "mother", "mom", and "mum", which are matches and/or partial matches for text strings included within the classes of the relational database 118, also in the relationships in the fact matrix 71 also which may be incorporated and recorded in records 58, which may be held within the relational database 118 for "Family", "Parents", and "Mom"; hence applicable or partially applicable or related classes and/or relations for this image may include "Family" "Parents", and "Mom"— that may track to directories.

The DOORS 100 then checks the available directories looking for one with a name that is a match or partial match or simile to the inferred relationships and/or classes. The directory "Pictures" 620, includes the sub-directory "Family" 662 which contains the sub-directory "Parents" 630, that in turn contains the sub-directory "Mom" 779. The inference engine, and/or artificial intelligence engine may use these attributes, relationships, and classes, to determine that the best overall fit for placement which may also be based on learning from the user's previous selections, as result of which processing the DOORS 100 decides the best name for the image file is "Moms Garden Flower.jpg" 800 which has no name collisions with other files, with those attributes 802 and that the sub-directory "Mom" 779, which is nested within the sub-directory "Parents" 630, which is in turn nested within the sub-directory "Family" 662, nested within the "Pictures" 620 directory of the "MASTER" 610 directory. This is where the DOORS decides to put the file

800. Which process steps are executed, before the process moves on, to more connected 774 process steps.

FIG. 34 is an embodiment of a DOORS 100, that is adapted for use by professional service providers such as lawyers, consulting engineers, marketing consultants, and accountants, etc. Professional services businesses have to manage their client files, which in the case of some professions may be governed by specific laws, as well as meeting other practical needs. In this case it appears to be a firm of patent attorneys who have a new client. The process begins by entering the new client into the client and matter database which may be or include a relational database 118 according to the subject technologies.

The user is presented with a menu to create a new client matter 807, which seeks user input to fill-out the columnized data entry fields 808 which are adjacent to columnized query prompting fields 803, of a new client and matter database record 805. The emboldened text in the response to query fields for user has been entered to create the new client matter into this record 805, so that the system may save the record to storage for future reference.

FIG. 35 continues the process begun in the previous file, which created a new record for a new client. It begins by displaying the menu to create a new matter for an existing client 810. Which is luckily the same client as in the previous figure. So that the user may use existing client data (as an alternative to entering it over again) 812. Which is accomplished using client database record(s) 814, where the basic client data is already recorded from previous matters, and may be extracted from storage 816. For use so that the system may create the new matter or record 818 using the pre-populated record menu 820. Which causes the display of a partially populated client and matter record 806 with some outstanding queries columnized 803, adjacent to unpopulated of the columnized fields 804, into which the user may enter additional details for the new matter. Where the applicable query prompting fields are "DESCRIPTION OF PROJECT", and "CLIENT'S REFENCE" adjacent to the empty fields for the user to complete via user inputs.

FIG. 36 continues the process from the previous figure beginning with displaying the create new matter, for an existing client interface 891, in which the user may complete the process via user inputs to the previously blank columnized 804 fields; which has occurred and is the emboldened text entries to complete the creation of the new matter, as an existing client and new matter database record 809.

Figure 37:
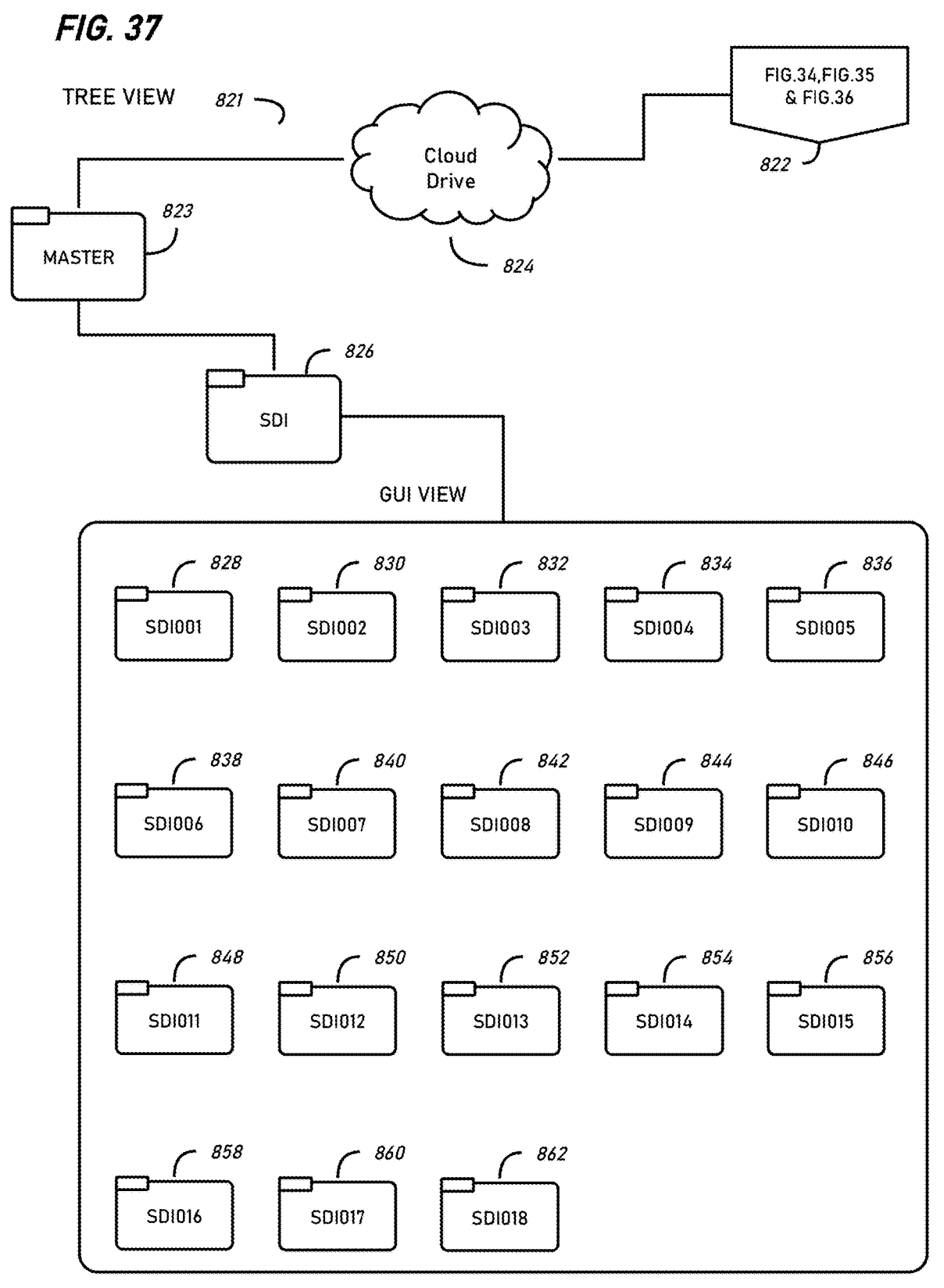

In FIG. 37, in the continuing process from the connected previous FIGS. 822, the system created the new sub-directory "SDI018" 862 continuing the sequence of directories and matter numbers which are used to create the names of directories within the "SDI" directory 826. Which is in turn a sub-directory of the master directory which is unsurprisingly labelled "MASTER" 823, and which is within a Cloud drive 824.

FIG. 38 is a Microsoft® disk operating system (DOS) window view of the sub-directory "SDI018" 862 created in the previously combined tree and GUI view 821 or the new matter SDI018 which was created for the existing client "Systems Design Innovation LLC [SDI]". Here the sub-directory from the tree and GUI view 821 is shown in this DOS window 864. Where the sub-directory and structure "MASTER:/SDI/SDI018/RECONCILE/" is shown 865. This is the directory into which files that have been identified as potentially needing to be reconciled may be placed by the DOORS 100 if the DOORS has identified them as files that may be related to this client (SDI) and to the matter "SDI018". Where the DOORS 100 may be assisting the legal practice which in operating these IT systems. Where indeed the client data management software may be part of a corporate package of DOORS which has been specially created, and/or licensed for professional services firms. In relation to which business market users may prefer to set strict policies and naming conventions like the one used in the creation of matter names which may use the initials of the client in these examples comprising [SDI]+[a number sequence generated part such as "018"]+[intuitively derived descriptors] created by the DOORS 100 for matter labels and/or sub-directory names such as "SDI018" and for file names as shown in this figure and those above.

FIG. 39 shows examples of attributes 866 that files may have which may be used by the DOORS 100 processes in generating naming descriptors for files and data structures (directories), and in processing their class and relationships to assist in those processed. Listing some "file intrinsic attributes" 868, as "meta data" such as "properties", "owner", "author", "size", "data modified", "date created", and "editing history", plus "content". The subject of analyzing content may be particularly useful in the case of image recognition, and/or also for recognizing from text fields, specific data which may help DOORS to process files more accurately, and in new ways. For example, using a DOORS 100 configured for business use to find files that contain accounting data, which may help a user to find copies of receipts and invoices, that may be need in the completion of tax returns and other accounting and financial applications (this example is addressed in more detail below in relation to FIGS. 40, and 41. Some examples of "file extrinsic attributes" 870 are also provided "location", "file name", "file type extension", as well as extrinsic attributes which may be part of a fact matrix relating to a data entity 71, including "locations of related files", "intrinsic attributes of related files", "related people", and "other related facts. All of which are susceptible to being stored into a relational database 118, and then leveraged by logical and/or machine learning inference engines, and/or artificial intelligence engines 46 that may be powered by a SENN 52.

FIG. 40 provides an example of a DOORS 100, that may be being used by a patent attorney (which is connected off page with FIG. 34, FIG. 35, FIG. 36, FIG. 37, FIG. 38, and FIG. 39 above). In which the DOORS may be creating or updating a DOORS master copy of his firm's client's files which may have become fragmented during installation of a new IT system between the previous system machines and the new system machines. After having gone through the steps of running the DOORS 100 and retrieving the files on those machines, this example may be found where the files discovered which have attributes capable of allowing the DOORS to reconcile those files into the directory structure "MASTER:/SDI/DSI018/RECONCILE/" 865 as shown and indicated in the DOS Directory View 864 of FIG. 39. Which is zoomed down into the "RECONCILE" sub-directory in this the DOS Directory View 872 of this figure. Where the DOORS 100 has positionally reconciled these files into the master copy, and nested them into these directory structures: "MASTER:/SDI/SDI018/RECONCILE/efilingAck480665-77. PDF", "MASTER:/SDI/SDI018/RECONCILE/Draft_DOORS_Spec_2024.02.11.DOCX", "MASTER:/SDI/SDI018/RECONCILE/DECLARATION_DOORS.pdf"

Further reconciliation may be possible, to move them up one level, and/or to create alias or mask names for them. Which may not be necessary from the user's perspective who may prefer to keep them where they are in the "RECONCILED" directory where they can be identified as distinct from other files that may also be populated into their related file holding directories.

The DOORS 100 has scanned into the intrinsic attributes of these files as shown in the example document. Which is an original document sample of an "Electronic Acknowledgement Receipt" 874, provided by the United States Patent and Trade Marks Office (USPTO). Which is in fact evidence of filing the provisional patent application for this very non-provisional patent application for the invention titled "DATA ORGANIZER OPTIMIZING RECONCILIATION SYSTEM" 876. With "First named Inventor/Applicant Name:" of Mark Taylor 878, and "Customer Number" of "99465" 878. Which together are the related attributes found in this document for client "SDI" and matter "SDI018" 880. These are the attributes which the DOORS has used to infer that this file "efilingAck48066577.PDF" should be reconciled into the directory structure and location shown "MASTER: SDI SDI018 RECONCILE" as shown 872.

Furthermore, the DOORS 100 has created the alias or mask name 583 for population into the relational database 118 then assigned the alias or mask name "SDI018.DOORS.PROVISIONAL.FILED.PDF" 882. As previously discussed, files may be handled by the DOORS by their alias or mask name, or their actual file name. The DOORS may swap the file name and alias or mask names around, and vice versa. If they are swapped then the more informative descriptor names provided by the DOORS may add consistency to help make files more readily identifiable to users. Furthermore, as previous names may be recorded into the relational database their links to other versions and related files need not be lost in the renaming process. Clearly the ability to scan into the contents of files so as to enable the identification and retrieval of intrinsic attributes is a powerful tool. Which may help make file management operations and information processing using IT systems more efficient for users, who are natural persons as well as businesses and other organizations including governments.

FIG. 41 further explains an embodiment of the DOORS 100 aspect of identifying and using task and/or purpose relevant intrinsic data from within file in the defined process 888, which provides:

Intrinsic Attribute-Based File Handling

890. Compare file contents to dictionaries and/or learning and/or facial recognition and/or pattern and/or logo recognition to identify:—
   (a) relationally significant words, keywords and/or patterns, and/or
   (b) likely meanings and/or relationships.
891. Cross reference words and/or pattern.
892. Create and/or identify inferences.
893. Write file info to relational database(s).
894. Write to duplicate or move file to most appropriate best fit location.

The DOORS processing is connected off page with FIG. 19, FIG. 20, FIG. 21, FIG. 22, FIG. 22A, FIG. 22B, FIG. 22C, FIG. 23, and FIG. 39. The defined process 888 is applied to user documents including the original sample document, which is a receipt provided in electronic form by Google® and their Google Play store 884. Within the text "Your Google Play Order Receipt from Jan. 22, 2023" the inference engine and/or artificial intelligence engine has identified three text strings which map to relationship data, from which it has been possible to infer that this document is a member of the classes of documents known as "expenses" and/or "financial" and has a direct match for the words "order" and "receipt" from which these attributes have been used to infer relationships thus: "Your [Google Play] 885 [Order] 886 [Receipt] 887 from [Jan. 22, 2023]" and to move or copy the file into the "Accounts" 654 directory of " . . . Documents/Work/Accounts/" 654 with the file original file name "Google email" 901.

The DOORS processing has also found in the Accounts directory files which appear to have been wrongly stored there "Holly Birthday 9" 903, which it is moving to the "Pictures" directory 624, and "CAD Drawings" 904 which it is moving to the "Portfolio" directory 654. While the remaining files "Mark Assets" 900, "Home System" 902, and "SDI Accounts" 905 appear to be remaining where they are at this stage in the DOORS processing.

Taking all the above descriptive material and drawings together and as summarized in FIG. 1, through FIG. 33 inclusive; persons skilled in the art will appreciate that the creation and population of a database capable to record details such as facial recognition information in the context of meeting the needs of a human user is essentially similar to recording key identifying aspects of other data in other contexts such as identifying that a document contains a logo or other information such as meta-data attributes 802 capable of association with a person or an organization. So that the technologies can perform much the same functions as part of an application used on mobile phones by consumers, and for large corporates such as professional service providers in the identification and management of important documents such as invoices, receipts, contracts, and computer aided designs.

Furthermore, large organizations such as one operating medical record holding infrastructures may use a version of the technologies for the management of patient data. Indeed, the capability provided by mapping the relational aspects of patient data, and other data may increase the utility of the data by enabling new levels of analysis and data-mining as may further be capable to build out additional aspects of the database which may be implemented as a relational database. Databases may further be used to train artificial intelligence or machine learning systems and subsystems. To create expert or helper systems and subsystems. They may also be used as knowledge bases for the creation of expert systems not based on artificial intelligence or machine learning per se, or even a combination of these possible approaches.

Consequently, a DOORS 100 may provide improved capabilities to leverage and cross-relate single user data or organization-wide data in new ways to produce greater efficacy from most if not all repositories of data. Library interfaces can be created with different views or presentations of the data capable to illustrate how the data are related across the sources included in the DOORS database, and or a DOORS Master file system. The functionality of a DOORS Master copy of a personal user or corporate owner may be obtained by creating the DOORS database alone, and using it to access the source data where it was found or resides, or the database may be used to pull-in copies of all desired data from all desired sources and to create a new unitary DOORS Master containing all the source data, or only a part of the data that is discovered by the DOORS interrogating coupled data sources.

It is highly likely that when used in the context of medical records DOORS may assist in the identification of precursor signs of medical conditions by monitoring all reported symptoms for users, and populations. Which when subjected to data-mining and analysis by expert systems may be able to offer a predictive diagnostic capability beyond what is possible within the current state of the art of medical record keeping. DOORS may be used to assist in leveraging greater comprehension of the relations that may persist within a population of data items in ways that have not previously been possible. These improvements in utility that may be gained using a DOORS 100 or a variant as a research and diagnostic tool explained here in terms of medical records; which approach may also be applied to engineering data from a population of aircraft, or financial data for fraud prevention etc. The possibilities being too numerous to fully list here.

Not all the possible examples or scenarios are explained in these examples and embodiments because too much detail may obscure more than it illuminates the analysis and processing the DOORS 100 or variant embodiments of the subject technology may perform to identify all the relationships and classes that pertain to individual files, and data structures. Which data are used to populate the relational database that the DOORS may then leverage to aid performance in its various learning and processing functions. That in turn the DOORS may then use to make logical and intuitive choices for creating and naming directory structures and of storage locations within them, as well as in some cases for creating file names and the locations, and naming locations in which they are to be stored. Noting that many existing files may by default keep their original names or a variant of them, or alternatively they may be renamed where this is deemed helpful. They may also be assigned an alias or mask name by the DOORS, and processed using the alias or mask, while the original name may be preserved. When a name is changed by the DOORS a record of the original name of the file may be stored in the records of the DOORS relational database, so that information is preserved and may be restored at a later time. Indeed, a DOORS 100 or variant could be configured to take over file naming and storage functions from other applications running on user devices as well as from the user.

This patent may eventually be licensed to the makers of operating systems such as Windows® and/or Android® and incorporated into operating systems. Certainly, the DOORS 100 may be coded as a module within an operating system to work as an integrated part of an operating system, rather than as an application which is installed by the user into and operating system environment.

Furthermore, the combination of expert system logic, relational databases, and artificial intelligence or machine learning—may be leveraged in the optimization, organization and reconciliation or combination and or dovetailing of other data objects in relation to each other, based on their attributes in other contexts.

FIG. 42 shows a diagrammatic view of a general purpose artificial intelligence system 2199, that has a program 2110 that controls the system while running on the resources provided by one or more CPU/GPU 2100, and in working memory 2113; as well as storage that may be capable to load (or boot up) the program, and automatically saves learning 2115, from the training and/or seed data 2165, and experiences the new data 2142 from sensors 2140 and other inputs 2105 such as user tweaking of feedback 2150 from these sources as is gained during operation of the system 2199.

This system has some binary programs 2120 such as basic input/output system (BIOS) and may have others capable to do computation and system tasks that do not require artificial intelligence.

Until the creation of artificial intelligence and machine learning, such classical computing programs had become very advanced, and can be made capable to pursue goals 2130.

The alternate process step to use AI comprised of neural networks 2160 is present in this system. To make it capable to use AI for those tasks to which it is best suited or desired. In the art progress was stuck for many years. Until the computing power to make deeper neural networks with more layers of neurons became practical. Assisted further by other techniques for feedback used for recursion and adjustment of the weightings applied to neurons 2170 have also boosted the utility of artificial neural networks. Computer hardware can now run quickly enough to support them.

These subject technologies may advance over the prior art, in alternative process 2170 by polymorphic artificial intelligence (PAI) systems, and/or polymorphic machine learning (PML) systems that are capable to evolve to suit processing needs via input and/or feedback 2175.

The ability to provide systems that can adapt themselves polymorphically and/or repair themselves after suffering damage may be of keen interest in defense applications.

The sub-process 2175 and all the PAI aspects of this system are also shown. Sub-process 2185 allows the system to create and destroy neurons within a neural network, which may be accomplished by the manipulation and use of pointers to connect processing capacity and memory from which to make a neuron; and to connect neurons to each other, and to system resources. Sub-process step 2180 may create and destroy these connections between neurons; and between neurons and system resources also via removing pointers that may serve as links to and from those resources.

The next process step is the capability to allocate and/or release resources of RAM, and CPU/GPU resources, for the creation and destruction of neurons 2195. Furthermore, where a polymorphic neuron is created, or an existing or starter neuron is polymorphically boosted as a hybrid, it may have resources added to it, such as parallel connections and/or extra bandwidth to allow more polymorphic connectivity 2190.

Figure 43:
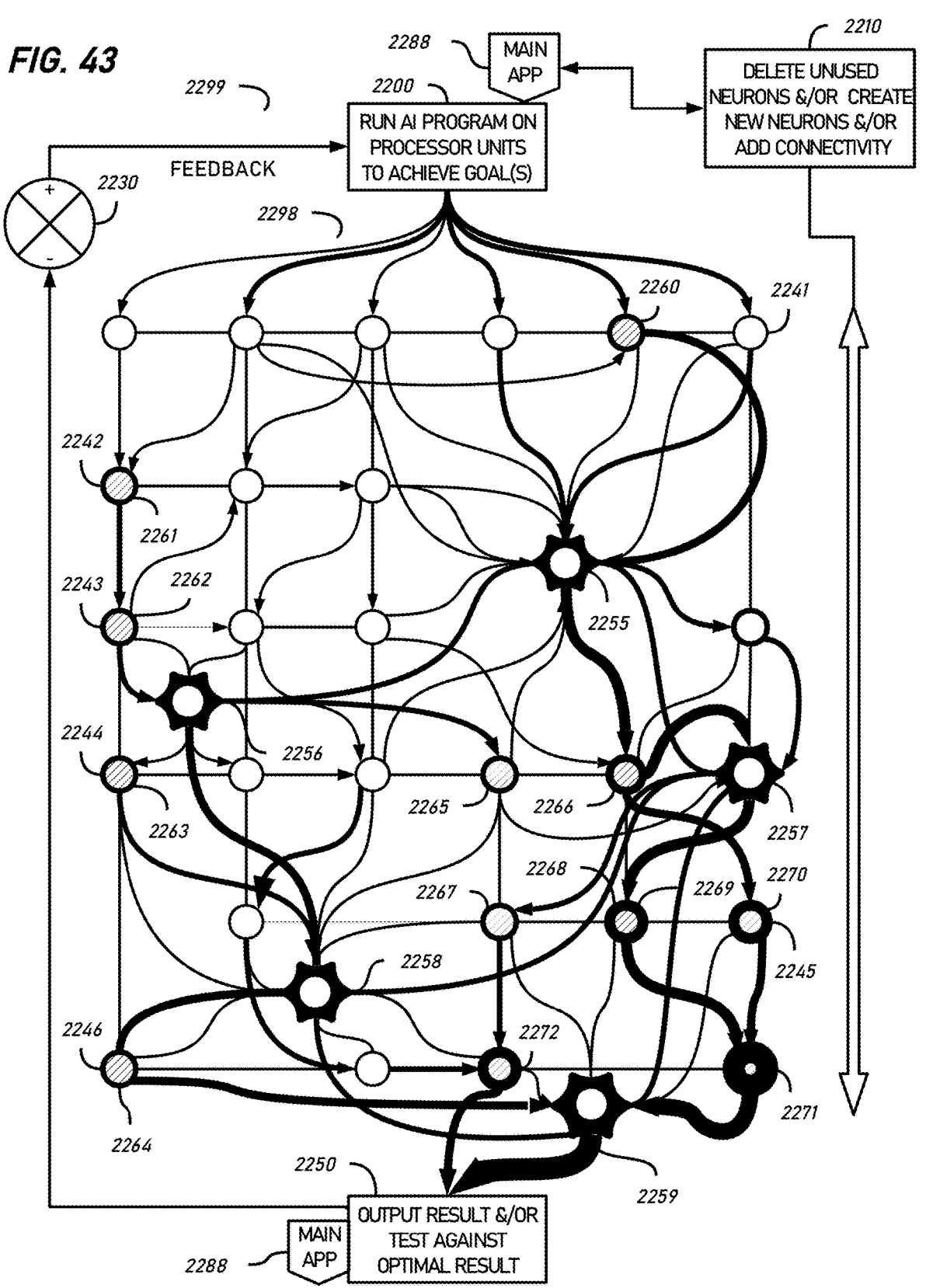
FIG. 43 is a mixed schematic and system block flow diagram of aspects of the subject technologies.
Figure 44:
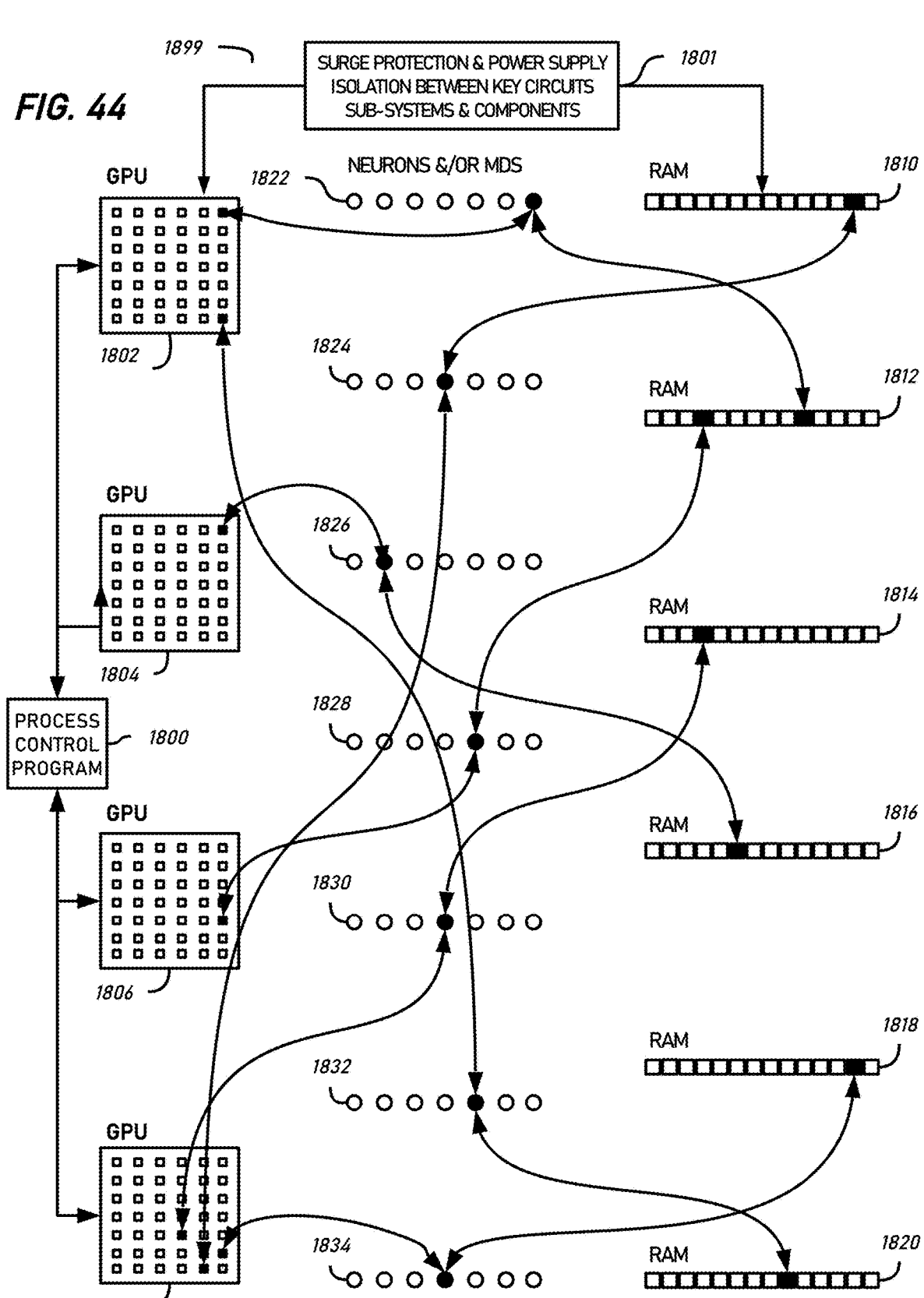
FIG. 44 is a mixed schematic and system block flow diagram of aspects of the subject technologies.

How this may be accomplished, vis a vis hardware and even randomized for improved security, is further explained in relation to the system 1899 shown in FIG. 44; and the system 2299 of FIG. 43; which includes a starter neural network that may have been based on weightings, and that has been run, and as it learned it evolved to become optimized; according to a system such as 2199.

The PAI system may add complexity where more is needed and may get out of its own way by simplifying itself where desirable. This in turn may enable the more efficient use of the resources of the system. So that bit for bit of computing power, PAI may be capable to use available resources more efficiently. Thereby, to provide either smarter artificial intelligence for the same resources, or cheaper artificial intelligence that needs less resources to provide a given level of intelligence. Noting that the details of a structure of virtual neurons and connections comprising a SENN, may also be stored for later recreation.

FIG. 43 shows the result of modifications to a SENN, used as a starter or seed network, to kick-start a neural network for further optimization via a polymorphic artificial intelligence program. PAI based or optimized neural networks may be started in various ways, this is just one possible starting position. It also helps to illustrate a neural network, or a part of a neural network that may be based on weightings. Which may have been allowed to run and to self-optimize within the constraints of relatively static neural networks, that lack the polymorphism of these subject technologies. From which data it may then have been possible by looking at the weightings to see that some neuron combinations were never used or were under used.

Further investigation may then reveal that the unused parts of a non-polymorphic SENN may have tracked back to logical impossibilities. So that they constituted a total waste of resources, that would probably never be used. Also, where under-used neurons were present—it may have become clear that there were parts of the network where parts may be removed without impairing function.

The PAI neural network application therefore began to try out informed guesses to see where the neurons could be removed 2210. Because the program may experiment with deletions, then run test data it is possible to see what if any difference pruning a neuron or connection makes; and where the results are undesirable the neuron and/or connection may be reinstated. Because backups of these neural networks can be stored, it is possible to pursue a line of changes and to abandon those changes and then reset back to a previous iteration of the neural network that worked better. This rollback of changes feature may be a valuable part of the system 2199 in the previous FIG. 42. Though that level of detail of the system is not shown here, because here we are mainly concerned with the neural network results of such an evolved PAI system.

As well as pruning back a neural network the PAI system may create new irregular neurons wherever they may be helpful. Little used parts of the network may be simplified by the neurons, and these may be replaced in part by an irregular polymorphic neuron, or the addition of jump-over connections to other neurons.

In PAI adding connectivity between neurons to boost connections and bandwidth between neurons may be helpful in parts of the neural network which may sustain damage or have higher traffic than the rest of the neural network. Which capability is another polymorphic characteristic of these subject technologies that may be accomplished by using pointers.

With electronic neurons, the pointers connect the neuron's CPU/GPU resource to its working memory and to long term storage data on the inside of the virtual neuron, and to other neurons on the outside of the neuron. Their connections to each other can also facilitate alternate less directly connecting routes to system resources, and some neurons may learn to act as proxies and/or communications relays capable to patch over or work around damage within a neural network.

Indeed, by the setting of parameters, similar neural networks may be switchable between pre-stored and optimized configurations depending on operating conditions. Capable to permit rapid morphing between different versions of neural networks. The ability to save versions of the PAI neural network to storage before optimizing for another condition, or purpose may be used to add switchable modes of artificial intelligence modules for specialist roles within a wider SENN based system.

For example, when the sensors of a self-driving car detect rainfall. This may then trigger the PAIS to switch to a version of itself that is optimized for wet weather driving conditions. So that it reduces speed, and allows longer breaking distances etc. Similarly, a smart missile may detect a missile defense system ahead and switch to a version optimized for stealth, and maneuverability and performing "jinking" maneuvers.

Consequently, the polymorphic ability to modify the neural network and to switch these between pre-stored configurations as conditions change, may be a cheap way to get essentially multiple artificial intelligence modes, for differing purposes installed into one physical system. Serving to boost utility.

Indeed, an artificial intelligence persona App, that helps with some tasks such as a DOORS 100 may help to help manage our digital lives and digital data. We might let the same persona expand to manage our appointments-like a personal assistant and eventually also let it manage routine purchases. During which process, those artificial intelligence personalities or personae may become special and/or emotionally bonded for us, and even bonded with us, in a form of symbiosis. Like a beloved pet, or family member.

Users may choose to save them and not lose their experience with each technology upgrade. As these technologies improve over time these artificial members of our families may evolve and grow old with us. Which or whom it may become unconscionable to delete, and that may eventually even achieve sentience. So much so—that they may stay with families long-term, and even way beyond their original users; and in a distant future that may be run by artificial intelligences—they might even become our legal guardians and control our care plans in old age.

A worker drone system may be optimized for various different tasks, by calling different personae from storage into working memory to run. So that there are many levels of polymorphism that may be applied due to the ability to rapidly copy and store the data that creates the neural networks in a succession of pre-optimized versions.

Pre-optimized versions or personae once perfected may then be copied and mass produced into a large number of clone systems. They may also be allowed to continue to polymorph to their specific role, in a running-in process. That may enable them to become a better fit for individual users.

These subject technologies may include polymorphic neurons, and connections. In processes that may be reminiscent of biological life that may help to create new neurons, provide them with resources and to destroy and remove or isolate damaged neurons. That may be pre-optimized according to specific parameters. Furthermore, randomly morphing neural networks may boost security, from signals intelligence eavesdropping.

Similarly, neural networks may be connected to other neural networks, and neural networks can be nested within other neural networks, perhaps to perform specific functions. Just as they may be nested into the structure of a main program that classical logic-based. That may call up artificial intelligence modules that work like modules of code, and observe parameter passing conventions similarly to the way binary functions and modules are set within a bigger system, called and interfaced with in classical logical systems programmed in languages such as "C".

Any weightings that the neurons of system 2299 may have or may have had are not shown. Rather the minimally expressed system 2299 is about the polymorphic aspects of the subject technologies. The PAIS operates processor units to achieve goals 2200. It deletes unused, and maybe also underused neurons and/or creates needed neurons and/or adjusts the connectivity of neurons 2210.

Information flows into the neural network from the program running on the system, and into the first layer of the neural network 2241, from whereas the neurons process it and route it on it flows through to the last layer of the neural network 2246. When this network was created as a uniform matrix of starter neurons, the processing would flow through every level. But the pruning part of poly-morphing this neural network has deleted three starter neurons of the second layer 2242, and two starter neurons of the third layer 2243. But then appears to have replaced them all with just one new irregular polymorphic neuron. Which has become super connected with additional dendrites. Thereby boosting its bandwidth, and thus improved access to resources such as processing power and memory. So that it has become a super neuron.

Then above the fourth layer of starter neurons 2244 on the left side, the program has created another super neuron in between layers, and without any deletions of surrounding starter neurons. Thereby adding a new layer comprised of one super neuron, also with some super connectivity.

The fourth level of the neural network 2244 has however lost one starter neuron on the right side, which it appears the system regretted and then replaced with a super neuron, with super connectivity in much the same place. In the sixth layer of neurons 2245 one starter neuron has been deleted on the left side and another starter neuron deleted in the center. There is a new super connected, super neuron interposed below the sixth layer 2245 and above the seventh layer of neurons 2246.

Almost finally, there are two starter neurons deleted one left and one right from the seventh layer of neurons 2246; and there is a new super neuron below the seventh layer of neurons, which is also super connected and through which most of all final outcomes flow. Another noteworthy fact is that some of the original starter neurons have survived, and a few have even thrived to become master neurons with extra connectivity and access to resources flowing from that 2260, 2261, 2262, 2263, 2264, 2265, 2267, 2268, 2269, 2270, and 2272. Indeed 2271 which began as a starter neuron has become an exceptionally important super-neuron much like those created polymorphically even though it began as a starter neuron in the starter neural network.

This neural network processes information and the results are output and/or tested against an optimal result 2250. The difference between the results obtained and the optimal result is fed back to the controlling program, as the basis for further adjustments to the neural network 2298.

There is additional information in the detail, which is that the connectivity or bandwidth of neurons is represented by the lines that connect them. The thicker the lines the more bandwidth and traffic which may correlate to a significant degree with weightings of neurons along those pathways.

FIG. 44 is a snapshot of active connections occurring over a neural network for an artificial intelligence 1899; wherein there are four CPU/GPU 1802, 1804, 1806 and 1808 that are randomly creating seven layers of neurons 1822, 1824, 1826, 1828, 1830, 1832 and 1834, in combination with six parallel randomly accessible memory cards, the storage locations of which are implemented and accessed by randomized pointers between the location in which the neuron is being processed within a CPU/GPU, and the neuron and the memory locations to create and operate neurons which relate to each neuron and its learning. The active, pointed to locations being shown in black as such. All of which processors, memory and neurons are being run under the process control program 1800. This is how a hardware randomized neural network may be configured to provide, for example an artificial intelligence, that may be capable to cope with damage and provide resistance to signals intelligence technologies and methods to help prevent data leakage.

The random virtualization of processor and memory for computing need not necessarily carry higher power or time overheads than other systems. This system looks like a tangled web of pointers to a human if we try to show more than this snapshot. But this type of structure is not necessarily any more difficult to understand to a computer.

This system may include hardware for surge protection and isolation of power supplies to subsystems and components 1801. The purpose of which may be to help to confine damage sustained by a processor, power supply, memory module or other component. To provide the opportunity for the damaged system to survive the damage. Wherein the remaining resources are reconfigured, in order to restore functionality.

What is occurring inside Qubits is that these waveforms are modeling the quantum interactions of the waveforms of particles. Which is arguably not really computation at all, but a modeling process. In which models may be used to produce answers to the question what if one waveform has a certain waveform function, and energy state? How will it interact with the model? To get the answer the desired wave function is set to a desired value, and the other waveforms adjust to their natural equilibrium responses to that changed state. There is no need to compute what would be a fiendishly complex formula to get the answer. Because if the model is correctly configured, according to the laws of Quantum Mechanics adjusting one waveform may cause changes in the other waveforms, so that they may be measured rather than needing to be calculated per se.

Figure 45:
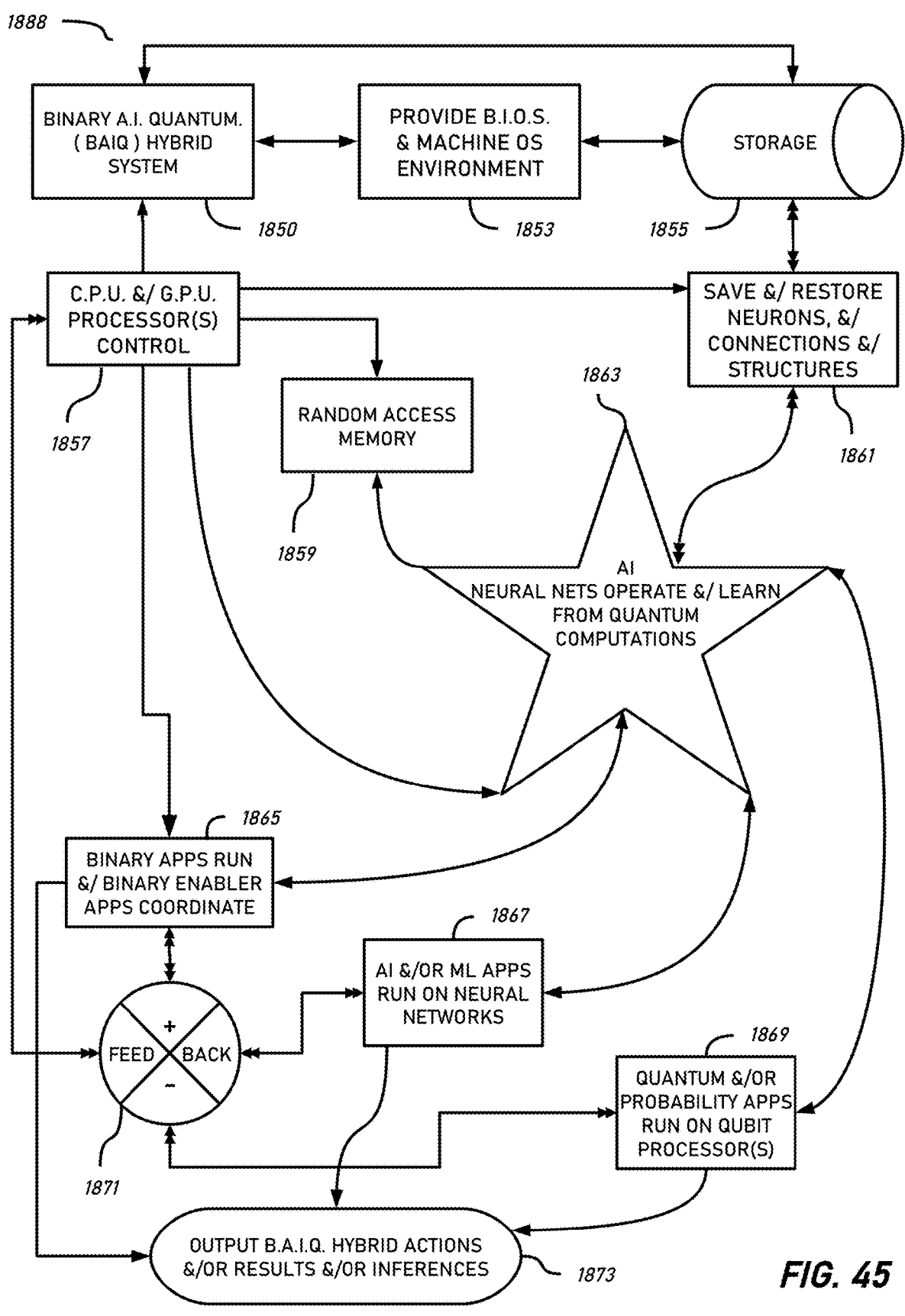
FIG. 45 is a mixed schematic and system block flow diagram of aspects of the subject technologies.

FIG. 45 is a hybrid Binary-Artificial Intelligence-Quantum (BAIQ) computing system 1888, the main elements of which are shown in block and systems flow diagram form. It may use these subject technologies to create neural networks.

Turning now to the detail of system 1888, the BAIQ hybrid operating system 1850, cooperates with the system resources through the Basic Input Output System (BIOS) 1853. This provides the baseline environment in which the operating system runs and operates the physical system. Including allowing the operating system to load from storage 1855.

The CPU and/or GPU processors 1857 control the operating system 1850. The boot-up process may cause the operating system 1850 to load from storage, and this to be facilitated by the BIOS machine environment 1853. The CPU/GPU may then be caused to load and run the binary applications software 1865, and these binary helper and enabler applications coordinate through feedback 1871 from the artificial intelligence and/or machine learning applications 1867 to allow them to run; similarly, the CPU/GPU may then be caused to run the Quantum programs to operate on the machine's Qubits 1869, and which process may also feedback and communicate 1871. Noting that the arrows used on these various feedback loops is that they allow the Binary helper applications 1865, the artificial intelligence applications 1867, and Quantum applications 1869 to run on the operating system 1857 in these multi-way feedback processes 1871, as these may all run in parallel together. This may be achieved by a shared protocol governing parameter and data passing, as between the binary, artificial intelligence, and quantum modules of system 1888.

Once the binary helper applications 1865 have coordinated the boot-up and begin to run the artificial intelligence programs 1867, and quantum system management programs then may provide a BAIQ hybrid computer system. The neural network(s) may operate and may learn from quantum computations 1863.

The BAIQ hybrid system once fully booted-up is ready to perform operations using quantum processors and/or Qubits, aided by binary, and/or artificial intelligence. Capable to perform desired computations as operators wish to run on system 1888; and to output hybrid results while the artificial intelligence may operate those quantum computations and learn from them. Which experience of operating quantum computations and learning from the outcomes may permit an artificial intelligence to learn to approximate and or to infer likely outcomes of quantum computations, and also to be better able to operate, and run quantum computing operations, as well as error correcting quantum computations. So as to provide improved quantum utility systems, and/or hybridized artificial intelligence and quantum (HAIQ) computing systems.

CONCLUSIONS RAMIFICATIONS AND SCOPE

Having had to reconstruct his 58 years of lifetime data from a range of sources after a recent security breach to his systems, the Inventor spent several days reconstructing his data into two intuitively accessible structures. One for his secret inventions, and research to be isolated from personal data. This was a major hassle fraught with tedium and highly demanding on his short-term memory and recall during the process of copying and placing files into the newly created intuitively structured and named directory structures that he created manually. Which is a task he was able to identify as highly suited to computers because they do not lose concentration, nor get bored, nor need breaks from such tasks. Which adverse events led the Inventor to make the inventive step in conceptualizing the subject technologies for the first time. To create the data organizing, optimizing, and reconciling, system (DOORS). Which may be implemented as a computer program in combination with hardware to provide a system, which operates according to a method that is capable to free humans from the need to do this tedious and time-consuming work manually.

So that in future users will no longer have to do this tedious and easy to get wrong chore. Freeing users to use their time for more enjoyable and or profitable activities, in their pursuit of happiness and economic benefits. To thus improve the productivity and hence utility of users. The ramifications of which also may extend to reducing carbon dioxide emissions due to efficiency gains. In which the DOORS may be able to perform its functions in the background on user devices over a user's lifetime. As well as being able to perform a recovery and reconstruction operation, or data migration from old to new platforms. Optimally organizing and reconciling data files and structures intuitively effortlessly, as well as being quicker than a human user. Potentially saving the user many hours or even days; and perhaps even months or weeks of staff time for large organizations.

A basic implementation of a DOORS may be provided without using an artificial intelligence or machine learning helper module. However, the utility to be gained and future-proofing and growth of the subject technology, along with the state of the advancing art over the next twenty years are likely to be better served by including the benefits of those emerging technologies of artificial intelligence and machine learning. This may be achieved according to this specification by the inclusion of an artificial intelligence and or machine learning module.

Users may migrate their DOORS and with it the living and evolving learning of the artificial intelligence and or machine learning module 46. Which may grow in wisdom and sophistication in the expert intuitive creation and use of user-compatible naming and data structuring habits. That are unique to and modelled upon the user's preferences and habits, and may be likened to on-boarding a personal assistant to look after user's data.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

References to a computer, mobile computing device and server above should be understood as being general purpose computing devices which may include, but are not limited to, one or more processors or processing units, a system memory, and a bus that couples various system components including the system memory to the processor as is known in the art of computers. The computing devices may be described in the general context of computer system executable instructions, such as program modules, being executed by a computer system (described for example, below). In some embodiments, a server processing any of the data (which may include artificial intelligence and/or machine learning) may be a cloud computing node connected to a cloud computing network (not shown) and practiced in distributed cloud computing environments where tasks are performed by remote processing devices that are linked through a communications network. In a distributed cloud computing environment, program modules may be located in both local and remote computer system storage media including memory storage devices.

The computing devices may typically include a variety of computer system readable media. Such media includes non-transitory, volatile and non-volatile media, removable and non-removable media. The system memory could include one or more computer system readable media in the form of volatile memory, such as a random access memory (RAM) and/or a cache memory. By way of example only, a storage system can be provided for reading from and writing to a non-removable, non-volatile magnetic media device. The system memory may include at least one program product having a set of program modules that are configured to carry out the functions described above of embodiments of the invention. The program modules generally carry out the functions and/or methodologies of embodiments of the invention as described above by aid of a processing unit (e.g., a "processor", "CPU", "chip", etc.).

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system) may be utilized. In the context of this disclosure, a computer readable storage medium may be any tangible or non-transitory medium that can contain, or store a program (for example, the program product) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal, or diagonal direction; and an item disposed below another item may be located below or above the other item along a vertical, horizontal, or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A process for reconciling electronic files, comprising:
interrogating a plurality of electronic files;
identifying intrinsic attributes from the plurality of electronic files;
identifying extrinsic attributes from the plurality of electronic files;
mapping the identified intrinsic attributes into a relational database;
mapping the identified extrinsic attributes into the relational database;
determining, by an artificial intelligence engine, relationships between the plurality of files based on the mapped intrinsic and extrinsic attributes;
identifying candidate related files based on the determined relationships;
displaying a group of identified candidate related files;
generating a centralized master directory structure;
generating a plurality of sub-directories in the centralized master storage directory;
storing one or more groups of related files in the plurality of sub-directories, wherein any one of the groups of related files are stored together in a sub-directory based on a relationship determined by the artificial intelligence engine; and
automatically labeling the sub-directories based on the relationship determined by the artificial intelligence engine.

2. The process of claim 1, further comprising:
receiving a selection of one of the identified candidate related files as representing the group of identified candidate related files; and
generating a filename associated with the selected one of the identified candidate related files, wherein the filename denotes a relationship between the group of identified candidate related files.

3. The process of claim 2, further comprising replacing pointers associated with non-selected files from the group of identified candidate related files with a new pointer pointing to the selected one of the identified candidate related files representing the group.

4. The process of claim 2, further comprising:
retrieving the plurality of electronic files from a plurality of storage sources; and
replacing the non-selected files from the group of identified candidate related files with a copy of the selected one of the identified candidate related files representing the group in the plurality of storage sources.

5. The process of claim 2, further comprising:
retrieving information pertaining to the plurality of files from a plurality of storage sources; and
generating new pointers associated with non-selected files from the group of identified candidate related files with the new pointers pointing to the selected one of the identified candidate related files representing the group.

6. The process of claim 2, further comprising:
presenting the group of identified candidate related files in a user interface;
receiving the selection of the one of the identified candidate related files representing the group as input from a user through the user interface; and
automatically removing an access to the non-selected files.

7. The process of claim 1, further comprising:
identifying files from the plurality of electronic files with one or more filename attributes in common;
determining, by the artificial intelligence engine, that two or more of the identified files with one or more filename parts in common comprise a shared file content; and
selecting one of the identified files with one or more filename parts in common as representing the group of identified files with one or more filename parts in common.

8. The process of claim 1, wherein the artificial intelligence engine performs operations on the relational database using the relationships, file types, and classes of a data descriptor, names of data structures, and names of data objects.

9. The process of claim 1, wherein the plurality of sources are located across multiple platforms of storage devices.

10. The process of claim 1, further comprising:
identifying multiple versions of a same file from the identified candidate related files representing the group; and
designating, in the centralized master storage directory file, the selected one of the identified candidate related files representing the group as a master version of the multiple versions of the same file.

11. The process of claim 10, further comprising deleting one or more of the multiple versions of the same file from the plurality of sources.

12. The process of claim 1, further comprising:
identifying relationships among entities in the plurality of files;
generating a plurality of sub-directories in the centralized master storage file,
labeling one of the sub-directories based on an identified relationship of a first entity and a second entity; and
storing files related to the second entity in the labeled sub-directory.

13. The process of claim 12, further comprising using image recognition to identify the relationship of the second entity identified as having a relationship to the first entity.

14. The process of claim 13, further comprising:
identifying an object in one of the plurality of files;
identifying the object as related to the first entity or to the second entity; and
storing a file with the object in a sub-directory labeled with an identifier of the object.

15. The process of claim 1, further comprising masking or using an alias for an object name during the mapping of the relational database.

16. The process of claim 15, further comprising determining a class of an object used to identify a relationship by the artificial intelligence engine, wherein the class is used to set placement of a file including the object in a hierarchy of directories.

17. A computer program product for reconciling electronic files, the computer program product comprising a non-transitory computer readable storage medium having computer readable program code embodied therewith, the computer readable program code being configured, when executed by a processor, to:

interrogate a plurality of electronic files;

identify intrinsic attributes from the plurality of electronic files;

identify extrinsic attributes from the plurality of electronic files;

map the identified intrinsic attributes into a relational database;

map the identified extrinsic attributes into the relational database;

determine, by an artificial intelligence engine, relationships between the plurality of files based on the mapped intrinsic and extrinsic attributes;

identify candidate related files based on the determined relationships;

displaying a group of identified candidate related files;

generate a centralized master directory structure;

generate a plurality of sub-directories in the centralized master storage directory;

store one or more groups of related files in the plurality of sub-directories, wherein any one of the groups of related files are stored together in a sub-directory based on a relationship determined by the artificial intelligence engine; and automatically label the sub-directories based on the relationship determined by the artificial intelligence engine.

18. A computing device, comprising:

a processor operating a dashboard user interface; and a memory coupled to the processor, the memory storing instructions to cause the processor to perform acts comprising:

interrogating a plurality of electronic files;

identifying intrinsic attributes from the plurality of electronic files;

identifying extrinsic attributes from the plurality of electronic files;

mapping the identified intrinsic attributes into a relational database;

mapping the identified extrinsic attributes into the relational database;

determining, by an artificial intelligence engine, relationships between the plurality of files based on the mapped intrinsic and extrinsic attributes;

identifying candidate related files based on the determined relationships;

displaying a group of identified candidate related files, generating a centralized master directory structure;

generating a plurality of sub-directories in the centralized master storage directory;

storing one or more groups of related files in the plurality of sub-directories, wherein any one of the groups of related files are stored together in a sub-directory based on a relationship determined by the artificial intelligence engine; and automatically labeling the sub-directories based on the relationship determined by the artificial intelligence engine.

\* \* \* \* \*